United States Patent
Lin et al.

(10) Patent No.: US 11,842,454 B1
(45) Date of Patent: Dec. 12, 2023

(54) SYSTEM AND METHOD FOR AN AUGMENTED REALITY EXPERIENCE VIA AN ARTIFICIAL INTELLIGENCE BOT

(71) Applicant: ConsumerInfo.com, Inc., Costa Mesa, CA (US)

(72) Inventors: James Minlou Lin, Irvine, CA (US); David Joseph Amador, Downey, CA (US); Alexander James Kentfield, Costa Mesa, CA (US); James Earl Griffin, Long Beach, CA (US); Aga Dzhafar Hady Ogiu Dzhafarov, Mission Viejo, CA (US); Mohan Kumar, Irvine, CA (US); Darrel Huntington, Cypress, CA (US); Bryan Marc Cimo, Fountain Valley, CA (US)

(73) Assignee: ConsumerInfo.com, Inc., Costa Mesa, CA (US)

( * ) Notice: Subject to any disclaimer, the term of this patent is extended or adjusted under 35 U.S.C. 154(b) by 0 days.

(21) Appl. No.: 17/644,540

(22) Filed: Dec. 15, 2021

Related U.S. Application Data

(63) Continuation of application No. 16/797,697, filed on Feb. 21, 2020, now Pat. No. 11,238,656.
(Continued)

(51) Int. Cl.
*G06T 19/00* (2011.01)
*G06T 13/40* (2011.01)
(Continued)

(52) U.S. Cl.
CPC ........... *G06T 19/006* (2013.01); *G06N 3/047* (2023.01); *G06T 13/40* (2013.01); *H04N 13/279* (2018.05); *G06T 2219/2004* (2013.01)

(58) Field of Classification Search
None
See application file for complete search history.

(56) References Cited

U.S. PATENT DOCUMENTS

| | | | |
|---|---|---|---|
| 3,405,457 A | 10/1968 | Bitzer | |
| 4,346,442 A | 8/1982 | Musmanno | |

(Continued)

FOREIGN PATENT DOCUMENTS

| | | |
|---|---|---|
| CA | 2 509 842 | 12/2005 |
| EP | 0 542 298 | 5/1993 |

(Continued)

OTHER PUBLICATIONS

U.S. Appl. No. 16/797,697, System and Method for an Augmented Reality Experience Via an Artificial Intelligence Bot, filed Feb. 21, 2020.
(Continued)

*Primary Examiner* — Ryan M Gray
(74) *Attorney, Agent, or Firm* — Knobbe, Martens, Olson & Bear, LLP

(57) ABSTRACT

The present disclosure describes systems and methods that apply artificial intelligence to augmented reality for enhanced user experience. A sensor, such as a camera, on a mobile phone can capture output data of a laptop computer or other computing device, such as a user interface. The captured image can be assessed by the mobile phone to determine an intent of a user and to display a three dimensional rendering, such as an avatar, on the mobile phone overlaid on top of the user interface of the laptop. The avatar can help navigate the user, such as pointing to areas of a webpage of interest, or inviting the user to scroll down on a webpage to a portion of the webpage that may not be in current view.

18 Claims, 15 Drawing Sheets

Related U.S. Application Data

(60) Provisional application No. 62/832,159, filed on Apr. 10, 2019, provisional application No. 62/809,469, filed on Feb. 22, 2019.

(51) Int. Cl.
*H04N 13/279* (2018.01)
*G06N 3/047* (2023.01)

(56) References Cited

U.S. PATENT DOCUMENTS

| | | |
|---|---|---|
| 4,734,858 A | 3/1988 | Schlafly |
| 4,755,940 A | 7/1988 | Brachtl et al. |
| 4,774,664 A | 9/1988 | Campbell et al. |
| 4,827,508 A | 5/1989 | Shear |
| 4,891,503 A | 1/1990 | Jewell |
| 4,977,595 A | 12/1990 | Ohta et al. |
| 4,989,141 A | 1/1991 | Lyons et al. |
| 5,126,936 A | 6/1992 | Champion et al. |
| 5,148,365 A | 9/1992 | Dembo |
| 5,220,501 A | 6/1993 | Lawlor et al. |
| 5,262,941 A | 11/1993 | Saladin |
| 5,274,547 A | 12/1993 | Zoffel et al. |
| 5,336,870 A | 8/1994 | Hughes et al. |
| 5,351,186 A | 9/1994 | Bullock et al. |
| 5,361,201 A | 11/1994 | Jost et al. |
| 5,383,113 A | 1/1995 | Kight et al. |
| 5,404,518 A | 4/1995 | Gilbertson et al. |
| 5,423,033 A | 6/1995 | Yuen |
| 5,500,513 A | 3/1996 | Langhans et al. |
| 5,563,783 A | 10/1996 | Stolfo et al. |
| 5,590,038 A | 12/1996 | Pitroda |
| 5,592,560 A | 1/1997 | Deaton et al. |
| 5,621,201 A | 4/1997 | Langhans et al. |
| 5,640,577 A | 6/1997 | Scharmer |
| 5,649,115 A | 7/1997 | Schrader et al. |
| 5,659,725 A | 8/1997 | Levy et al. |
| 5,659,731 A | 8/1997 | Gustafson |
| 5,689,651 A | 11/1997 | Lozman |
| 5,719,941 A | 2/1998 | Swift et al. |
| 5,729,735 A | 3/1998 | Meyering |
| 5,739,512 A | 4/1998 | Tognazzini |
| 5,742,769 A | 4/1998 | Lee et al. |
| 5,754,632 A | 5/1998 | Smith |
| 5,774,870 A | 6/1998 | Storey |
| 5,809,322 A | 9/1998 | Akerib |
| 5,813,006 A | 9/1998 | Polnerow et al. |
| 5,819,234 A | 10/1998 | Slavin et al. |
| 5,832,068 A | 11/1998 | Smith |
| 5,842,211 A | 11/1998 | Horadan et al. |
| 5,844,218 A | 12/1998 | Kawan et al. |
| 5,857,174 A | 1/1999 | Dugan |
| 5,864,620 A | 1/1999 | Pettitt |
| 5,870,721 A | 2/1999 | Norris |
| 5,878,403 A | 3/1999 | DeFrancesco |
| 5,881,131 A | 3/1999 | Farris et al. |
| 5,884,302 A | 3/1999 | Ho |
| 5,903,830 A | 5/1999 | Joao et al. |
| 5,903,881 A | 5/1999 | Schrader et al. |
| 5,918,227 A | 6/1999 | Polnerow et al. |
| 5,930,776 A | 7/1999 | Dykstra et al. |
| 5,933,837 A | 8/1999 | Kung |
| 5,937,392 A | 8/1999 | Alberts |
| 5,953,710 A | 9/1999 | Fleming |
| 5,956,693 A | 9/1999 | Geerlings |
| 5,963,939 A | 10/1999 | McCann et al. |
| 5,966,695 A | 10/1999 | Melchione et al. |
| 5,974,521 A | 10/1999 | Akerib |
| 5,978,780 A | 11/1999 | Watson |
| 5,995,947 A | 11/1999 | Fraser et al. |
| 5,999,596 A | 12/1999 | Walker et al. |
| 6,006,333 A | 12/1999 | Nielsen |
| 6,009,412 A | 12/1999 | Storey |
| 6,009,415 A | 12/1999 | Shurling et al. |
| 6,014,645 A | 1/2000 | Cunningham |
| 6,021,397 A | 2/2000 | Jones et al. |
| 6,021,943 A | 2/2000 | Chastain |
| 6,026,440 A | 2/2000 | Shrader et al. |
| 6,029,149 A | 2/2000 | Dykstra et al. |
| 6,035,288 A | 3/2000 | Solomon |
| 6,038,551 A | 3/2000 | Barlow et al. |
| 6,043,815 A | 3/2000 | Simonoff et al. |
| 6,055,570 A | 4/2000 | Nielsen |
| 6,064,990 A | 5/2000 | Goldsmith |
| 6,072,894 A | 6/2000 | Payne |
| 6,073,140 A | 6/2000 | Morgan et al. |
| 6,076,070 A | 6/2000 | Stack |
| 6,085,242 A | 7/2000 | Chandra |
| 6,088,686 A | 7/2000 | Walker et al. |
| 6,108,691 A | 8/2000 | Lee et al. |
| 6,112,190 A | 8/2000 | Fletcher et al. |
| 6,115,694 A | 9/2000 | Cheetham et al. |
| 6,119,103 A | 9/2000 | Basch et al. |
| 6,128,602 A | 10/2000 | Northington et al. |
| 6,145,088 A | 11/2000 | Stevens |
| 6,149,441 A | 11/2000 | Pellegrino et al. |
| 6,157,707 A | 12/2000 | Baulier et al. |
| 6,161,139 A | 12/2000 | Win et al. |
| 6,173,272 B1 | 1/2001 | Thomas et al. |
| 6,178,420 B1 | 1/2001 | Sassano |
| 6,182,068 B1 | 1/2001 | Culliss |
| 6,182,229 B1 | 1/2001 | Nielsen |
| 6,195,660 B1 | 2/2001 | Polnerow et al. |
| 6,195,738 B1 | 2/2001 | Akerib |
| 6,199,077 B1 | 3/2001 | Inala et al. |
| 6,202,053 B1 | 3/2001 | Christiansen et al. |
| 6,202,067 B1 | 3/2001 | Blood et al. |
| 6,208,998 B1 | 3/2001 | Marcus |
| 6,230,188 B1 | 5/2001 | Marcus |
| 6,233,566 B1 | 5/2001 | Levine et al. |
| 6,233,588 B1 | 5/2001 | Marchoili et al. |
| 6,247,000 B1 | 6/2001 | Hawkins et al. |
| 6,254,000 B1 | 7/2001 | Degen et al. |
| 6,263,447 B1 | 7/2001 | French et al. |
| 6,278,993 B1 | 8/2001 | Kumar et al. |
| 6,282,658 B2 | 8/2001 | French et al. |
| 6,289,452 B1 | 9/2001 | Arnold et al. |
| 6,295,528 B1 | 9/2001 | Marcus et al. |
| 6,295,541 B1 | 9/2001 | Bodnar et al. |
| 6,304,850 B1 | 10/2001 | Keller et al. |
| 6,304,860 B1 | 10/2001 | Martin et al. |
| 6,311,169 B2 | 10/2001 | Duhon |
| 6,317,783 B1 | 11/2001 | Freishtat et al. |
| 6,321,339 B1 | 11/2001 | French et al. |
| 6,327,578 B1 | 12/2001 | Linehan |
| 6,330,551 B1 | 12/2001 | Burchetta et al. |
| 6,343,279 B1 | 1/2002 | Bissonette et al. |
| 6,347,375 B1 | 2/2002 | Reinert et al. |
| 6,353,778 B1 | 3/2002 | Brown |
| 6,353,795 B1 | 3/2002 | Ranjan |
| 6,356,937 B1 | 3/2002 | Montville et al. |
| 6,374,262 B1 | 4/2002 | Kodama |
| 6,384,844 B1 | 5/2002 | Stewart et al. |
| 6,386,444 B1 | 5/2002 | Sullivan |
| 6,397,197 B1 | 5/2002 | Gindlesperger |
| 6,397,212 B1 | 5/2002 | Biffar |
| 6,401,118 B1 | 6/2002 | Thomas |
| 6,405,181 B2 | 6/2002 | Lent et al. |
| 6,405,245 B1 | 6/2002 | Burson et al. |
| 6,408,282 B1 | 6/2002 | Buist |
| 6,412,073 B1 | 6/2002 | Rangan |
| 6,421,675 B1 | 7/2002 | Ryan et al. |
| 6,421,729 B1 | 7/2002 | Paltenghe et al. |
| 6,422,462 B1 | 7/2002 | Cohen |
| 6,442,590 B1 | 8/2002 | Inala et al. |
| 6,453,353 B1 | 9/2002 | Win et al. |
| 6,457,012 B1 | 9/2002 | Jatkowski |
| 6,460,127 B1 | 10/2002 | Akerib |
| 6,473,740 B2 | 10/2002 | Cockril et al. |
| 6,477,565 B1 | 11/2002 | Daswani et al. |
| 6,487,540 B1 | 11/2002 | Smith et al. |
| 6,496,936 B1 | 12/2002 | French et al. |
| 6,505,168 B1 | 1/2003 | Rothman et al. |
| 6,510,451 B2 | 1/2003 | Wu et al. |

(56) References Cited

U.S. PATENT DOCUMENTS

| | | |
|---|---|---|
| 6,517,587 B2 | 2/2003 | Satyavolu et al. |
| 6,523,021 B1 | 2/2003 | Monberg et al. |
| 6,523,041 B1 | 2/2003 | Morgan et al. |
| 6,539,377 B1 | 3/2003 | Culliss |
| 6,539,392 B1 | 3/2003 | Rebane |
| 6,543,683 B2 | 4/2003 | Hoffman |
| 6,549,904 B1 | 4/2003 | Ortega et al. |
| 6,552,670 B2 | 4/2003 | Sundaravel et al. |
| 6,564,210 B1 | 5/2003 | Korda et al. |
| 6,567,791 B2 | 5/2003 | Lent et al. |
| 6,567,850 B1 | 5/2003 | Freishtat et al. |
| 6,571,236 B1 | 5/2003 | Ruppelt |
| 6,574,736 B1 | 6/2003 | Andrews |
| 6,578,012 B1 | 6/2003 | Storey |
| 6,581,025 B2 | 6/2003 | Lehman |
| 6,587,841 B1 | 7/2003 | DeFrancesco |
| 6,594,766 B2 | 7/2003 | Rangan et al. |
| 6,611,816 B2 | 8/2003 | Lebda et al. |
| 6,615,193 B1 | 9/2003 | Kingdon et al. |
| 6,622,131 B1 | 9/2003 | Brown et al. |
| 6,629,245 B1 | 9/2003 | Stone et al. |
| 6,633,910 B1 | 10/2003 | Rajan et al. |
| 6,647,383 B1 | 11/2003 | August et al. |
| 6,658,393 B1 | 12/2003 | Basch et al. |
| 6,665,715 B1 | 12/2003 | Houri |
| 6,678,694 B1 | 1/2004 | Zimmermann et al. |
| 6,694,353 B2 | 2/2004 | Sommerer |
| 6,701,348 B2 | 3/2004 | Sommerer |
| 6,703,930 B2 | 3/2004 | Skinner |
| 6,711,665 B1 | 3/2004 | Akerib et al. |
| 6,714,944 B1 | 3/2004 | Shapiro et al. |
| 6,718,313 B1 | 4/2004 | Lent et al. |
| 6,725,381 B1 | 4/2004 | Smith et al. |
| 6,725,425 B1 | 4/2004 | Rajan et al. |
| 6,738,804 B1 | 5/2004 | Lo |
| 6,745,196 B1 | 6/2004 | Colyer et al. |
| 6,745,938 B2 | 6/2004 | Sullivan |
| 6,748,426 B1 | 6/2004 | Shaffer et al. |
| 6,750,985 B2 | 6/2004 | Rhoads |
| 6,766,304 B2 | 7/2004 | Kemp et al. |
| 6,766,327 B2 | 7/2004 | Morgan, Jr. et al. |
| 6,772,132 B1 | 8/2004 | Kemp et al. |
| 6,781,608 B1 | 8/2004 | Crawford |
| 6,782,370 B1 | 8/2004 | Stack |
| 6,782,379 B2 | 8/2004 | Lee |
| 6,792,088 B2 | 9/2004 | Takeuchi |
| 6,792,263 B1 | 9/2004 | Kite |
| 6,795,812 B1 | 9/2004 | Lent et al. |
| 6,796,497 B2 | 9/2004 | Benkert et al. |
| 6,802,042 B2 | 10/2004 | Rangan et al. |
| 6,804,346 B1 | 10/2004 | Mewhinney |
| 6,805,287 B2 | 10/2004 | Bishop et al. |
| 6,807,533 B1 | 10/2004 | Land et al. |
| 6,810,323 B1 | 10/2004 | Bullock et al. |
| 6,816,850 B2 | 11/2004 | Culliss |
| 6,816,871 B2 | 11/2004 | Lee |
| 6,823,319 B1 | 11/2004 | Lynch et al. |
| 6,826,707 B1 | 11/2004 | Stevens |
| 6,829,639 B1 | 12/2004 | Lawson et al. |
| 6,842,782 B1 | 1/2005 | Malik et al. |
| 6,845,448 B1 | 1/2005 | Chaganti et al. |
| 6,847,966 B1 | 1/2005 | Sommer et al. |
| 6,847,974 B2 | 1/2005 | Wachtel |
| 6,857,073 B2 | 2/2005 | French et al. |
| 6,859,212 B2 | 2/2005 | Kumar et al. |
| 6,865,680 B1 | 3/2005 | Wu et al. |
| 6,871,220 B1 | 3/2005 | Rajan et al. |
| 6,871,287 B1 | 3/2005 | Ellingson |
| 6,871,789 B2 | 3/2005 | Hilton et al. |
| 6,892,307 B1 | 5/2005 | Wood et al. |
| 6,898,574 B1 | 5/2005 | Regan |
| 6,900,731 B2 | 5/2005 | Kreiner et al. |
| 6,910,624 B1 | 6/2005 | Natsuno |
| 6,928,487 B2 | 8/2005 | Eggebraaten et al. |
| 6,934,714 B2 | 8/2005 | Meinig |
| 6,938,011 B1 | 8/2005 | Kemp et al. |
| 6,941,323 B1 | 9/2005 | Galperin |
| 6,947,989 B2 | 9/2005 | Gullotta et al. |
| 6,950,807 B2 | 9/2005 | Brock |
| 6,954,757 B2 | 10/2005 | Zargham et al. |
| 6,957,336 B2 | 10/2005 | Wheeler et al. |
| 6,962,336 B2 | 11/2005 | Glass |
| 6,963,857 B1 | 11/2005 | Johnson |
| 6,965,881 B1 | 11/2005 | Brickell et al. |
| 6,968,319 B1 | 11/2005 | Remington et al. |
| 6,970,864 B2 | 11/2005 | Marcus et al. |
| 6,973,462 B2 | 12/2005 | Dattero et al. |
| 6,983,320 B1 | 1/2006 | Thomas et al. |
| 6,985,183 B2 | 1/2006 | Jan et al. |
| 6,985,887 B1 | 1/2006 | Sunstein et al. |
| 6,988,082 B1 | 1/2006 | Williams et al. |
| 6,988,085 B2 | 1/2006 | Hedy |
| 6,990,591 B1 | 1/2006 | Pearson |
| 6,993,504 B1 | 1/2006 | Friesen et al. |
| 6,993,510 B2 | 1/2006 | Guy |
| 6,993,572 B2 | 1/2006 | Ross, Jr. et al. |
| 6,993,596 B2 | 1/2006 | Hinton et al. |
| 6,996,542 B1 | 2/2006 | Landry |
| 6,999,941 B1 | 2/2006 | Agarwal |
| 7,013,310 B2 | 3/2006 | Messing et al. |
| 7,013,315 B1 | 3/2006 | Boothby |
| 7,013,323 B1 | 3/2006 | Thomas et al. |
| 7,016,907 B2 | 3/2006 | Boreham et al. |
| 7,024,548 B1 | 4/2006 | O'Toole, Jr. |
| 7,024,689 B2 | 4/2006 | O'Donnell et al. |
| 7,028,013 B2 | 4/2006 | Saeki |
| 7,028,052 B2 | 4/2006 | Chapman et al. |
| 7,039,607 B2 | 5/2006 | Watarai et al. |
| 7,039,656 B1 | 5/2006 | Tsai et al. |
| 7,043,476 B2 | 5/2006 | Robson |
| 7,046,139 B2 | 5/2006 | Kuhn et al. |
| 7,047,258 B2 | 5/2006 | Balogh et al. |
| 7,050,989 B1 | 5/2006 | Hurt et al. |
| 7,058,386 B2 | 6/2006 | McGregor et al. |
| 7,058,817 B1 | 6/2006 | Ellmore |
| 7,062,475 B1 | 6/2006 | Szabo et al. |
| 7,065,526 B2 | 6/2006 | Wissner et al. |
| 7,065,566 B2 | 6/2006 | Menard et al. |
| 7,069,240 B2 | 6/2006 | Spero et al. |
| 7,072,909 B2 | 7/2006 | Polk |
| 7,076,462 B1 | 7/2006 | Nelson et al. |
| 7,085,727 B2 | 8/2006 | VanOrman |
| 7,085,997 B1 | 8/2006 | Wu et al. |
| 7,086,586 B1 | 8/2006 | Sullivan |
| 7,089,594 B2 | 8/2006 | Lal et al. |
| 7,103,473 B2 | 9/2006 | Ranjan |
| 7,103,602 B2 | 9/2006 | Black et al. |
| 7,107,241 B1 | 9/2006 | Pinto |
| 7,107,285 B2 | 9/2006 | Von Kaenel et al. |
| 7,110,978 B1 | 9/2006 | Chin |
| 7,117,172 B1 | 10/2006 | Black |
| 7,117,529 B1 | 10/2006 | O'Donnell et al. |
| 7,124,144 B2 | 10/2006 | Christianson et al. |
| 7,127,068 B2 | 10/2006 | Sundaravel et al. |
| 7,127,424 B2 | 10/2006 | Kemp et al. |
| 7,139,728 B2 | 11/2006 | Rigole |
| 7,143,063 B2 | 11/2006 | Lent |
| 7,149,782 B2 | 12/2006 | Sommerer |
| 7,155,508 B2 | 12/2006 | Sankuratripati et al. |
| 7,155,725 B1 | 12/2006 | Kister et al. |
| 7,155,739 B2 | 12/2006 | Bari et al. |
| 7,174,455 B1 | 2/2007 | Arnold et al. |
| 7,178,096 B2 | 2/2007 | Rangan et al. |
| 7,181,418 B1 | 2/2007 | Zucker et al. |
| 7,181,427 B1 | 2/2007 | DeFrancesco |
| 7,194,416 B1 | 3/2007 | Provost et al. |
| 7,200,602 B2 | 4/2007 | Jonas |
| 7,200,804 B1 | 4/2007 | Khavari et al. |
| 7,206,768 B1 | 4/2007 | deGroeve et al. |
| 7,209,895 B2 | 4/2007 | Kundtz et al. |
| 7,209,911 B2 | 4/2007 | Boothby et al. |
| 7,212,995 B2 | 5/2007 | Schulkins |
| 7,212,999 B2 | 5/2007 | Friesen et al. |
| 7,213,064 B2 | 5/2007 | Smith et al. |

(56) References Cited

U.S. PATENT DOCUMENTS

| | | |
|---|---|---|
| 7,218,912 B2 | 5/2007 | Erskine et al. |
| 7,219,107 B2 | 5/2007 | Beringer |
| 7,222,085 B2 | 5/2007 | Stack |
| 7,222,369 B2 | 5/2007 | Vering et al. |
| 7,225,464 B2 | 5/2007 | Satyavolu et al. |
| 7,228,289 B2 | 6/2007 | Brumfield et al. |
| 7,228,335 B2 | 6/2007 | Caughey |
| 7,229,006 B2 | 6/2007 | Babbi et al. |
| 7,234,156 B2 | 6/2007 | French et al. |
| 7,236,950 B2 | 6/2007 | Savage et al. |
| 7,240,363 B1 | 7/2007 | Ellingson |
| 7,243,369 B2 | 7/2007 | Bhat et al. |
| 7,246,361 B1 | 7/2007 | Scalora et al. |
| 7,246,740 B2 | 7/2007 | Swift et al. |
| 7,249,076 B1 | 7/2007 | Pendleton et al. |
| 7,249,080 B1 | 7/2007 | Hoffman et al. |
| 7,249,096 B1 | 7/2007 | Lasater et al. |
| 7,249,113 B1 | 7/2007 | Continelli et al. |
| 7,263,497 B1 | 8/2007 | Wiser et al. |
| 7,263,548 B2 | 8/2007 | Daswani et al. |
| 7,280,980 B1 | 10/2007 | Hoadley et al. |
| 7,281,652 B2 | 10/2007 | Foss |
| 7,289,971 B1 | 10/2007 | O'Neil et al. |
| 7,296,734 B2 | 11/2007 | Pliha |
| 7,302,272 B2 | 11/2007 | Ackley |
| 7,305,233 B2 | 12/2007 | Paul et al. |
| 7,310,611 B2 | 12/2007 | Shibuya et al. |
| 7,310,617 B1 | 12/2007 | Cunningham |
| 7,310,618 B2 | 12/2007 | Libman |
| 7,313,813 B2 | 12/2007 | Rangan et al. |
| 7,314,167 B1 | 1/2008 | Kiliccote |
| 7,315,837 B2 | 1/2008 | Sloan et al. |
| 7,328,233 B2 | 2/2008 | Salim et al. |
| 7,328,435 B2 | 2/2008 | Trifon |
| 7,330,717 B2 | 2/2008 | Gidron et al. |
| 7,330,831 B2 | 2/2008 | Biondi et al. |
| 7,330,835 B2 | 2/2008 | Deggendorf |
| 7,333,635 B2 | 2/2008 | Tsantes et al. |
| 7,334,020 B2 | 2/2008 | Caughey |
| 7,340,042 B2 | 3/2008 | Cluff et al. |
| 7,340,679 B2 | 3/2008 | Botscheck et al. |
| 7,343,149 B2 | 3/2008 | Benco |
| 7,343,295 B2 | 3/2008 | Pomerance |
| 7,346,576 B2 | 3/2008 | Lent et al. |
| 7,356,503 B1 | 4/2008 | Johnson et al. |
| 7,356,506 B2 | 4/2008 | Watson et al. |
| 7,356,516 B2 | 4/2008 | Richey et al. |
| 7,366,495 B1 | 4/2008 | Magnotta et al. |
| 7,366,694 B2 | 4/2008 | Lazerson |
| 7,366,759 B2 | 4/2008 | Trevithick |
| 7,370,014 B1 | 5/2008 | Vasavada et al. |
| 7,370,044 B2 | 5/2008 | Mulhern et al. |
| 7,373,324 B1 | 5/2008 | Engin et al. |
| 7,379,978 B2 | 5/2008 | Anderson et al. |
| 7,383,988 B2 | 6/2008 | Slonecker, Jr. |
| 7,386,511 B2 | 6/2008 | Buchanan et al. |
| 7,386,786 B2 | 6/2008 | Davis et al. |
| 7,389,913 B2 | 6/2008 | Starrs |
| 7,395,241 B1 | 7/2008 | Cook et al. |
| 7,395,243 B1 | 7/2008 | Zielke et al. |
| 7,395,273 B2 | 7/2008 | Khan et al. |
| 7,400,883 B2 | 7/2008 | Rivers et al. |
| 7,401,050 B2 | 7/2008 | O'Neill |
| 7,403,923 B2 | 7/2008 | Elliott et al. |
| 7,403,942 B1 | 7/2008 | Bayliss |
| 7,409,369 B1 | 8/2008 | Homuth et al. |
| 7,412,228 B2 | 8/2008 | Barclay et al. |
| 7,412,487 B2 | 8/2008 | Caughey |
| 7,413,113 B1 | 8/2008 | Zhu |
| 7,424,520 B2 | 9/2008 | Daswani et al. |
| 7,430,520 B1 | 9/2008 | Haugen et al. |
| 7,433,864 B2 | 10/2008 | Malik |
| 7,437,679 B2 | 10/2008 | Uemura et al. |
| 7,444,518 B1 | 10/2008 | Dharmarajan et al. |
| 7,447,663 B1 | 11/2008 | Barker et al. |
| 7,451,095 B1 | 11/2008 | Bradley et al. |
| 7,451,113 B1 | 11/2008 | Kasower |
| 7,458,508 B1 | 12/2008 | Shao et al. |
| 7,467,401 B2 | 12/2008 | Cicchitto |
| 7,475,032 B1 | 1/2009 | Patnode et al. |
| 7,479,949 B2 | 1/2009 | Jobs et al. |
| 7,480,631 B1 | 1/2009 | Merced et al. |
| 7,483,892 B1 | 1/2009 | Sommer et al. |
| 7,490,356 B2 | 2/2009 | Lieblich et al. |
| RE40,692 E | 3/2009 | Rose, Jr. |
| 7,503,489 B2 | 3/2009 | Heffez |
| 7,505,931 B2 | 3/2009 | Silva |
| 7,509,117 B2 | 3/2009 | Yum |
| 7,509,278 B2 | 3/2009 | Jones |
| 7,512,221 B2 | 3/2009 | Toms |
| 7,529,698 B2 | 5/2009 | Joao |
| 7,530,097 B2 | 5/2009 | Casco-Arias et al. |
| 7,536,329 B2 | 5/2009 | Goldberg et al. |
| 7,536,348 B2 | 5/2009 | Shao et al. |
| 7,536,354 B1 | 5/2009 | deGroeve et al. |
| 7,542,468 B1 | 6/2009 | Begley et al. |
| 7,542,922 B2 | 6/2009 | Bennett et al. |
| 7,542,993 B2 | 6/2009 | Satterfield et al. |
| 7,543,739 B2 | 6/2009 | Brown et al. |
| 7,546,271 B1 | 6/2009 | Chmielewski et al. |
| 7,548,886 B2 | 6/2009 | Kirkland et al. |
| 7,552,080 B1 | 6/2009 | Willard et al. |
| 7,552,086 B1 | 6/2009 | Rajasekar et al. |
| 7,552,089 B2 | 6/2009 | Bruer et al. |
| 7,552,190 B1 | 6/2009 | Freishtat et al. |
| 7,552,467 B2 | 6/2009 | Lindsay |
| 7,555,459 B2 | 6/2009 | Dhar et al. |
| 7,558,748 B2 | 7/2009 | Ehring et al. |
| 7,558,777 B1 | 7/2009 | Santos |
| 7,558,795 B2 | 7/2009 | Malik et al. |
| 7,559,217 B2 | 7/2009 | Bass |
| 7,562,184 B2 | 7/2009 | Henmi et al. |
| 7,562,382 B2 | 7/2009 | Hinton et al. |
| 7,562,814 B1 | 7/2009 | Shao et al. |
| 7,571,138 B2 | 8/2009 | Miri et al. |
| 7,571,322 B2 | 8/2009 | Karoubi |
| 7,571,473 B1 | 8/2009 | Boydstun et al. |
| 7,575,157 B2 | 8/2009 | Barnhardt et al. |
| 7,577,665 B2 | 8/2009 | Ramer et al. |
| 7,577,934 B2 | 8/2009 | Anonsen et al. |
| 7,580,884 B2 | 8/2009 | Cook |
| 7,581,112 B2 | 8/2009 | Brown et al. |
| 7,583,682 B2 | 9/2009 | Hopkins |
| 7,584,126 B1 | 9/2009 | White |
| 7,584,146 B1 | 9/2009 | Duhon |
| 7,587,368 B2 | 9/2009 | Felsher |
| 7,593,891 B2 | 9/2009 | Kornegay et al. |
| 7,594,019 B2 | 9/2009 | Clapper |
| 7,596,716 B2 | 9/2009 | Frost et al. |
| 7,606,752 B2 | 10/2009 | Hazlehurst et al. |
| 7,610,216 B1 | 10/2009 | May et al. |
| 7,610,229 B1 | 10/2009 | Kornegay |
| 7,613,600 B2 | 11/2009 | Krane |
| 7,620,596 B2 | 11/2009 | Knudson et al. |
| 7,620,602 B2 | 11/2009 | Jakstadt et al. |
| 7,620,653 B1 | 11/2009 | Swartz |
| 7,623,844 B2 | 11/2009 | Herrmann et al. |
| 7,624,433 B1 | 11/2009 | Clark et al. |
| 7,630,903 B1 | 12/2009 | Vaidyanathan |
| 7,630,932 B2 | 12/2009 | Danaher et al. |
| 7,630,933 B2 | 12/2009 | Peterson et al. |
| 7,631,803 B2 | 12/2009 | Peyret et al. |
| 7,634,651 B1 | 12/2009 | Gerde et al. |
| 7,634,737 B2 | 12/2009 | Beringer et al. |
| 7,636,686 B2 | 12/2009 | Pierdinock et al. |
| 7,640,200 B2 | 12/2009 | Gardner et al. |
| 7,640,209 B1 | 12/2009 | Brooks et al. |
| 7,644,023 B2 | 1/2010 | Kumar et al. |
| 7,644,035 B1 | 1/2010 | Biffle et al. |
| 7,644,285 B1 | 1/2010 | Murray et al. |
| 7,647,274 B2 | 1/2010 | Peterson et al. |
| 7,647,344 B2 | 1/2010 | Skurtovich, Jr. et al. |
| 7,653,592 B1 | 1/2010 | Flaxman et al. |
| 7,653,600 B2 | 1/2010 | Gustin |

(56) References Cited

U.S. PATENT DOCUMENTS

| | | |
|---|---|---|
| 7,653,613 B1 | 1/2010 | DeGraaff et al. |
| 7,653,688 B2 | 1/2010 | Bittner |
| 7,664,725 B2 | 2/2010 | Murray et al. |
| 7,665,657 B2 | 2/2010 | Huh |
| 7,672,833 B2 | 3/2010 | Blume et al. |
| 7,672,865 B2 | 3/2010 | Kumar et al. |
| 7,672,879 B1 | 3/2010 | Kumar et al. |
| 7,672,944 B1 | 3/2010 | Holladay et al. |
| 7,676,410 B2 | 3/2010 | Petralia |
| 7,676,463 B2 | 3/2010 | Thompson et al. |
| 7,680,772 B2 | 3/2010 | Kronberg |
| 7,685,209 B1 | 3/2010 | Norton et al. |
| 7,685,525 B2 | 3/2010 | Kumar et al. |
| 7,686,214 B1 | 3/2010 | Shao et al. |
| 7,688,813 B2 | 3/2010 | Shin et al. |
| 7,689,487 B1 | 3/2010 | Britto et al. |
| 7,689,505 B2 | 3/2010 | Kasower |
| 7,689,563 B1 | 3/2010 | Jacobson |
| 7,690,032 B1 | 3/2010 | Peirce |
| 7,693,787 B2 | 4/2010 | Provinse |
| 7,697,520 B2 | 4/2010 | Hopkins |
| 7,698,214 B1 | 4/2010 | Lindgren |
| 7,698,217 B1 | 4/2010 | Phillips et al. |
| 7,702,576 B2 | 4/2010 | Fahner et al. |
| 7,707,117 B1 | 4/2010 | Jimenez et al. |
| 7,707,122 B2 | 4/2010 | Hull et al. |
| 7,707,271 B2 | 4/2010 | Rudkin et al. |
| 7,708,190 B2 | 5/2010 | Brandt et al. |
| 7,711,626 B2 | 5/2010 | Nanjundamoorthy et al. |
| 7,711,635 B2 | 5/2010 | Steele et al. |
| 7,711,707 B2 | 5/2010 | Kelley |
| 7,715,832 B2 | 5/2010 | Zhou |
| 7,720,705 B2 | 5/2010 | Stein |
| 7,720,750 B2 | 5/2010 | Brody |
| 7,720,846 B1 | 5/2010 | Bayliss |
| 7,725,385 B2 | 5/2010 | Royer et al. |
| 7,729,283 B2 | 6/2010 | Ferguson et al. |
| 7,729,959 B1 | 6/2010 | Wells et al. |
| 7,729,969 B1 | 6/2010 | Smith, III et al. |
| 7,730,078 B2 | 6/2010 | Schwabe et al. |
| 7,734,522 B2 | 6/2010 | Johnson et al. |
| 7,734,541 B2 | 6/2010 | Kumar et al. |
| 7,734,637 B2 | 6/2010 | Greifeneder et al. |
| 7,739,193 B2 | 6/2010 | Zimmer et al. |
| 7,739,707 B2 | 6/2010 | Sie et al. |
| 7,747,520 B2 | 6/2010 | Livermore et al. |
| 7,747,521 B2 | 6/2010 | Serio |
| 7,752,179 B1 | 7/2010 | Brown |
| 7,752,286 B2 | 7/2010 | Anderson et al. |
| 7,756,789 B2 | 7/2010 | Welker et al. |
| 7,757,944 B2 | 7/2010 | Cline et al. |
| 7,761,373 B2 | 7/2010 | Metz |
| 7,761,384 B2 | 7/2010 | Madhogarhia |
| 7,761,569 B2 | 7/2010 | Hopkins |
| 7,765,148 B2 | 7/2010 | German et al. |
| 7,765,166 B2 | 7/2010 | Beringer et al. |
| 7,765,279 B1 | 7/2010 | Kaib et al. |
| 7,765,525 B1 | 7/2010 | Davidson et al. |
| 7,769,697 B2 | 8/2010 | Fieschi et al. |
| 7,769,998 B2 | 8/2010 | Lynch et al. |
| 7,770,002 B2 | 8/2010 | Weber |
| 7,774,257 B2 | 8/2010 | Maggioncalda et al. |
| 7,774,270 B1 | 8/2010 | MacCloskey |
| 7,778,868 B2 | 8/2010 | Haugen et al. |
| 7,783,515 B1 | 8/2010 | Kumar et al. |
| 7,783,749 B2 | 8/2010 | Hopkins |
| 7,787,869 B2 | 8/2010 | Rice et al. |
| 7,788,040 B2 | 8/2010 | Haskell et al. |
| 7,792,715 B1 | 9/2010 | Kasower |
| 7,792,725 B2 | 9/2010 | Booraem et al. |
| 7,792,747 B2 | 9/2010 | Chin |
| 7,792,903 B2 | 9/2010 | Fischer et al. |
| 7,793,835 B1 | 9/2010 | Coggeshall et al. |
| 7,797,224 B2 | 9/2010 | Barone et al. |
| 7,797,252 B2 | 9/2010 | Rosskamm et al. |
| 7,797,644 B1 | 9/2010 | Bhojan |
| 7,797,734 B2 | 9/2010 | Babi et al. |
| 7,801,807 B2 | 9/2010 | DeFrancesco et al. |
| 7,801,811 B1 | 9/2010 | Merrell et al. |
| 7,801,828 B2 | 9/2010 | Candella et al. |
| 7,801,896 B2 | 9/2010 | Szabo |
| 7,801,956 B2 | 9/2010 | Cumberbatch et al. |
| 7,802,104 B2 | 9/2010 | Dickinson |
| 7,805,348 B2 | 9/2010 | Nanjundamoorthy et al. |
| 7,805,362 B1 | 9/2010 | Merrell et al. |
| 7,805,439 B2 | 9/2010 | Elliott et al. |
| 7,809,398 B2 | 10/2010 | Pearson |
| 7,809,624 B1 | 10/2010 | Smith, III et al. |
| 7,809,797 B2 | 10/2010 | Cooley et al. |
| 7,810,036 B2 | 10/2010 | Bales et al. |
| 7,814,002 B2 | 10/2010 | DeFrancesco et al. |
| 7,814,005 B2 | 10/2010 | Imrey et al. |
| 7,814,431 B1 | 10/2010 | Quinn et al. |
| 7,818,228 B1 | 10/2010 | Coulter |
| 7,818,229 B2 | 10/2010 | Imrey et al. |
| 7,818,382 B2 | 10/2010 | Sommerer |
| 7,822,624 B2 | 10/2010 | Erdmann et al. |
| 7,822,667 B1 | 10/2010 | Smith, III et al. |
| 7,827,108 B2 | 11/2010 | Perlman et al. |
| 7,827,115 B2 | 11/2010 | Weller et al. |
| 7,831,609 B1 | 11/2010 | Alexander |
| 7,832,006 B2 | 11/2010 | Chen et al. |
| 7,835,983 B2 | 11/2010 | Lefner et al. |
| 7,835,990 B2 | 11/2010 | Coleman |
| 7,840,484 B2 | 11/2010 | Haggerty et al. |
| 7,840,597 B2 | 11/2010 | Showalter et al. |
| 7,840,674 B1 | 11/2010 | Sterling |
| 7,841,004 B1 | 11/2010 | Balducci et al. |
| 7,841,008 B1 | 11/2010 | Cole et al. |
| 7,844,520 B1 | 11/2010 | Franklin |
| 7,844,604 B2 | 11/2010 | Baio et al. |
| 7,848,972 B1 | 12/2010 | Sharma |
| 7,848,978 B2 | 12/2010 | Imrey et al. |
| 7,849,014 B2 | 12/2010 | Erikson |
| 7,849,397 B1 | 12/2010 | Ahmed |
| 7,853,493 B2 | 12/2010 | DeBie et al. |
| 7,853,522 B2 | 12/2010 | Chin |
| 7,856,203 B2 | 12/2010 | Lipovski |
| 7,856,376 B2 | 12/2010 | Storey |
| 7,856,386 B2 | 12/2010 | Hazlehurst et al. |
| 7,856,453 B2 | 12/2010 | Malik et al. |
| 7,860,769 B2 | 12/2010 | Benson |
| 7,860,790 B2 | 12/2010 | Monk |
| 7,865,412 B1 | 1/2011 | Weiss et al. |
| 7,866,548 B2 | 1/2011 | Reed et al. |
| 7,870,066 B2 | 1/2011 | Lin et al. |
| 7,870,068 B2 | 1/2011 | Chin |
| 7,870,078 B2 | 1/2011 | Clark et al. |
| 7,870,485 B2 | 1/2011 | Seliutin et al. |
| 7,870,491 B1 | 1/2011 | Henderson et al. |
| 7,873,563 B2 | 1/2011 | Barone et al. |
| 7,873,573 B2 | 1/2011 | Realini |
| 7,873,677 B2 | 1/2011 | Messing et al. |
| 7,877,304 B1 | 1/2011 | Coulter |
| 7,877,402 B1 | 1/2011 | Weiss et al. |
| 7,877,784 B2 | 1/2011 | Chow et al. |
| 7,880,728 B2 | 2/2011 | de los Reyes et al. |
| 7,890,403 B1 | 2/2011 | Smith |
| 7,895,227 B1 | 2/2011 | Henderson |
| 7,899,750 B1 | 3/2011 | Klieman et al. |
| 7,899,757 B1 | 3/2011 | Talan et al. |
| 7,904,447 B1 | 3/2011 | Russell et al. |
| 7,904,899 B2 | 3/2011 | Robalewski et al. |
| 7,908,242 B1 | 3/2011 | Achanta |
| 7,909,246 B2 | 3/2011 | Hogg et al. |
| 7,911,673 B1 | 3/2011 | Yap |
| 7,912,778 B2 | 3/2011 | Nanjundamoorthy |
| 7,912,842 B1 | 3/2011 | Bayliss |
| 7,912,865 B2 | 3/2011 | Akerman et al. |
| 7,913,173 B2 | 3/2011 | Hebard et al. |
| 7,917,412 B1 | 3/2011 | Wang et al. |
| 7,917,754 B1 | 3/2011 | Harrison et al. |
| 7,925,285 B2 | 4/2011 | Indirabhai |
| 7,925,582 B1 | 4/2011 | Kornegay et al. |

(56) References Cited

U.S. PATENT DOCUMENTS

| | | |
|---|---|---|
| 7,925,982 B2 | 4/2011 | Parker |
| 7,930,239 B2 | 4/2011 | Pierdinock et al. |
| 7,930,285 B2 | 4/2011 | Abraham et al. |
| 7,930,302 B2 | 4/2011 | Bandaru et al. |
| 7,930,411 B1 | 4/2011 | Hayward |
| 7,933,834 B2 | 4/2011 | Kumar et al. |
| 7,937,325 B2 | 5/2011 | Kumar et al. |
| 7,941,560 B1 | 5/2011 | Friesen et al. |
| 7,953,213 B2 | 5/2011 | Babi et al. |
| 7,954,698 B1 | 6/2011 | Pliha |
| 7,958,046 B2 | 6/2011 | Doerner et al. |
| 7,962,361 B2 | 6/2011 | Ramchandani et al. |
| 7,965,275 B1 | 6/2011 | Lew |
| 7,966,192 B2 | 6/2011 | Pagliari et al. |
| 7,966,325 B2 | 6/2011 | Singh |
| 7,970,676 B2 | 6/2011 | Feinstein |
| 7,970,679 B2 | 6/2011 | Kasower |
| 7,970,698 B2 | 6/2011 | Gupta et al. |
| 7,970,701 B2 | 6/2011 | Lewis et al. |
| 7,970,796 B1 | 6/2011 | Narayanan |
| 7,971,141 B1 | 6/2011 | Quinn et al. |
| 7,975,299 B1 | 7/2011 | Balducci et al. |
| 7,979,908 B2 | 7/2011 | Millwee |
| 7,983,932 B2 | 7/2011 | Kane |
| 7,983,979 B2 | 7/2011 | Holland, IV |
| 7,984,436 B1 | 7/2011 | Murray |
| 7,987,173 B2 | 7/2011 | Alexander |
| 7,987,501 B2 | 7/2011 | Miller et al. |
| 7,990,895 B2 | 8/2011 | Ferguson et al. |
| 7,991,673 B2 | 8/2011 | Kumar et al. |
| 7,991,688 B2 | 8/2011 | Phelan et al. |
| 8,001,041 B2 | 8/2011 | Hoadley et al. |
| 8,001,153 B2 | 8/2011 | Skurtovich, Jr. et al. |
| 8,001,235 B2 | 8/2011 | Russ et al. |
| 8,001,582 B2 | 8/2011 | Hulten et al. |
| 8,005,755 B2 | 8/2011 | Freishtat et al. |
| 8,006,261 B1 | 8/2011 | Haberman et al. |
| 8,010,422 B1 | 8/2011 | Lascelles et al. |
| 8,010,674 B2 | 8/2011 | Fong |
| 8,014,756 B1 | 9/2011 | Henderson |
| 8,015,083 B1 | 9/2011 | Sterling et al. |
| 8,015,107 B2 | 9/2011 | Kornegay et al. |
| 8,019,066 B1 | 9/2011 | Efrati et al. |
| 8,024,660 B1 | 9/2011 | Quinn et al. |
| 8,027,975 B2 | 9/2011 | Gabriel et al. |
| 8,032,822 B1 | 10/2011 | Artamonov et al. |
| 8,032,930 B2 | 10/2011 | Hicks |
| 8,032,932 B2 | 10/2011 | Speyer et al. |
| 8,036,941 B2 | 10/2011 | Bennett et al. |
| 8,037,097 B2 | 10/2011 | Guo et al. |
| 8,037,115 B1 | 10/2011 | Scalora et al. |
| 8,037,176 B2 | 10/2011 | Hopkins |
| 8,041,127 B2 | 10/2011 | Whitelaw |
| 8,051,074 B2 | 11/2011 | Eom et al. |
| 8,055,904 B1 | 11/2011 | Cato et al. |
| 8,060,404 B2 | 11/2011 | Storey |
| 8,060,424 B2 | 11/2011 | Kasower |
| 8,060,438 B2 | 11/2011 | Dhar et al. |
| 8,060,508 B2 | 11/2011 | Gabriel et al. |
| 8,060,532 B2 | 11/2011 | White et al. |
| 8,060,916 B2 | 11/2011 | Bajaj et al. |
| 8,065,175 B1 | 11/2011 | Lewis |
| 8,065,233 B2 | 11/2011 | Lee et al. |
| 8,065,367 B1 | 11/2011 | Stanley |
| 8,069,213 B2 | 11/2011 | Bloch et al. |
| 8,069,407 B1 | 11/2011 | Armandpour et al. |
| 8,073,785 B1 | 12/2011 | Candella et al. |
| 8,074,453 B2 | 12/2011 | Shaw |
| 8,078,516 B1 | 12/2011 | Weiss et al. |
| 8,078,524 B2 | 12/2011 | Crawford et al. |
| 8,078,527 B2 | 12/2011 | Cerise et al. |
| 8,078,528 B1 | 12/2011 | Vicente et al. |
| 8,078,881 B1 | 12/2011 | Liu |
| 8,078,986 B1 | 12/2011 | Rhyne et al. |
| 8,086,508 B2 | 12/2011 | Dheer et al. |
| 8,086,525 B2 | 12/2011 | Atwood et al. |
| 8,090,794 B1 | 1/2012 | Kilat et al. |
| 8,095,443 B2 | 1/2012 | DeBie |
| 8,095,458 B2 | 1/2012 | Peterson et al. |
| 8,095,534 B1 | 1/2012 | Alexander |
| 8,095,614 B2 | 1/2012 | Hopkins |
| 8,098,239 B1 | 1/2012 | Moore |
| 8,099,309 B1 | 1/2012 | Bober |
| 8,099,341 B2 | 1/2012 | Varghese |
| 8,099,356 B2 | 1/2012 | Feinstein et al. |
| 8,099,376 B2 | 1/2012 | Serrano-Morales et al. |
| 8,103,587 B2 | 1/2012 | Kumar et al. |
| 8,104,671 B2 | 1/2012 | Besecker et al. |
| 8,104,679 B2 | 1/2012 | Brown |
| 8,108,301 B2 | 1/2012 | Gupta et al. |
| 8,117,648 B2 | 2/2012 | Slaton et al. |
| 8,122,133 B2 | 2/2012 | Hopkins |
| 8,126,456 B2 | 2/2012 | Lotter et al. |
| 8,126,820 B1 | 2/2012 | Talan et al. |
| 8,127,982 B1 | 3/2012 | Casey et al. |
| 8,127,986 B1 | 3/2012 | Taylor et al. |
| 8,130,075 B1 | 3/2012 | Hingole |
| 8,131,598 B2 | 3/2012 | Goolkasian et al. |
| 8,131,685 B1 | 3/2012 | Gedalius et al. |
| 8,131,777 B2 | 3/2012 | McCullouch |
| 8,131,846 B1 | 3/2012 | Hernacki et al. |
| 8,140,847 B1 | 3/2012 | Wu |
| 8,145,189 B2 | 3/2012 | Power et al. |
| 8,145,554 B2 | 3/2012 | Kumar et al. |
| 8,150,161 B2 | 4/2012 | Laaser et al. |
| 8,151,343 B1 | 4/2012 | Wang et al. |
| 8,151,344 B1 | 4/2012 | Channakeshava |
| 8,155,950 B1 | 4/2012 | Bickerstaff |
| 8,156,175 B2 | 4/2012 | Hopkins |
| 8,160,624 B2 | 4/2012 | Kumar et al. |
| 8,160,960 B1 | 4/2012 | Fei et al. |
| 8,171,471 B1 | 5/2012 | Daly |
| 8,175,889 B1 | 5/2012 | Girulat et al. |
| 8,194,956 B2 | 6/2012 | Chandler |
| 8,195,549 B2 | 6/2012 | Kasower |
| 8,196,113 B2 | 6/2012 | Miller et al. |
| 8,200,966 B2 | 6/2012 | Grinberg et al. |
| 8,201,257 B1 | 6/2012 | Andres et al. |
| 8,204,812 B2 | 6/2012 | Stewart et al. |
| 8,209,659 B2 | 6/2012 | Mathew |
| 8,219,473 B2 | 7/2012 | Gardner et al. |
| 8,219,771 B2 | 7/2012 | Le Neel |
| 8,224,723 B2 | 7/2012 | Bosch et al. |
| 8,224,747 B2 | 7/2012 | Kumar et al. |
| 8,224,974 B1 | 7/2012 | Flora et al. |
| 8,225,270 B2 | 7/2012 | Frasher et al. |
| 8,225,288 B2 | 7/2012 | Miller et al. |
| 8,225,383 B1 | 7/2012 | Channakeshava et al. |
| 8,225,395 B2 | 7/2012 | Atwood et al. |
| 8,229,850 B2 | 7/2012 | Dilip et al. |
| 8,229,911 B2 | 7/2012 | Bennett |
| 8,234,498 B2 | 7/2012 | Britti et al. |
| 8,244,635 B2 | 8/2012 | Freishtat et al. |
| 8,244,646 B2 | 8/2012 | Johnston et al. |
| 8,244,848 B1 | 8/2012 | Narayanan et al. |
| 8,249,965 B2 | 8/2012 | Tumminaro |
| 8,249,968 B1 | 8/2012 | Oldham et al. |
| 8,255,298 B1 | 8/2012 | Nesladek |
| 8,255,868 B1 | 8/2012 | Robalewski |
| 8,255,978 B2 | 8/2012 | Dick |
| 8,256,013 B1 | 8/2012 | Hernacki et al. |
| 8,260,649 B2 | 9/2012 | Ramanujan et al. |
| 8,260,699 B2 | 9/2012 | Smith et al. |
| 8,260,805 B1 | 9/2012 | Venu et al. |
| 8,261,204 B1 | 9/2012 | Huynh et al. |
| 8,261,334 B2 | 9/2012 | Hazlehurst et al. |
| 8,261,974 B2 | 9/2012 | Hull |
| 8,266,065 B2 | 9/2012 | Dilip et al. |
| 8,266,515 B2 | 9/2012 | Satyavolu |
| 8,271,362 B2 | 9/2012 | Fasching |
| 8,271,393 B2 | 9/2012 | Twining et al. |
| 8,271,650 B2 | 9/2012 | Alexander |
| 8,271,894 B1 | 9/2012 | Mayers |
| 8,271,899 B1 | 9/2012 | Blackburn et al. |

(56) References Cited

U.S. PATENT DOCUMENTS

| | | |
|---|---|---|
| 8,271,906 B1 | 9/2012 | Fong |
| 8,271,961 B1 | 9/2012 | Chithambaram |
| 8,275,683 B2 | 9/2012 | Wolfson et al. |
| 8,280,723 B1 | 10/2012 | Laaser |
| 8,280,879 B2 | 10/2012 | Alexander |
| 8,281,372 B1 | 10/2012 | Vidal |
| 8,285,613 B1 | 10/2012 | Coulter |
| 8,285,640 B2 | 10/2012 | Scipioni |
| 8,285,641 B2 | 10/2012 | Cataline et al. |
| 8,285,656 B1 | 10/2012 | Chang et al. |
| 8,290,835 B2 | 10/2012 | Homer et al. |
| 8,290,840 B2 | 10/2012 | Kasower |
| 8,290,845 B2 | 10/2012 | Leibon et al. |
| 8,290,856 B1 | 10/2012 | Kasower |
| 8,290,941 B2 | 10/2012 | Alexander |
| 8,296,206 B1 | 10/2012 | Del Favero et al. |
| 8,296,229 B1 | 10/2012 | Yellin et al. |
| 8,306,255 B1 | 11/2012 | Degnan |
| 8,306,889 B2 | 11/2012 | Leibon et al. |
| 8,311,792 B1 | 11/2012 | Podgorny et al. |
| 8,312,033 B1 | 11/2012 | McMillan |
| 8,320,944 B1 | 11/2012 | Gibson et al. |
| 8,321,339 B2 | 11/2012 | Imrey et al. |
| 8,321,413 B2 | 11/2012 | Gabriel et al. |
| 8,324,080 B2 | 12/2012 | Yang et al. |
| 8,326,725 B2 | 12/2012 | Elwell et al. |
| 8,327,429 B2 | 12/2012 | Speyer et al. |
| 8,335,741 B2 | 12/2012 | Kornegay et al. |
| 8,341,545 B2 | 12/2012 | Hebard |
| 8,346,226 B2 | 1/2013 | Gibson et al. |
| 8,346,615 B2 | 1/2013 | Connors et al. |
| 8,347,364 B2 | 1/2013 | Babi et al. |
| 8,352,564 B1 | 1/2013 | Campise et al. |
| 8,353,027 B2 | 1/2013 | Dennis et al. |
| 8,353,029 B2 | 1/2013 | Morgan et al. |
| 8,355,935 B2 | 1/2013 | Hellman et al. |
| 8,355,967 B2 | 1/2013 | Debie et al. |
| 8,359,278 B2 | 1/2013 | Domenikos et al. |
| 8,364,662 B1 | 1/2013 | Moyer et al. |
| 8,364,969 B2 | 1/2013 | King |
| 8,370,340 B1 | 2/2013 | Yu et al. |
| 8,374,885 B2 | 2/2013 | Stibel et al. |
| 8,374,973 B2 | 2/2013 | Herbrich et al. |
| 8,375,331 B1 | 2/2013 | Mayers |
| 8,380,803 B1 | 2/2013 | Stibel et al. |
| 8,381,120 B2 | 2/2013 | Stibel et al. |
| 8,386,966 B1 | 2/2013 | Attinasi et al. |
| 8,392,230 B2 | 3/2013 | Stibel et al. |
| 8,392,969 B1 | 3/2013 | Park et al. |
| 8,396,743 B2 | 3/2013 | Alvin |
| 8,396,747 B2 | 3/2013 | Bachenheimer |
| 8,400,970 B2 | 3/2013 | Bajar et al. |
| 8,401,875 B2 | 3/2013 | Fish et al. |
| 8,402,526 B2 | 3/2013 | Ahn |
| 8,407,141 B2 | 3/2013 | Mullen et al. |
| 8,407,194 B1 | 3/2013 | Chaput et al. |
| 8,412,593 B1 | 4/2013 | Song et al. |
| 8,413,239 B2 | 4/2013 | Sutton et al. |
| 8,417,644 B2 | 4/2013 | Ferguson et al. |
| 8,423,285 B2 | 4/2013 | Paterson et al. |
| 8,429,073 B2 | 4/2013 | Ferguson et al. |
| 8,432,275 B2 | 4/2013 | Patel et al. |
| 8,433,654 B2 | 4/2013 | Subbarao et al. |
| 8,443,202 B2 | 5/2013 | White et al. |
| 8,453,068 B2 | 5/2013 | Stibel et al. |
| 8,453,218 B2 | 5/2013 | Lan et al. |
| 8,456,293 B1 | 6/2013 | Trundle et al. |
| 8,458,062 B2 | 6/2013 | Dutt et al. |
| 8,463,595 B1 | 6/2013 | Rehling et al. |
| 8,463,939 B1 | 6/2013 | Galvin |
| 8,464,939 B1 | 6/2013 | Taylor et al. |
| 8,468,028 B2 | 6/2013 | Stibel et al. |
| 8,473,318 B2 | 6/2013 | Nielson et al. |
| 8,478,674 B1 | 7/2013 | Kapczynski et al. |
| 8,484,186 B1 | 7/2013 | Kapczynski et al. |
| 8,489,480 B2 | 7/2013 | Kassir |
| 8,490,197 B2 | 7/2013 | Herz |
| 8,494,973 B1 | 7/2013 | Dignan et al. |
| 8,498,914 B2 | 7/2013 | Hazelhurst |
| 8,498,944 B2 | 7/2013 | Solomon |
| 8,499,348 B1 | 7/2013 | Rubin |
| 8,504,470 B1 | 8/2013 | Chirehdast |
| 8,515,828 B1 | 8/2013 | Wolf et al. |
| 8,515,844 B2 | 8/2013 | Kasower |
| 8,527,357 B1 | 9/2013 | Ganesan |
| 8,527,596 B2 | 9/2013 | Long et al. |
| 8,533,118 B2 | 9/2013 | Weller et al. |
| 8,539,599 B2 | 9/2013 | Gomez et al. |
| 8,543,498 B2 | 9/2013 | Silbernagel et al. |
| 8,544,091 B2 | 9/2013 | Stibel |
| 8,548,903 B2 | 10/2013 | Becker |
| 8,554,584 B2 | 10/2013 | Hargroder |
| 8,555,357 B1 | 10/2013 | Gauvin |
| 8,560,161 B1 | 10/2013 | Kator et al. |
| 8,560,436 B2 | 10/2013 | Ingram et al. |
| 8,560,438 B2 | 10/2013 | Hankey et al. |
| 8,560,444 B2 | 10/2013 | Rosenblatt et al. |
| 8,560,447 B1 | 10/2013 | Hinghole et al. |
| 8,566,187 B2 | 10/2013 | Keld et al. |
| 8,572,083 B1 | 10/2013 | Snell et al. |
| 8,578,036 B1 | 11/2013 | Holfelder et al. |
| 8,578,496 B1 | 11/2013 | Krishnappa |
| 8,600,768 B2 | 12/2013 | Stibel et al. |
| 8,600,886 B2 | 12/2013 | Ramavarjula et al. |
| 8,601,602 B1 | 12/2013 | Zheng |
| 8,606,694 B2 | 12/2013 | Campbell et al. |
| 8,606,869 B2 | 12/2013 | Stibel et al. |
| 8,626,137 B1 | 1/2014 | Devitt et al. |
| 8,626,637 B1 | 1/2014 | Gooch et al. |
| 8,630,893 B2 | 1/2014 | Stibel et al. |
| 8,630,938 B2 | 1/2014 | Cheng et al. |
| 8,639,930 B2 | 1/2014 | Stibel et al. |
| 8,646,051 B2 | 2/2014 | Paden et al. |
| 8,650,189 B2 | 2/2014 | Fertik et al. |
| 8,660,541 B1 | 2/2014 | Beresniewicz et al. |
| 8,660,919 B2 | 2/2014 | Kasower |
| 8,671,115 B2 | 3/2014 | Skurtovich, Jr. et al. |
| 8,676,684 B2 | 3/2014 | Newman et al. |
| 8,688,543 B2 | 4/2014 | Dominguez |
| 8,689,001 B1 | 4/2014 | Satish |
| 8,694,420 B1 | 4/2014 | Oliai |
| 8,705,718 B2 | 4/2014 | Baniak et al. |
| 8,706,599 B1 | 4/2014 | Koenig et al. |
| 8,706,616 B1 | 4/2014 | Flynn |
| 8,712,789 B2 | 4/2014 | Stibel et al. |
| 8,712,907 B1 | 4/2014 | Stibel et al. |
| 8,713,651 B1 | 4/2014 | Stibel |
| 8,725,605 B1 | 5/2014 | Plunkett |
| 8,725,613 B1 | 5/2014 | Celka et al. |
| 8,732,004 B1 | 5/2014 | Ramos et al. |
| 8,732,803 B2 | 5/2014 | Stibel et al. |
| 8,738,449 B2 | 5/2014 | Cupps et al. |
| 8,738,516 B1 | 5/2014 | Dean et al. |
| 8,745,698 B1 | 6/2014 | Ashfield et al. |
| 8,751,378 B2 | 6/2014 | Dornhelm et al. |
| 8,768,914 B2 | 7/2014 | Scriffignano et al. |
| 8,781,951 B2 | 7/2014 | Lewis et al. |
| 8,781,953 B2 | 7/2014 | Kasower |
| 8,782,217 B1 | 7/2014 | Arone et al. |
| 8,818,888 B1 | 8/2014 | Kapczynski et al. |
| 8,819,789 B2 | 8/2014 | Orttung et al. |
| 8,825,544 B2 | 9/2014 | Imrey et al. |
| 8,856,894 B1 | 10/2014 | Dean et al. |
| 8,856,945 B2 | 10/2014 | Carter et al. |
| 8,860,763 B2 | 10/2014 | Privault et al. |
| 8,868,914 B2 | 10/2014 | Teppler |
| 8,882,509 B2 | 11/2014 | Nunamaker |
| 8,930,251 B2 | 1/2015 | DeBie |
| 8,930,263 B1 | 1/2015 | Mahacek et al. |
| 8,938,399 B1 | 1/2015 | Herman |
| 8,949,981 B1 | 2/2015 | Trollope et al. |
| 8,954,459 B1 | 2/2015 | McMillan et al. |
| 8,972,400 B1 | 3/2015 | Kapczynski et al. |
| 9,002,753 B2 | 4/2015 | Anschutz et al. |

(56) References Cited

U.S. PATENT DOCUMENTS

| | | |
|---|---|---|
| 9,058,627 B1 | 6/2015 | Wasser et al. |
| 9,092,616 B2 | 7/2015 | Kumar et al. |
| 9,106,691 B1 | 8/2015 | Burger et al. |
| 9,111,281 B2 | 8/2015 | Stibel et al. |
| 9,118,614 B1 | 8/2015 | Rogers et al. |
| 9,147,042 B1 | 9/2015 | Haller et al. |
| 9,218,481 B2 | 10/2015 | Belisario |
| 9,183,377 B1 | 11/2015 | Sobel et al. |
| 9,202,200 B2 | 12/2015 | Stibel et al. |
| 9,225,704 B1 | 12/2015 | Johansson et al. |
| 9,230,283 B1 | 1/2016 | Taylor et al. |
| 9,256,624 B2 | 2/2016 | Skurtovich, Jr. et al. |
| 9,256,904 B1 | 2/2016 | Haller et al. |
| 9,324,080 B2 | 4/2016 | Shafron et al. |
| 9,349,145 B2 | 5/2016 | Rozman et al. |
| 9,400,589 B1 | 7/2016 | Wasser et al. |
| 9,406,085 B1 | 8/2016 | Hunt, III et al. |
| 9,418,213 B1 | 8/2016 | Roth et al. |
| 9,443,268 B1 | 9/2016 | Kapczynski et al. |
| 9,449,346 B1 | 9/2016 | Hockey et al. |
| 9,477,737 B1 | 10/2016 | Charyk et al. |
| 9,479,471 B2 | 10/2016 | Schoenrock |
| 9,483,606 B1 | 11/2016 | Dean et al. |
| 9,501,583 B2 | 11/2016 | Nordstrom et al. |
| 9,536,238 B2 | 1/2017 | Garrett et al. |
| 9,536,263 B1 | 1/2017 | Dean et al. |
| 9,542,553 B1 | 1/2017 | Burger et al. |
| 9,542,682 B1 | 1/2017 | Taylor et al. |
| 9,569,797 B1 | 2/2017 | Rohn et al. |
| 9,589,266 B2 | 3/2017 | Pourgallah et al. |
| 9,595,023 B1 | 3/2017 | Hockey et al. |
| 9,613,382 B1 | 4/2017 | Newstadt et al. |
| 9,619,751 B2 | 4/2017 | Woon et al. |
| 9,654,541 B1 | 5/2017 | Kapczynski et al. |
| 9,665,854 B1 | 5/2017 | Burger et al. |
| 9,697,568 B1 | 7/2017 | Hunt, III |
| 9,704,107 B1 | 7/2017 | Baker, IV et al. |
| 9,710,523 B2 | 7/2017 | Skurtovich, Jr. et al. |
| 9,710,852 B1 | 7/2017 | Olson et al. |
| 9,767,513 B1 | 9/2017 | Taylor et al. |
| 9,824,199 B2 | 11/2017 | Kshirsagar et al. |
| 9,830,646 B1 | 11/2017 | Wasser et al. |
| 9,853,959 B1 | 12/2017 | Kapczynski et al. |
| 9,870,589 B1 | 1/2018 | Arnold et al. |
| 9,892,457 B1 | 2/2018 | Kapczynski |
| 9,916,621 B1 | 3/2018 | Wasser et al. |
| 9,972,048 B1 | 5/2018 | Dean et al. |
| 9,990,674 B1 | 6/2018 | Taylor et al. |
| 10,002,075 B1 | 6/2018 | O'Leary et al. |
| 10,003,591 B2 | 6/2018 | Hockey et al. |
| 10,025,842 B1 | 7/2018 | Charyk et al. |
| 10,043,214 B1 | 8/2018 | Hunt, III |
| 10,061,936 B1 | 8/2018 | Burger et al. |
| 10,075,446 B2 | 9/2018 | McMillan et al. |
| 10,102,570 B1 | 10/2018 | Kapczynski et al. |
| 10,104,059 B2 | 10/2018 | Hockey et al. |
| 10,176,233 B1 | 1/2019 | Dean et al. |
| 10,187,341 B2 | 1/2019 | Schoenrock |
| 10,235,965 B2 * | 3/2019 | Horneff ................. A63F 13/533 |
| 10,255,598 B1 | 4/2019 | Dean et al. |
| 10,262,364 B2 | 4/2019 | Taylor et al. |
| 10,269,065 B1 | 4/2019 | Kapczynski et al. |
| 10,277,659 B1 | 4/2019 | Kapczynski et al. |
| D847,840 S | 5/2019 | Poschel et al. |
| D851,126 S | 6/2019 | Tauban |
| D851,127 S | 6/2019 | Tauban |
| D851,128 S | 6/2019 | Tauban |
| 10,319,029 B1 | 6/2019 | Hockey et al. |
| 10,325,314 B1 | 6/2019 | Kapczynski et al. |
| 10,366,450 B1 | 7/2019 | Mahacek et al. |
| 10,482,532 B1 | 11/2019 | Kapczynski |
| 10,523,653 B2 | 12/2019 | Hockey et al. |
| 10,530,761 B2 | 1/2020 | Hockey et al. |
| 10,614,463 B1 | 4/2020 | Hockey et al. |
| 10,614,519 B2 | 4/2020 | Taylor et al. |
| 10,621,657 B2 | 4/2020 | Kasower |
| 10,628,448 B1 | 4/2020 | Charyk et al. |
| 10,642,999 B2 | 5/2020 | Burger et al. |
| 10,671,749 B2 | 6/2020 | Felice-Steele et al. |
| 10,685,398 B1 | 6/2020 | Olson et al. |
| 10,686,773 B2 | 6/2020 | Britti et al. |
| 10,706,453 B1 | 7/2020 | Morin et al. |
| 10,726,491 B1 | 7/2020 | Hockey et al. |
| 10,798,113 B2 | 10/2020 | Muddu et al. |
| 10,798,197 B2 | 10/2020 | Dean et al. |
| 10,839,446 B1 | 11/2020 | Mupkala et al. |
| 10,878,499 B2 | 12/2020 | Taylor et al. |
| 10,880,313 B2 | 12/2020 | Manna et al. |
| 10,891,691 B2 | 1/2021 | Courbage et al. |
| 10,916,220 B2 * | 2/2021 | Ngo ........................ G06F 3/011 |
| 10,929,925 B1 | 2/2021 | Hunt, III |
| 10,949,428 B2 | 3/2021 | Poirel et al. |
| 10,963,959 B2 | 3/2021 | Wasser et al. |
| 11,012,491 B1 | 5/2021 | Kapczynski et al. |
| 11,025,629 B2 | 6/2021 | Chasman et al. |
| 11,025,638 B2 | 6/2021 | Ford et al. |
| 11,050,767 B2 | 6/2021 | Black et al. |
| 11,087,022 B2 | 8/2021 | Burger et al. |
| 11,113,759 B1 | 9/2021 | Kapczynski et al. |
| 11,132,742 B1 | 9/2021 | Wasser et al. |
| 11,157,872 B2 | 10/2021 | McMillan et al. |
| 11,200,620 B2 | 12/2021 | Dean et al. |
| 11,238,656 B1 | 2/2022 | Lin et al. |
| 11,265,324 B2 | 3/2022 | Felice-Steele et al. |
| 11,308,551 B1 | 4/2022 | Mahacek et al. |
| 11,315,179 B1 | 4/2022 | Rehder et al. |
| 11,356,430 B1 | 6/2022 | Kapczynski et al. |
| 11,373,109 B2 | 6/2022 | Zoldi et al. |
| 11,379,916 B1 | 7/2022 | Taylor et al. |
| 11,399,029 B2 | 7/2022 | Manna et al. |
| 11,425,144 B2 | 8/2022 | Bondugula et al. |
| 11,436,626 B2 | 9/2022 | Lawrence et al. |
| 11,461,364 B1 | 10/2022 | Charyk et al. |
| 11,489,834 B1 | 11/2022 | Carroll et al. |
| 11,514,519 B1 | 11/2022 | Hunt, III |
| 11,580,598 B1 | 2/2023 | Rehder et al. |
| 2001/0014878 A1 | 8/2001 | Mitra et al. |
| 2001/0029470 A1 | 10/2001 | Schultz et al. |
| 2001/0029482 A1 | 10/2001 | Tealdi et al. |
| 2001/0032181 A1 | 10/2001 | Jakstadt et al. |
| 2001/0034631 A1 | 10/2001 | Kiselik |
| 2001/0037204 A1 | 11/2001 | Horn et al. |
| 2001/0037289 A1 | 11/2001 | Mayr et al. |
| 2001/0039532 A1 | 11/2001 | Coleman, Jr. et al. |
| 2001/0039563 A1 | 11/2001 | Tian |
| 2001/0042785 A1 | 11/2001 | Walker et al. |
| 2001/0044729 A1 | 11/2001 | Pomerance |
| 2001/0044756 A1 | 11/2001 | Watkins et al. |
| 2001/0044764 A1 | 11/2001 | Arnold |
| 2001/0047332 A1 | 11/2001 | Gonen-Friedman et al. |
| 2001/0049274 A1 | 12/2001 | Degraeve |
| 2001/0053989 A1 | 12/2001 | Keller et al. |
| 2002/0010616 A1 | 1/2002 | Itzaki |
| 2002/0010635 A1 | 1/2002 | Tokiwa |
| 2002/0013827 A1 | 1/2002 | Edstrom et al. |
| 2002/0013899 A1 | 1/2002 | Faul |
| 2002/0023108 A1 | 2/2002 | Daswani et al. |
| 2002/0029192 A1 | 3/2002 | Nakagawa et al. |
| 2002/0032635 A1 | 3/2002 | Harris et al. |
| 2002/0033846 A1 | 3/2002 | Balasubramanian et al. |
| 2002/0035480 A1 | 3/2002 | Gordon et al. |
| 2002/0035520 A1 | 3/2002 | Weiss |
| 2002/0045154 A1 | 4/2002 | Wood et al. |
| 2002/0049624 A1 | 4/2002 | Raveis, Jr. |
| 2002/0052841 A1 | 5/2002 | Guthrie et al. |
| 2002/0055906 A1 | 5/2002 | Katz et al. |
| 2002/0059139 A1 | 5/2002 | Evans |
| 2002/0059201 A1 | 5/2002 | Work |
| 2002/0062249 A1 | 5/2002 | Iannacci |
| 2002/0069122 A1 | 6/2002 | Yun et al. |
| 2002/0069182 A1 | 6/2002 | Dwyer |
| 2002/0073017 A1 | 6/2002 | Robertson |
| 2002/0077964 A1 | 6/2002 | Brody et al. |
| 2002/0087460 A1 | 7/2002 | Hornung |

(56) References Cited

U.S. PATENT DOCUMENTS

| | | |
|---|---|---|
| 2002/0091635 A1 | 7/2002 | Dilip et al. |
| 2002/0099635 A1 | 7/2002 | Guiragosian |
| 2002/0103933 A1 | 8/2002 | Garon et al. |
| 2002/0111816 A1 | 8/2002 | Lortscher et al. |
| 2002/0111890 A1 | 8/2002 | Sloan et al. |
| 2002/0116247 A1 | 8/2002 | Tucker et al. |
| 2002/0116331 A1 | 8/2002 | Cataline et al. |
| 2002/0120537 A1 | 8/2002 | Morea et al. |
| 2002/0120757 A1 | 8/2002 | Sutherland et al. |
| 2002/0120846 A1 | 8/2002 | Stewart et al. |
| 2002/0126449 A1 | 9/2002 | Casebolt |
| 2002/0128917 A1 | 9/2002 | Grounds |
| 2002/0128962 A1 | 9/2002 | Kasower |
| 2002/0130894 A1 | 9/2002 | Young et al. |
| 2002/0133365 A1 | 9/2002 | Grey et al. |
| 2002/0133462 A1 | 9/2002 | Shteyn |
| 2002/0133504 A1 | 9/2002 | Vlahos et al. |
| 2002/0138409 A1 | 9/2002 | Bass |
| 2002/0138470 A1 | 9/2002 | Zhou |
| 2002/0143943 A1 | 10/2002 | Lee et al. |
| 2002/0147801 A1 | 10/2002 | Gullotta et al. |
| 2002/0149794 A1 | 10/2002 | Yoshioka et al. |
| 2002/0152166 A1 | 10/2002 | Dutta et al. |
| 2002/0156676 A1 | 10/2002 | Ahrens et al. |
| 2002/0161664 A1 | 10/2002 | Shaya et al. |
| 2002/0173994 A1 | 11/2002 | Ferguson, III |
| 2002/0174010 A1 | 11/2002 | Rice |
| 2002/0174016 A1 | 11/2002 | Cuervo |
| 2002/0174048 A1 | 11/2002 | Dheer et al. |
| 2002/0174061 A1 | 11/2002 | Srinivasan et al. |
| 2002/0188511 A1 | 12/2002 | Johnson et al. |
| 2002/0194120 A1 | 12/2002 | Russell et al. |
| 2002/0194140 A1 | 12/2002 | Makuck |
| 2002/0198800 A1 | 12/2002 | Shamrakov |
| 2002/0198806 A1 | 12/2002 | Blagg et al. |
| 2002/0198822 A1 | 12/2002 | Munoz et al. |
| 2002/0198830 A1 | 12/2002 | Randell et al. |
| 2003/0002671 A1 | 1/2003 | Inchalik et al. |
| 2003/0004853 A1 | 1/2003 | Ram et al. |
| 2003/0004855 A1 | 1/2003 | Dutta et al. |
| 2003/0004922 A1 | 1/2003 | Schmidt et al. |
| 2003/0007283 A1 | 1/2003 | Ostwald et al. |
| 2003/0009411 A1 | 1/2003 | Ram et al. |
| 2003/0009415 A1 | 1/2003 | Lutnick et al. |
| 2003/0009418 A1 | 1/2003 | Green et al. |
| 2003/0009426 A1 | 1/2003 | Ruiz-Sanchez |
| 2003/0018578 A1 | 1/2003 | Schultz |
| 2003/0023531 A1 | 1/2003 | Fergusson |
| 2003/0028466 A1 | 2/2003 | Jenson et al. |
| 2003/0028477 A1 | 2/2003 | Stevenson et al. |
| 2003/0028529 A1 | 2/2003 | Cheung |
| 2003/0036952 A1 | 2/2003 | Panttaja et al. |
| 2003/0036995 A1 | 2/2003 | Lazerson |
| 2003/0041019 A1 | 2/2003 | Vagim, III et al. |
| 2003/0041031 A1 | 2/2003 | Hedy |
| 2003/0046311 A1 | 3/2003 | Baidya et al. |
| 2003/0048294 A1 | 3/2003 | Arnold |
| 2003/0050929 A1 | 3/2003 | Bookman et al. |
| 2003/0061104 A1 | 3/2003 | Thomson et al. |
| 2003/0061155 A1 | 3/2003 | Chin |
| 2003/0061163 A1 | 3/2003 | Durfield |
| 2003/0069839 A1 | 4/2003 | Whittington et al. |
| 2003/0069943 A1 | 4/2003 | Bahrs et al. |
| 2003/0078897 A1 | 4/2003 | Florance et al. |
| 2003/0078926 A1 | 4/2003 | Uthe et al. |
| 2003/0088472 A1 | 5/2003 | Offutt et al. |
| 2003/0090586 A1 | 5/2003 | Jan et al. |
| 2003/0093289 A1 | 5/2003 | Thornley et al. |
| 2003/0093311 A1 | 5/2003 | Knowlson |
| 2003/0097342 A1 | 5/2003 | Whittingtom |
| 2003/0097380 A1 | 5/2003 | Mulhern et al. |
| 2003/0101111 A1 | 5/2003 | Dang et al. |
| 2003/0101344 A1 | 5/2003 | Wheeler et al. |
| 2003/0105646 A1 | 6/2003 | Siepser |
| 2003/0105710 A1 | 6/2003 | Barbara et al. |
| 2003/0105733 A1 | 6/2003 | Boreham |
| 2003/0105742 A1 | 6/2003 | Boreham et al. |
| 2003/0115133 A1 | 6/2003 | Bian |
| 2003/0154162 A1 | 8/2003 | Danaher et al. |
| 2003/0158960 A1 | 8/2003 | Engberg |
| 2003/0163435 A1 | 8/2003 | Payone |
| 2003/0163513 A1 | 8/2003 | Schaeck et al. |
| 2003/0163733 A1 | 8/2003 | Barriga-Caceres et al. |
| 2003/0171942 A1 | 9/2003 | Gaito |
| 2003/0186200 A1 | 10/2003 | Selix |
| 2003/0187768 A1 | 10/2003 | Ryan et al. |
| 2003/0187837 A1 | 10/2003 | Culliss |
| 2003/0191711 A1 | 10/2003 | Jamison et al. |
| 2003/0191731 A1 | 10/2003 | Stewart et al. |
| 2003/0195805 A1 | 10/2003 | Storey |
| 2003/0195859 A1 | 10/2003 | Lawrence |
| 2003/0200142 A1 | 10/2003 | Hicks et al. |
| 2003/0204429 A1 | 10/2003 | Botscheck et al. |
| 2003/0204752 A1 | 10/2003 | Garrison |
| 2003/0208412 A1 | 11/2003 | Hillestad et al. |
| 2003/0212745 A1 | 11/2003 | Caughey |
| 2003/0212909 A1 | 11/2003 | Chandrashekhar |
| 2003/0214775 A1 | 11/2003 | Fukuta et al. |
| 2003/0219709 A1 | 11/2003 | Olenick et al. |
| 2003/0220858 A1 | 11/2003 | Lam et al. |
| 2003/0225742 A1 | 12/2003 | Tenner et al. |
| 2003/0229504 A1 | 12/2003 | Hollister |
| 2003/0229580 A1 | 12/2003 | Gass et al. |
| 2003/0236701 A1 | 12/2003 | Rowney et al. |
| 2004/0001565 A1 | 1/2004 | Jones et al. |
| 2004/0006536 A1 | 1/2004 | Kawashima et al. |
| 2004/0010458 A1 | 1/2004 | Friedman |
| 2004/0015714 A1 | 1/2004 | Abraham et al. |
| 2004/0015715 A1 | 1/2004 | Brown |
| 2004/0019549 A1 | 1/2004 | Gulbrandsen |
| 2004/0019799 A1 | 1/2004 | Vering et al. |
| 2004/0024671 A1 | 2/2004 | Freund |
| 2004/0024709 A1 | 2/2004 | Yu et al. |
| 2004/0030574 A1 | 2/2004 | DiCostanzo et al. |
| 2004/0030649 A1 | 2/2004 | Nelson et al. |
| 2004/0039586 A1 | 2/2004 | Garvey et al. |
| 2004/0044563 A1 | 3/2004 | Stein |
| 2004/0044601 A1 | 3/2004 | Kim et al. |
| 2004/0044628 A1 | 3/2004 | Mathew et al. |
| 2004/0044673 A1 | 3/2004 | Brady et al. |
| 2004/0045028 A1 | 3/2004 | Harris |
| 2004/0046033 A1 | 3/2004 | Kolodziej et al. |
| 2004/0059786 A1 | 3/2004 | Caughey |
| 2004/0062213 A1 | 4/2004 | Koss |
| 2004/0083159 A1 | 4/2004 | Crosby et al. |
| 2004/0083230 A1 | 4/2004 | Caughey |
| 2004/0088237 A1 | 5/2004 | Moenickheim et al. |
| 2004/0088255 A1 | 5/2004 | Zielke et al. |
| 2004/0093278 A1 | 5/2004 | Burchetta et al. |
| 2004/0098418 A1 | 5/2004 | Hein |
| 2004/0098546 A1 | 5/2004 | Bashant et al. |
| 2004/0102197 A1 | 5/2004 | Dietz |
| 2004/0107250 A1 | 6/2004 | Marciano |
| 2004/0110119 A1 | 6/2004 | Riconda et al. |
| 2004/0111359 A1 | 6/2004 | Hudock |
| 2004/0117302 A1 | 6/2004 | Weichert et al. |
| 2004/0122681 A1 | 6/2004 | Ruvolo et al. |
| 2004/0122696 A1 | 6/2004 | Beringer |
| 2004/0122697 A1 | 6/2004 | Becerra et al. |
| 2004/0128150 A1 | 7/2004 | Lundegren |
| 2004/0128156 A1 | 7/2004 | Beringer et al. |
| 2004/0128215 A1 | 7/2004 | Florance et al. |
| 2004/0133440 A1 | 7/2004 | Carolan et al. |
| 2004/0133493 A1 | 7/2004 | Ford et al. |
| 2004/0133509 A1 | 7/2004 | McCoy et al. |
| 2004/0133513 A1 | 7/2004 | McCoy et al. |
| 2004/0133514 A1 | 7/2004 | Zielke et al. |
| 2004/0133515 A1 | 7/2004 | McCoy et al. |
| 2004/0138992 A1 | 7/2004 | DeFrancesco et al. |
| 2004/0138994 A1 | 7/2004 | DeFrancesco et al. |
| 2004/0138997 A1 | 7/2004 | DeFrancesco et al. |
| 2004/0141005 A1 | 7/2004 | Banatwala et al. |
| 2004/0143546 A1 | 7/2004 | Wood et al. |
| 2004/0143596 A1 | 7/2004 | Sirkin |

(56) References Cited

U.S. PATENT DOCUMENTS

| | | |
|---|---|---|
| 2004/0148200 A1 | 7/2004 | Hodges |
| 2004/0158723 A1 | 8/2004 | Root |
| 2004/0159700 A1 | 8/2004 | Khan et al. |
| 2004/0167793 A1 | 8/2004 | Masuoka et al. |
| 2004/0172360 A1 | 9/2004 | Mabrey et al. |
| 2004/0177035 A1 | 9/2004 | Silva |
| 2004/0186807 A1 | 9/2004 | Nathans et al. |
| 2004/0193538 A1 | 9/2004 | Raines |
| 2004/0193891 A1 | 9/2004 | Ollila |
| 2004/0198386 A1 | 10/2004 | Dupray |
| 2004/0199789 A1 | 10/2004 | Shaw et al. |
| 2004/0210661 A1 | 10/2004 | Thompson |
| 2004/0215584 A1 | 10/2004 | Yao |
| 2004/0215673 A1 | 10/2004 | Furukawa et al. |
| 2004/0220865 A1 | 11/2004 | Lozowski et al. |
| 2004/0220918 A1 | 11/2004 | Scriffignano et al. |
| 2004/0225545 A1 | 11/2004 | Turner et al. |
| 2004/0225609 A1 | 11/2004 | Greene |
| 2004/0225643 A1 | 11/2004 | Alpha et al. |
| 2004/0230499 A1 | 11/2004 | Stack |
| 2004/0230527 A1 | 11/2004 | Hansen et al. |
| 2004/0236688 A1 | 11/2004 | Bozeman |
| 2004/0243450 A1 | 12/2004 | Bernard, Jr. et al. |
| 2004/0243508 A1 | 12/2004 | Samson et al. |
| 2004/0243588 A1 | 12/2004 | Tanner et al. |
| 2004/0249811 A1 | 12/2004 | Shostack |
| 2004/0250107 A1 | 12/2004 | Guo |
| 2004/0254935 A1 | 12/2004 | Chagoly et al. |
| 2004/0255127 A1 | 12/2004 | Arnouse |
| 2004/0267714 A1 | 12/2004 | Frid et al. |
| 2005/0004864 A1 | 1/2005 | Lent et al. |
| 2005/0010494 A1 | 1/2005 | Mourad et al. |
| 2005/0010513 A1 | 1/2005 | Duckworth et al. |
| 2005/0015273 A1 | 1/2005 | Iyer |
| 2005/0021457 A1 | 1/2005 | Johnson et al. |
| 2005/0021551 A1 | 1/2005 | Silva et al. |
| 2005/0027632 A1 | 2/2005 | Zeitoun et al. |
| 2005/0027666 A1 | 2/2005 | Beck |
| 2005/0027817 A1 | 2/2005 | Novik et al. |
| 2005/0027983 A1 | 2/2005 | Klawon |
| 2005/0033660 A1 | 2/2005 | Solomon |
| 2005/0050027 A1 | 3/2005 | Yeh et al. |
| 2005/0055231 A1 | 3/2005 | Lee |
| 2005/0055296 A1 | 3/2005 | Hattersley et al. |
| 2005/0058262 A1 | 3/2005 | Timmins et al. |
| 2005/0060244 A1 | 3/2005 | Goolkasian et al. |
| 2005/0060332 A1 | 3/2005 | Bernstein et al. |
| 2005/0071328 A1 | 3/2005 | Lawrence |
| 2005/0080716 A1 | 4/2005 | Belyi et al. |
| 2005/0080723 A1 | 4/2005 | Burchetta et al. |
| 2005/0080796 A1 | 4/2005 | Midgley |
| 2005/0086126 A1 | 4/2005 | Patterson |
| 2005/0086261 A1 | 4/2005 | Mammone |
| 2005/0091164 A1 | 4/2005 | Varble |
| 2005/0097017 A1 | 5/2005 | Hanratty |
| 2005/0097039 A1 | 5/2005 | Kulcsar et al. |
| 2005/0097320 A1 | 5/2005 | Golan et al. |
| 2005/0102180 A1 | 5/2005 | Gailey et al. |
| 2005/0102209 A1 | 5/2005 | Sagrillo et al. |
| 2005/0105719 A1 | 5/2005 | Huda |
| 2005/0108396 A1 | 5/2005 | Bittner |
| 2005/0108631 A1 | 5/2005 | Amorin et al. |
| 2005/0114335 A1 | 5/2005 | Wesinger, Jr. et al. |
| 2005/0114344 A1 | 5/2005 | Wesinger, Jr. et al. |
| 2005/0114345 A1 | 5/2005 | Wesinger, Jr. et al. |
| 2005/0125291 A1 | 6/2005 | Demkiw Grayson et al. |
| 2005/0125397 A1 | 6/2005 | Gross et al. |
| 2005/0125686 A1 | 6/2005 | Brandt |
| 2005/0137899 A1 | 6/2005 | Davies et al. |
| 2005/0144143 A1 | 6/2005 | Freiberg |
| 2005/0154664 A1 | 7/2005 | Guy et al. |
| 2005/0154665 A1 | 7/2005 | Kerr |
| 2005/0154769 A1 | 7/2005 | Eckart et al. |
| 2005/0160051 A1 | 7/2005 | Johnson |
| 2005/0160280 A1 | 7/2005 | Caslin et al. |
| 2005/0171884 A1 | 8/2005 | Arnott |
| 2005/0198377 A1 | 9/2005 | Ferguson et al. |
| 2005/0203768 A1 | 9/2005 | Florance |
| 2005/0203844 A1 | 9/2005 | Ferguson et al. |
| 2005/0203864 A1 | 9/2005 | Schmidt et al. |
| 2005/0208461 A1 | 9/2005 | Krebs et al. |
| 2005/0216434 A1 | 9/2005 | Haveliwala et al. |
| 2005/0216524 A1 | 9/2005 | Gomes et al. |
| 2005/0216953 A1 | 9/2005 | Ellingson |
| 2005/0216955 A1 | 9/2005 | Wilkins et al. |
| 2005/0226224 A1 | 10/2005 | Lee et al. |
| 2005/0240578 A1 | 10/2005 | Biederman et al. |
| 2005/0251474 A1 | 11/2005 | Shinn et al. |
| 2005/0256766 A1 | 11/2005 | Garcia et al. |
| 2005/0267840 A1 | 12/2005 | Holm-Blagg et al. |
| 2005/0273431 A1 | 12/2005 | Abel et al. |
| 2005/0283415 A1 | 12/2005 | Studnitzer et al. |
| 2005/0288998 A1 | 12/2005 | Verma et al. |
| 2006/0004623 A1 | 1/2006 | Jasti |
| 2006/0004626 A1 | 1/2006 | Holmen et al. |
| 2006/0010391 A1 | 1/2006 | Uemura et al. |
| 2006/0031158 A1 | 2/2006 | Orman |
| 2006/0031177 A1 | 2/2006 | Rule |
| 2006/0032909 A1 | 2/2006 | Seegar |
| 2006/0036543 A1 | 2/2006 | Blagg et al. |
| 2006/0036748 A1 | 2/2006 | Nusbaum et al. |
| 2006/0041464 A1 | 2/2006 | Powers et al. |
| 2006/0041670 A1 | 2/2006 | Musseleck et al. |
| 2006/0047605 A1 | 3/2006 | Ahmad |
| 2006/0059062 A1 | 3/2006 | Wood et al. |
| 2006/0059083 A1 | 3/2006 | Friesen et al. |
| 2006/0059110 A1 | 3/2006 | Madhok et al. |
| 2006/0059362 A1 | 3/2006 | Paden et al. |
| 2006/0074986 A1 | 4/2006 | Mallalieu et al. |
| 2006/0074991 A1 | 4/2006 | Lussier et al. |
| 2006/0079211 A1 | 4/2006 | Degraeve |
| 2006/0080210 A1 | 4/2006 | Mourad et al. |
| 2006/0080216 A1 | 4/2006 | Hausman et al. |
| 2006/0080230 A1 | 4/2006 | Freiberg |
| 2006/0080235 A1 | 4/2006 | Fukuda et al. |
| 2006/0080251 A1 | 4/2006 | Fried et al. |
| 2006/0080263 A1 | 4/2006 | Willis et al. |
| 2006/0080274 A1 | 4/2006 | Mourad |
| 2006/0085334 A1 | 4/2006 | Murphy |
| 2006/0085361 A1 | 4/2006 | Hoerle et al. |
| 2006/0095289 A1 | 5/2006 | Bunning |
| 2006/0101508 A1 | 5/2006 | Taylor |
| 2006/0106670 A1 | 5/2006 | Cai et al. |
| 2006/0116931 A1 | 6/2006 | Storey |
| 2006/0116932 A1 | 6/2006 | Storey |
| 2006/0129419 A1 | 6/2006 | Flaxer et al. |
| 2006/0129472 A1 | 6/2006 | Harrington |
| 2006/0129481 A1 | 6/2006 | Bhatt et al. |
| 2006/0129533 A1 | 6/2006 | Purvis |
| 2006/0131390 A1 | 6/2006 | Kim |
| 2006/0136524 A1 | 6/2006 | Wohlers et al. |
| 2006/0136595 A1 | 6/2006 | Satyavolu |
| 2006/0155780 A1 | 7/2006 | Sakairi et al. |
| 2006/0161435 A1 | 7/2006 | Atef et al. |
| 2006/0161478 A1 | 7/2006 | Turner et al. |
| 2006/0161554 A1 | 7/2006 | Lucovsky et al. |
| 2006/0173776 A1 | 8/2006 | Shalley et al. |
| 2006/0173792 A1 | 8/2006 | Glass |
| 2006/0178971 A1 | 8/2006 | Owen et al. |
| 2006/0179050 A1 | 8/2006 | Giang et al. |
| 2006/0184585 A1 | 8/2006 | Grear et al. |
| 2006/0190394 A1 | 8/2006 | Fraser et al. |
| 2006/0195351 A1 | 8/2006 | Bayburtian |
| 2006/0200583 A1 | 9/2006 | Le Lann et al. |
| 2006/0202012 A1 | 9/2006 | Grano et al. |
| 2006/0212407 A1 | 9/2006 | Lyon |
| 2006/0212486 A1 | 9/2006 | Kennis et al. |
| 2006/0213985 A1 | 9/2006 | Walker et al. |
| 2006/0218407 A1 | 9/2006 | Toms |
| 2006/0223043 A1 | 10/2006 | Dancy-Edwards et al. |
| 2006/0224498 A1 | 10/2006 | Chin |
| 2006/0229943 A1 | 10/2006 | Mathias et al. |
| 2006/0229961 A1 | 10/2006 | Lyftogt et al. |
| 2006/0230343 A1 | 10/2006 | Armandpour et al. |

(56) References Cited

U.S. PATENT DOCUMENTS

| | | |
|---|---|---|
| 2006/0235935 A1 | 10/2006 | Ng |
| 2006/0239512 A1 | 10/2006 | Petrillo |
| 2006/0245731 A1 | 11/2006 | Lai |
| 2006/0248021 A1 | 11/2006 | Jain et al. |
| 2006/0248048 A1 | 11/2006 | Jain et al. |
| 2006/0248525 A1 | 11/2006 | Hopkins |
| 2006/0253358 A1 | 11/2006 | Delgrosso et al. |
| 2006/0253463 A1 | 11/2006 | Wu et al. |
| 2006/0262929 A1 | 11/2006 | Vatanen et al. |
| 2006/0271456 A1 | 11/2006 | Romain et al. |
| 2006/0271457 A1 | 11/2006 | Romain et al. |
| 2006/0271633 A1 | 11/2006 | Adler |
| 2006/0277089 A1 | 12/2006 | Hubbard et al. |
| 2006/0277102 A1 | 12/2006 | Agliozzo |
| 2006/0282359 A1 | 12/2006 | Nobili et al. |
| 2006/0282373 A1 | 12/2006 | Stone |
| 2006/0282374 A1 | 12/2006 | Stone |
| 2006/0282429 A1 | 12/2006 | Hernandez-Sherrington et al. |
| 2006/0282819 A1 | 12/2006 | Graham et al. |
| 2006/0282886 A1 | 12/2006 | Gaug |
| 2006/0287764 A1 | 12/2006 | Kraft |
| 2006/0287765 A1 | 12/2006 | Kraft |
| 2006/0287766 A1 | 12/2006 | Kraft |
| 2006/0287767 A1 | 12/2006 | Kraft |
| 2006/0288090 A1 | 12/2006 | Kraft |
| 2006/0293987 A1 | 12/2006 | Shapiro |
| 2006/0294199 A1 | 12/2006 | Bertholf |
| 2007/0005508 A1 | 1/2007 | Chiang |
| 2007/0005984 A1 | 1/2007 | Florencio et al. |
| 2007/0016500 A1 | 1/2007 | Chatterji et al. |
| 2007/0022141 A1 | 1/2007 | Singleton et al. |
| 2007/0027816 A1 | 2/2007 | Writer |
| 2007/0032240 A1 | 2/2007 | Finnegan et al. |
| 2007/0038568 A1 | 2/2007 | Greene et al. |
| 2007/0039049 A1 | 2/2007 | Kupferman et al. |
| 2007/0040015 A1 | 2/2007 | Carlson et al. |
| 2007/0043577 A1 | 2/2007 | Kasower |
| 2007/0047714 A1 | 3/2007 | Baniak et al. |
| 2007/0050777 A1 | 3/2007 | Hutchinson et al. |
| 2007/0055621 A1 | 3/2007 | Tischler et al. |
| 2007/0057947 A1 | 3/2007 | Yokoyama |
| 2007/0061260 A1 | 3/2007 | deGroeve et al. |
| 2007/0067235 A1 | 3/2007 | Nathans et al. |
| 2007/0067297 A1 | 3/2007 | Kublickis |
| 2007/0072190 A1 | 3/2007 | Aggarwal |
| 2007/0073577 A1 | 3/2007 | Krause |
| 2007/0073889 A1 | 3/2007 | Morris |
| 2007/0078908 A1 | 4/2007 | Rohatgi et al. |
| 2007/0078985 A1 | 4/2007 | Shao et al. |
| 2007/0078990 A1 | 4/2007 | Hopkins |
| 2007/0080826 A1 | 4/2007 | Chang |
| 2007/0083460 A1 | 4/2007 | Bachenheimer |
| 2007/0083463 A1 | 4/2007 | Kraft |
| 2007/0088821 A1 | 4/2007 | Sankuratripati et al. |
| 2007/0093234 A1 | 4/2007 | Willis et al. |
| 2007/0094230 A1 | 4/2007 | Subramaniam et al. |
| 2007/0094241 A1 | 4/2007 | M. Blackwell et al. |
| 2007/0112667 A1 | 5/2007 | Rucker |
| 2007/0112668 A1 | 5/2007 | Celano et al. |
| 2007/0112670 A1 | 5/2007 | DeFrancesco et al. |
| 2007/0121843 A1 | 5/2007 | Atazky et al. |
| 2007/0124235 A1 | 5/2007 | Chakraborty et al. |
| 2007/0124256 A1 | 5/2007 | Crooks et al. |
| 2007/0130347 A1 | 6/2007 | Rangan et al. |
| 2007/0131755 A1 | 6/2007 | Chang |
| 2007/0136109 A1 | 6/2007 | Yager et al. |
| 2007/0143123 A1 | 6/2007 | Goldberg et al. |
| 2007/0149184 A1 | 6/2007 | Viegers et al. |
| 2007/0152068 A1 | 7/2007 | Kurita |
| 2007/0153085 A1 | 7/2007 | Chang |
| 2007/0153710 A1 | 7/2007 | Hopkins |
| 2007/0156554 A1 | 7/2007 | Nikoley et al. |
| 2007/0156692 A1 | 7/2007 | Rosewarne |
| 2007/0157107 A1 | 7/2007 | Bishop |
| 2007/0160458 A1 | 7/2007 | Yen |
| 2007/0162369 A1 | 7/2007 | Hardison |
| 2007/0162458 A1 | 7/2007 | Fasciano |
| 2007/0174166 A1 | 7/2007 | Jones |
| 2007/0174186 A1 | 7/2007 | Hokland |
| 2007/0174448 A1 | 7/2007 | Ahuja et al. |
| 2007/0174903 A1 | 7/2007 | Greff |
| 2007/0180380 A1 | 8/2007 | Khavari et al. |
| 2007/0192167 A1 | 8/2007 | Lei et al. |
| 2007/0198432 A1 | 8/2007 | Pitroda et al. |
| 2007/0203954 A1 | 8/2007 | Vargas et al. |
| 2007/0204033 A1 | 8/2007 | Bookbinder et al. |
| 2007/0204212 A1 | 8/2007 | Chamberlain et al. |
| 2007/0204338 A1 | 8/2007 | Aiello et al. |
| 2007/0205266 A1 | 9/2007 | Carr et al. |
| 2007/0206917 A1 | 9/2007 | Ono et al. |
| 2007/0208640 A1 | 9/2007 | Banasiak et al. |
| 2007/0219966 A1 | 9/2007 | Baylis et al. |
| 2007/0220003 A1 | 9/2007 | Chern et al. |
| 2007/0220092 A1 | 9/2007 | Heitzeberg et al. |
| 2007/0220275 A1 | 9/2007 | Heitzeberg et al. |
| 2007/0220581 A1 | 9/2007 | Chang |
| 2007/0226047 A1 | 9/2007 | Ward |
| 2007/0226122 A1 | 9/2007 | Burrell et al. |
| 2007/0233591 A1 | 10/2007 | Newton |
| 2007/0236562 A1 | 10/2007 | Chang |
| 2007/0239493 A1 | 10/2007 | Sweetland et al. |
| 2007/0240206 A1 | 10/2007 | Wu et al. |
| 2007/0244807 A1 | 10/2007 | Andringa et al. |
| 2007/0245245 A1 | 10/2007 | Blue et al. |
| 2007/0250441 A1 | 10/2007 | Paulsen et al. |
| 2007/0250459 A1 | 10/2007 | Schwarz et al. |
| 2007/0262140 A1 | 11/2007 | Long, Sr. |
| 2007/0266439 A1 | 11/2007 | Kraft |
| 2007/0273558 A1 | 11/2007 | Smith |
| 2007/0276780 A1 | 11/2007 | Iriyama et al. |
| 2007/0282743 A1 | 12/2007 | Lovelett |
| 2007/0287415 A1 | 12/2007 | Yamada |
| 2007/0288355 A1 | 12/2007 | Roland et al. |
| 2007/0288360 A1 | 12/2007 | Seeklus |
| 2007/0294195 A1 | 12/2007 | Curry et al. |
| 2007/0299770 A1 | 12/2007 | Delinsky |
| 2007/0299772 A1 | 12/2007 | Mastie et al. |
| 2008/0004957 A1 | 1/2008 | Hildreth et al. |
| 2008/0010203 A1 | 1/2008 | Grant |
| 2008/0010206 A1 | 1/2008 | Coleman |
| 2008/0010687 A1 | 1/2008 | Gonen et al. |
| 2008/0015919 A1 | 1/2008 | Busse et al. |
| 2008/0015979 A1 | 1/2008 | Bentley |
| 2008/0021802 A1 | 1/2008 | Pendleton |
| 2008/0021816 A1 | 1/2008 | Lent et al. |
| 2008/0027859 A1 | 1/2008 | Nathans et al. |
| 2008/0028435 A1 | 1/2008 | Strickland et al. |
| 2008/0028446 A1 | 1/2008 | Burgoyne |
| 2008/0033956 A1 | 2/2008 | Saha et al. |
| 2008/0040176 A1 | 2/2008 | Ehling |
| 2008/0040475 A1 | 2/2008 | Bosworth et al. |
| 2008/0040610 A1 | 2/2008 | Fergusson |
| 2008/0047017 A1 | 2/2008 | Renaud |
| 2008/0052170 A1 | 2/2008 | Storey |
| 2008/0052182 A1 | 2/2008 | Marshall |
| 2008/0052244 A1 | 2/2008 | Tsuei et al. |
| 2008/0059352 A1 | 3/2008 | Chandran |
| 2008/0059364 A1 | 3/2008 | Tidwell et al. |
| 2008/0059447 A1 | 3/2008 | Winner et al. |
| 2008/0060054 A1 | 3/2008 | Srivastava |
| 2008/0065774 A1 | 3/2008 | Keeler |
| 2008/0066188 A1 | 3/2008 | Kwak |
| 2008/0072316 A1 | 3/2008 | Chang et al. |
| 2008/0077526 A1 | 3/2008 | Arumugam |
| 2008/0079809 A1 | 4/2008 | Chang |
| 2008/0082536 A1 | 4/2008 | Schwabe et al. |
| 2008/0083021 A1 | 4/2008 | Doane et al. |
| 2008/0086400 A1 | 4/2008 | Ardelean et al. |
| 2008/0086431 A1 | 4/2008 | Robinson et al. |
| 2008/0091519 A1 | 4/2008 | Foss |
| 2008/0091530 A1 | 4/2008 | Egnatios et al. |
| 2008/0097822 A1 | 4/2008 | Schigel et al. |
| 2008/0103798 A1 | 5/2008 | Domenikos et al. |
| 2008/0103800 A1 | 5/2008 | Domenikos et al. |

(56) References Cited

U.S. PATENT DOCUMENTS

| | | |
|---|---|---|
| 2008/0103972 A1 | 5/2008 | Lanc |
| 2008/0109308 A1 | 5/2008 | Storey |
| 2008/0109422 A1 | 5/2008 | Dedhia |
| 2008/0109740 A1 | 5/2008 | Prinsen et al. |
| 2008/0110973 A1 | 5/2008 | Nathans et al. |
| 2008/0114670 A1 | 5/2008 | Friesen |
| 2008/0114855 A1 | 5/2008 | Welingkar et al. |
| 2008/0115226 A1 | 5/2008 | Welingkar et al. |
| 2008/0120155 A1 | 5/2008 | Pliha |
| 2008/0120204 A1 | 5/2008 | Conner et al. |
| 2008/0120416 A1 | 5/2008 | Hopkins et al. |
| 2008/0120569 A1 | 5/2008 | Mann et al. |
| 2008/0120716 A1 | 5/2008 | Hall et al. |
| 2008/0122920 A1 | 5/2008 | Chang |
| 2008/0126233 A1 | 5/2008 | Hogan |
| 2008/0133273 A1 | 6/2008 | Marshall |
| 2008/0133278 A1 | 6/2008 | Stanfield |
| 2008/0133657 A1 | 6/2008 | Pennington |
| 2008/0140476 A1 | 6/2008 | Anand et al. |
| 2008/0140734 A1 | 6/2008 | Wagner |
| 2008/0140780 A1 | 6/2008 | Hopkins et al. |
| 2008/0141346 A1 | 6/2008 | Kay et al. |
| 2008/0147523 A1 | 6/2008 | Mulry et al. |
| 2008/0148368 A1 | 6/2008 | Zurko et al. |
| 2008/0148392 A1 | 6/2008 | Akens |
| 2008/0154758 A1 | 6/2008 | Schattmaier et al. |
| 2008/0162236 A1 | 7/2008 | Sommerer |
| 2008/0162317 A1 | 7/2008 | Banaugh et al. |
| 2008/0162350 A1 | 7/2008 | Allen-Rouman et al. |
| 2008/0162383 A1 | 7/2008 | Kraft |
| 2008/0172304 A1 | 7/2008 | Berkowitz |
| 2008/0175360 A1 | 7/2008 | Schwarz et al. |
| 2008/0177655 A1 | 7/2008 | Zalik |
| 2008/0183480 A1 | 7/2008 | Carlson et al. |
| 2008/0183585 A1 | 7/2008 | Vianello |
| 2008/0184351 A1 | 7/2008 | Gephart |
| 2008/0195548 A1 | 8/2008 | Chu et al. |
| 2008/0201257 A1 | 8/2008 | Lewis et al. |
| 2008/0201401 A1 | 8/2008 | Pugh et al. |
| 2008/0208548 A1 | 8/2008 | Metzger et al. |
| 2008/0208726 A1 | 8/2008 | Tsantes et al. |
| 2008/0208735 A1 | 8/2008 | Balet et al. |
| 2008/0212845 A1 | 9/2008 | Lund |
| 2008/0215640 A1 | 9/2008 | Hartz et al. |
| 2008/0216156 A1 | 9/2008 | Kosaka |
| 2008/0221972 A1 | 9/2008 | Megdal et al. |
| 2008/0222027 A1 | 9/2008 | Megdal et al. |
| 2008/0222706 A1 | 9/2008 | Renaud et al. |
| 2008/0228556 A1 | 9/2008 | Megdal et al. |
| 2008/0228775 A1 | 9/2008 | Abhyanker et al. |
| 2008/0229415 A1 | 9/2008 | Kapoor et al. |
| 2008/0249869 A1 | 10/2008 | Angell et al. |
| 2008/0249925 A1 | 10/2008 | Nazari et al. |
| 2008/0255992 A1 | 10/2008 | Lin |
| 2008/0263013 A1 | 10/2008 | Hopkins |
| 2008/0263638 A1 | 10/2008 | McMurtry et al. |
| 2008/0270038 A1 | 10/2008 | Partovi et al. |
| 2008/0270209 A1 | 10/2008 | Mauseth et al. |
| 2008/0270292 A1 | 10/2008 | Ghosh et al. |
| 2008/0270294 A1 | 10/2008 | Lent et al. |
| 2008/0270295 A1 | 10/2008 | Lent et al. |
| 2008/0275816 A1 | 11/2008 | Hazlehurst |
| 2008/0277465 A1 | 11/2008 | Pletz et al. |
| 2008/0281737 A1 | 11/2008 | Fajardo |
| 2008/0282324 A1 | 11/2008 | Hoal |
| 2008/0284586 A1 | 11/2008 | Chang |
| 2008/0288283 A1 | 11/2008 | Baldwin, Jr. et al. |
| 2008/0288299 A1 | 11/2008 | Schultz |
| 2008/0294501 A1 | 11/2008 | Rennich et al. |
| 2008/0297602 A1 | 12/2008 | Chang |
| 2008/0301016 A1 | 12/2008 | Durvasula et al. |
| 2008/0306846 A1 | 12/2008 | Ferguson |
| 2008/0307063 A1 | 12/2008 | Caughey |
| 2008/0316010 A1 | 12/2008 | Chang |
| 2008/0319861 A1 | 12/2008 | Hopkins |
| 2008/0319889 A1 | 12/2008 | Hammad |
| 2008/0319896 A1 | 12/2008 | Carlson et al. |
| 2009/0006230 A1 | 1/2009 | Lyda et al. |
| 2009/0006582 A1 | 1/2009 | Daswani et al. |
| 2009/0018986 A1 | 1/2009 | Alcorn et al. |
| 2009/0024462 A1 | 1/2009 | Lin |
| 2009/0024484 A1 | 1/2009 | Walker et al. |
| 2009/0024485 A1 | 1/2009 | Haugen et al. |
| 2009/0030776 A1 | 1/2009 | Walker et al. |
| 2009/0037279 A1 | 2/2009 | Chockalingam et al. |
| 2009/0037323 A1 | 2/2009 | Feinstein et al. |
| 2009/0037332 A1 | 2/2009 | Cheung et al. |
| 2009/0043691 A1 | 2/2009 | Kasower |
| 2009/0048957 A1 | 2/2009 | Celano |
| 2009/0048999 A1 | 2/2009 | Gupta et al. |
| 2009/0055287 A1 | 2/2009 | Chin |
| 2009/0055312 A1 | 2/2009 | Chin |
| 2009/0055322 A1 | 2/2009 | Bykov et al. |
| 2009/0055404 A1 | 2/2009 | Heiden et al. |
| 2009/0064297 A1 | 3/2009 | Selgas et al. |
| 2009/0069000 A1* | 3/2009 | Kindberg ............ G06F 16/9577 455/414.3 |
| 2009/0070148 A1 | 3/2009 | Skocic |
| 2009/0076950 A1 | 3/2009 | Chang et al. |
| 2009/0076966 A1 | 3/2009 | Bishop et al. |
| 2009/0089190 A1 | 4/2009 | Girulat |
| 2009/0089193 A1 | 4/2009 | Palantin |
| 2009/0089869 A1 | 4/2009 | Varghese |
| 2009/0094237 A1 | 4/2009 | Churi et al. |
| 2009/0094675 A1 | 4/2009 | Powers |
| 2009/0099941 A1 | 4/2009 | Berkowitz |
| 2009/0100047 A1 | 4/2009 | Jones et al. |
| 2009/0106141 A1 | 4/2009 | Becker |
| 2009/0106150 A1 | 4/2009 | Pelegero et al. |
| 2009/0106846 A1 | 4/2009 | Dupray et al. |
| 2009/0119116 A1 | 5/2009 | Steen |
| 2009/0119299 A1 | 5/2009 | Rhodes |
| 2009/0125369 A1 | 5/2009 | Kloostra et al. |
| 2009/0125972 A1 | 5/2009 | Hinton et al. |
| 2009/0132347 A1 | 5/2009 | Anderson et al. |
| 2009/0132813 A1 | 5/2009 | Schibuk |
| 2009/0146879 A1 | 6/2009 | Chang |
| 2009/0147774 A1 | 6/2009 | Caughey |
| 2009/0157564 A1 | 6/2009 | Cross |
| 2009/0157693 A1 | 6/2009 | Palahnuk |
| 2009/0158030 A1 | 6/2009 | Rasti |
| 2009/0164380 A1 | 6/2009 | Brown |
| 2009/0164582 A1 | 6/2009 | Dasgupta et al. |
| 2009/0164929 A1 | 6/2009 | Chen et al. |
| 2009/0171723 A1 | 7/2009 | Jenkins |
| 2009/0172788 A1 | 7/2009 | Veldula et al. |
| 2009/0172795 A1 | 7/2009 | Ritari et al. |
| 2009/0177529 A1 | 7/2009 | Hadi |
| 2009/0177562 A1 | 7/2009 | Peace et al. |
| 2009/0177670 A1 | 7/2009 | Grenier et al. |
| 2009/0183259 A1 | 7/2009 | Rinek et al. |
| 2009/0187607 A1 | 7/2009 | Yoo et al. |
| 2009/0195377 A1 | 8/2009 | Chang |
| 2009/0198557 A1 | 8/2009 | Wang et al. |
| 2009/0198602 A1 | 8/2009 | Wang et al. |
| 2009/0199294 A1 | 8/2009 | Schneider |
| 2009/0204514 A1 | 8/2009 | Bhogal et al. |
| 2009/0204599 A1 | 8/2009 | Morris et al. |
| 2009/0210241 A1 | 8/2009 | Calloway |
| 2009/0210807 A1 | 8/2009 | Xiao et al. |
| 2009/0216640 A1 | 8/2009 | Masi |
| 2009/0217342 A1 | 8/2009 | Nadler |
| 2009/0222364 A1 | 9/2009 | McGlynn et al. |
| 2009/0222449 A1 | 9/2009 | Hom et al. |
| 2009/0222527 A1 | 9/2009 | Arconati et al. |
| 2009/0228295 A1 | 9/2009 | Lowy |
| 2009/0228392 A1 | 9/2009 | Pinson, III |
| 2009/0228918 A1 | 9/2009 | Rolff et al. |
| 2009/0228990 A1 | 9/2009 | Chen et al. |
| 2009/0233579 A1 | 9/2009 | Castell et al. |
| 2009/0234665 A1 | 9/2009 | Conkel |
| 2009/0234775 A1 | 9/2009 | Whitney et al. |
| 2009/0234814 A1 | 9/2009 | Boerries et al. |
| 2009/0234876 A1 | 9/2009 | Schigel et al. |

(56) References Cited

U.S. PATENT DOCUMENTS

| | | |
|---|---|---|
| 2009/0240624 A1 | 9/2009 | James et al. |
| 2009/0247122 A1 | 10/2009 | Fitzgerald et al. |
| 2009/0248573 A1 | 10/2009 | Haggerty et al. |
| 2009/0249451 A1 | 10/2009 | Su et al. |
| 2009/0254375 A1 | 10/2009 | Martinez et al. |
| 2009/0254476 A1 | 10/2009 | Sharma et al. |
| 2009/0254656 A1 | 10/2009 | Vignisson et al. |
| 2009/0254971 A1 | 10/2009 | Herz et al. |
| 2009/0258334 A1 | 10/2009 | Pyne |
| 2009/0260064 A1 | 10/2009 | Mcdowell et al. |
| 2009/0271265 A1 | 10/2009 | Lay et al. |
| 2009/0276368 A1 | 11/2009 | Martin et al. |
| 2009/0280467 A1 | 11/2009 | Ahart |
| 2009/0281816 A1 | 11/2009 | Houga et al. |
| 2009/0281941 A1 | 11/2009 | Worth |
| 2009/0281951 A1 | 11/2009 | Shakkarwar |
| 2009/0282479 A1 | 11/2009 | Smith et al. |
| 2009/0289110 A1 | 11/2009 | Regen et al. |
| 2009/0300066 A1 | 12/2009 | Guo et al. |
| 2009/0300604 A1 | 12/2009 | Barringer |
| 2009/0300641 A1 | 12/2009 | Friedman et al. |
| 2009/0307778 A1 | 12/2009 | Mardikar |
| 2009/0313562 A1 | 12/2009 | Appleyard et al. |
| 2009/0319648 A1 | 12/2009 | Dutta et al. |
| 2009/0327054 A1 | 12/2009 | Yao et al. |
| 2009/0327120 A1 | 12/2009 | Eze et al. |
| 2009/0327270 A1 | 12/2009 | Teevan et al. |
| 2009/0327487 A1 | 12/2009 | Olson et al. |
| 2010/0009320 A1 | 1/2010 | Wilkelis |
| 2010/0009332 A1 | 1/2010 | Yaskin et al. |
| 2010/0010935 A1 | 1/2010 | Shelton |
| 2010/0010993 A1 | 1/2010 | Hussey, Jr. et al. |
| 2010/0011428 A1 | 1/2010 | Atwood et al. |
| 2010/0023434 A1 | 1/2010 | Bond |
| 2010/0023440 A1 | 1/2010 | Fraser et al. |
| 2010/0023448 A1 | 1/2010 | Eze |
| 2010/0023506 A1 | 1/2010 | Sahni et al. |
| 2010/0025820 A1 | 2/2010 | Suekawa |
| 2010/0030578 A1 | 2/2010 | Siddique et al. |
| 2010/0030649 A1 | 2/2010 | Ubelhor |
| 2010/0030677 A1 | 2/2010 | Melik-Aslanian et al. |
| 2010/0036697 A1 | 2/2010 | Kelnar |
| 2010/0036769 A1 | 2/2010 | Winters et al. |
| 2010/0042537 A1 | 2/2010 | Smith et al. |
| 2010/0042542 A1 | 2/2010 | Rose et al. |
| 2010/0042732 A1 | 2/2010 | Hopkins |
| 2010/0043055 A1 | 2/2010 | Baumgart |
| 2010/0049803 A1 | 2/2010 | Ogilvie et al. |
| 2010/0063906 A1 | 3/2010 | Nelsen et al. |
| 2010/0063942 A1 | 3/2010 | Arnott et al. |
| 2010/0063993 A1 | 3/2010 | Higgins et al. |
| 2010/0076833 A1 | 3/2010 | Nelsen |
| 2010/0076966 A1 | 3/2010 | Strutton et al. |
| 2010/0077483 A1 | 3/2010 | Stolfo et al. |
| 2010/0082445 A1 | 4/2010 | Hodge et al. |
| 2010/0082476 A1 | 4/2010 | Bowman |
| 2010/0083371 A1 | 4/2010 | Bennetts et al. |
| 2010/0088188 A1 | 4/2010 | Kumar et al. |
| 2010/0094768 A1 | 4/2010 | Miltonberger |
| 2010/0094774 A1 | 4/2010 | Jackowitz et al. |
| 2010/0094910 A1 | 4/2010 | Bayliss |
| 2010/0100945 A1 | 4/2010 | Ozzie et al. |
| 2010/0114724 A1 | 5/2010 | Ghosh et al. |
| 2010/0114744 A1 | 5/2010 | Gonen |
| 2010/0114776 A1 | 5/2010 | Weller et al. |
| 2010/0122324 A1 | 5/2010 | Welingkar et al. |
| 2010/0122333 A1 | 5/2010 | Noe et al. |
| 2010/0130172 A1 | 5/2010 | Vendrow et al. |
| 2010/0136956 A1 | 6/2010 | Drachev et al. |
| 2010/0145836 A1 | 6/2010 | Baker et al. |
| 2010/0153278 A1 | 6/2010 | Farsedakis |
| 2010/0153290 A1 | 6/2010 | Duggan |
| 2010/0161486 A1 | 6/2010 | Liu et al. |
| 2010/0161816 A1 | 6/2010 | Kraft et al. |
| 2010/0169159 A1 | 7/2010 | Rose et al. |
| 2010/0174638 A1 | 7/2010 | Debie et al. |
| 2010/0174813 A1 | 7/2010 | Hildreth et al. |
| 2010/0179906 A1 | 7/2010 | Hawkes |
| 2010/0185546 A1 | 7/2010 | Pollard |
| 2010/0188684 A1 | 7/2010 | Kumara |
| 2010/0198636 A1 | 8/2010 | Choudhary et al. |
| 2010/0205076 A1 | 8/2010 | Parson et al. |
| 2010/0205662 A1 | 8/2010 | Ibrahim et al. |
| 2010/0211445 A1 | 8/2010 | Bodington |
| 2010/0211636 A1 | 8/2010 | Starkenburg et al. |
| 2010/0214090 A1 | 8/2010 | Sartini et al. |
| 2010/0215270 A1 | 8/2010 | Manohar et al. |
| 2010/0217837 A1 | 8/2010 | Ansari et al. |
| 2010/0223160 A1 | 9/2010 | Brown |
| 2010/0223184 A1 | 9/2010 | Perlman |
| 2010/0223192 A1 | 9/2010 | Levine et al. |
| 2010/0228658 A1 | 9/2010 | Ketelsen et al. |
| 2010/0229245 A1 | 9/2010 | Singhal |
| 2010/0241535 A1 | 9/2010 | Nightengale et al. |
| 2010/0248681 A1 | 9/2010 | Phills |
| 2010/0250338 A1 | 9/2010 | Banerjee et al. |
| 2010/0250410 A1 | 9/2010 | Song et al. |
| 2010/0250411 A1 | 9/2010 | Ogrodski |
| 2010/0250416 A1 | 9/2010 | Hazlehurst |
| 2010/0250509 A1 | 9/2010 | Andersen |
| 2010/0253686 A1 | 10/2010 | Alsbury et al. |
| 2010/0257102 A1 | 10/2010 | Perlman |
| 2010/0257234 A1 | 10/2010 | Caughey |
| 2010/0257577 A1 | 10/2010 | Grandison et al. |
| 2010/0258623 A1 | 10/2010 | Beemer et al. |
| 2010/0258625 A1 | 10/2010 | Stanfield et al. |
| 2010/0259373 A1 | 10/2010 | Chang |
| 2010/0262339 A1 | 10/2010 | Chang |
| 2010/0262535 A1 | 10/2010 | Lent et al. |
| 2010/0262606 A1 | 10/2010 | Bedolla et al. |
| 2010/0262932 A1 | 10/2010 | Pan |
| 2010/0268557 A1 | 10/2010 | Faith et al. |
| 2010/0268768 A1 | 10/2010 | Kurtenbach et al. |
| 2010/0274815 A1 | 10/2010 | Vanasco |
| 2010/0280914 A1 | 11/2010 | Carlson |
| 2010/0281020 A1 | 11/2010 | Drubner |
| 2010/0293090 A1 | 11/2010 | Domenikos et al. |
| 2010/0306834 A1 | 12/2010 | Grandison et al. |
| 2010/0312691 A1 | 12/2010 | Johnson, Jr. |
| 2010/0323446 A1 | 12/2010 | Barnett et al. |
| 2010/0324999 A1 | 12/2010 | Conway et al. |
| 2010/0325048 A1 | 12/2010 | Carlson et al. |
| 2010/0332393 A1 | 12/2010 | Weller et al. |
| 2011/0004498 A1 | 1/2011 | Readshaw |
| 2011/0023115 A1 | 1/2011 | Wright |
| 2011/0029388 A1 | 2/2011 | Kendall et al. |
| 2011/0029566 A1 | 2/2011 | Grandison et al. |
| 2011/0029660 A1 | 2/2011 | Hopkins |
| 2011/0035305 A1 | 2/2011 | Imrey et al. |
| 2011/0035315 A1 | 2/2011 | Langley |
| 2011/0035452 A1 | 2/2011 | Gittleman |
| 2011/0040629 A1 | 2/2011 | Chiu et al. |
| 2011/0047086 A1 | 2/2011 | Heisterkamp et al. |
| 2011/0047606 A1 | 2/2011 | Blomquist |
| 2011/0066495 A1 | 3/2011 | Ayloo et al. |
| 2011/0066618 A1 | 3/2011 | Sigurbjornsson et al. |
| 2011/0066695 A1 | 3/2011 | Hopkins |
| 2011/0071950 A1 | 3/2011 | Ivanovic |
| 2011/0078073 A1 | 3/2011 | Annappindi et al. |
| 2011/0083181 A1 | 4/2011 | Nazarov |
| 2011/0107265 A1 | 5/2011 | Buchanan et al. |
| 2011/0107400 A1 | 5/2011 | Shankaranarayanan et al. |
| 2011/0112899 A1 | 5/2011 | Strutton et al. |
| 2011/0113084 A1 | 5/2011 | Ramnani |
| 2011/0113086 A1 | 5/2011 | Long et al. |
| 2011/0119169 A1 | 5/2011 | Passero et al. |
| 2011/0119765 A1 | 5/2011 | Hering et al. |
| 2011/0125924 A1 | 5/2011 | McAleer |
| 2011/0126275 A1 | 5/2011 | Anderson et al. |
| 2011/0131123 A1 | 6/2011 | Griffin et al. |
| 2011/0137760 A1 | 6/2011 | Rudie et al. |
| 2011/0137765 A1 | 6/2011 | Nonaka |
| 2011/0142213 A1 | 6/2011 | Baniak et al. |
| 2011/0143711 A1 | 6/2011 | Hirson et al. |

(56) References Cited

U.S. PATENT DOCUMENTS

| | | |
|---|---|---|
| 2011/0145064 A1 | 6/2011 | Anderson et al. |
| 2011/0145899 A1 | 6/2011 | Cao et al. |
| 2011/0148625 A1 | 6/2011 | Velusamy |
| 2011/0161155 A1 | 6/2011 | Wilhem et al. |
| 2011/0166988 A1 | 7/2011 | Coulter |
| 2011/0167011 A1 | 7/2011 | Paltenghe et al. |
| 2011/0178841 A1 | 7/2011 | Rane et al. |
| 2011/0178899 A1 | 7/2011 | Huszar |
| 2011/0179139 A1 | 7/2011 | Starkenburg et al. |
| 2011/0184780 A1 | 7/2011 | Alderson et al. |
| 2011/0193704 A1 | 8/2011 | Harper et al. |
| 2011/0196791 A1 | 8/2011 | Dominguez |
| 2011/0211445 A1 | 9/2011 | Chen |
| 2011/0213670 A1 | 9/2011 | Strutton et al. |
| 2011/0214187 A1 | 9/2011 | Wittenstein et al. |
| 2011/0243406 A1 | 10/2011 | Chandler |
| 2011/0252071 A1 | 10/2011 | Cidon |
| 2011/0264531 A1 | 10/2011 | Bhatia et al. |
| 2011/0264566 A1 | 10/2011 | Brown |
| 2011/0264581 A1 | 10/2011 | Clyne |
| 2011/0270618 A1 | 11/2011 | Banerjee et al. |
| 2011/0270754 A1 | 11/2011 | Kelly et al. |
| 2011/0271329 A1 | 11/2011 | Hulten et al. |
| 2011/0276382 A1 | 11/2011 | Ramchandani et al. |
| 2011/0276396 A1 | 11/2011 | Rathod |
| 2011/0276604 A1 | 11/2011 | Hom et al. |
| 2011/0282711 A1 | 11/2011 | Freishtat et al. |
| 2011/0282783 A1 | 11/2011 | Ferguson et al. |
| 2011/0282943 A1 | 11/2011 | Anderson et al. |
| 2011/0289151 A1 | 11/2011 | Hopkins |
| 2011/0289209 A1 | 11/2011 | Hopkins |
| 2011/0296003 A1 | 12/2011 | McCann et al. |
| 2011/0302083 A1 | 12/2011 | Bhinder |
| 2011/0302653 A1 | 12/2011 | Frantz et al. |
| 2011/0304646 A1* | 12/2011 | Kato .................. A63F 13/525 345/632 |
| 2011/0307397 A1 | 12/2011 | Benmbarek |
| 2011/0307434 A1 | 12/2011 | Rostampour et al. |
| 2011/0307474 A1 | 12/2011 | Hom et al. |
| 2011/0307494 A1 | 12/2011 | Snow |
| 2011/0307938 A1 | 12/2011 | Reeves, Jr. et al. |
| 2011/0307957 A1 | 12/2011 | Barcelo et al. |
| 2011/0313915 A1 | 12/2011 | Tang |
| 2011/0314100 A1 | 12/2011 | Hopkins |
| 2011/0314383 A1 | 12/2011 | Abdo et al. |
| 2011/0320582 A1 | 12/2011 | Lewis |
| 2011/0321137 A1 | 12/2011 | Iida et al. |
| 2012/0005070 A1 | 1/2012 | McFall et al. |
| 2012/0005221 A1 | 1/2012 | Ickman et al. |
| 2012/0005542 A1 | 1/2012 | Petersen et al. |
| 2012/0010927 A1 | 1/2012 | Attenberg et al. |
| 2012/0011063 A1 | 1/2012 | Killian et al. |
| 2012/0011158 A1 | 1/2012 | Avner et al. |
| 2012/0011432 A1 | 1/2012 | Strutton |
| 2012/0015717 A1 | 1/2012 | Mosites et al. |
| 2012/0016948 A1 | 1/2012 | Sinha |
| 2012/0022990 A1 | 1/2012 | Kasower |
| 2012/0030216 A1 | 2/2012 | Churi et al. |
| 2012/0030771 A1 | 2/2012 | Pierson et al. |
| 2012/0036053 A1 | 2/2012 | Miller |
| 2012/0036065 A1 | 2/2012 | Orttung et al. |
| 2012/0036127 A1 | 2/2012 | Work et al. |
| 2012/0036565 A1 | 2/2012 | Gamez et al. |
| 2012/0042237 A1 | 2/2012 | Armandpour et al. |
| 2012/0047174 A1 | 2/2012 | Avner et al. |
| 2012/0047219 A1 | 2/2012 | Feng et al. |
| 2012/0054088 A1 | 3/2012 | Edrington et al. |
| 2012/0054592 A1 | 3/2012 | Jaffe et al. |
| 2012/0060105 A1 | 3/2012 | Brown et al. |
| 2012/0066044 A1 | 3/2012 | Honnef et al. |
| 2012/0066106 A1 | 3/2012 | Papadimitriou |
| 2012/0072382 A1 | 3/2012 | Pearson et al. |
| 2012/0078766 A1 | 3/2012 | Rose et al. |
| 2012/0079598 A1 | 3/2012 | Brock et al. |
| 2012/0084866 A1 | 4/2012 | Stolfo |
| 2012/0089438 A1 | 4/2012 | Tavares et al. |
| 2012/0101938 A1 | 4/2012 | Kasower |
| 2012/0101939 A1 | 4/2012 | Kasower |
| 2012/0109752 A1 | 5/2012 | Strutton et al. |
| 2012/0110467 A1 | 5/2012 | Blake et al. |
| 2012/0110677 A1 | 5/2012 | Abendroth et al. |
| 2012/0116913 A1 | 5/2012 | Goolkasian |
| 2012/0116969 A1 | 5/2012 | Kumar et al. |
| 2012/0124033 A1 | 5/2012 | Gabriel et al. |
| 2012/0124498 A1 | 5/2012 | Santoro et al. |
| 2012/0131009 A1 | 5/2012 | Nath et al. |
| 2012/0131656 A1 | 5/2012 | Slaton et al. |
| 2012/0135705 A1 | 5/2012 | Thaker |
| 2012/0136763 A1 | 5/2012 | Megdal et al. |
| 2012/0136774 A1 | 5/2012 | Imrey et al. |
| 2012/0144461 A1 | 6/2012 | Rathbun |
| 2012/0151045 A1 | 6/2012 | Anakata et al. |
| 2012/0151046 A1 | 6/2012 | Weiss et al. |
| 2012/0158562 A1 | 6/2012 | Kassir |
| 2012/0158654 A1 | 6/2012 | Behren et al. |
| 2012/0173339 A1 | 7/2012 | Flynt et al. |
| 2012/0173417 A1 | 7/2012 | Lohman et al. |
| 2012/0185515 A1 | 7/2012 | Ferrel et al. |
| 2012/0191596 A1 | 7/2012 | Kremen et al. |
| 2012/0191693 A1 | 7/2012 | Alexander |
| 2012/0195412 A1 | 8/2012 | Smith |
| 2012/0198556 A1 | 8/2012 | Patel et al. |
| 2012/0203733 A1 | 8/2012 | Zhang |
| 2012/0215682 A1 | 8/2012 | Lent et al. |
| 2012/0215719 A1 | 8/2012 | Verlander |
| 2012/0216125 A1 | 8/2012 | Pierce |
| 2012/0221467 A1 | 8/2012 | Hamzeh |
| 2012/0235897 A1 | 9/2012 | Hirota |
| 2012/0239417 A1 | 9/2012 | Pourfallah et al. |
| 2012/0239497 A1 | 9/2012 | Nuzzi |
| 2012/0239583 A1 | 9/2012 | Dobrowolski |
| 2012/0240223 A1 | 9/2012 | Tu |
| 2012/0242473 A1 | 9/2012 | Choi |
| 2012/0246060 A1 | 9/2012 | Conyack, Jr. et al. |
| 2012/0246092 A1 | 9/2012 | Stibel et al. |
| 2012/0246093 A1 | 9/2012 | Stibel et al. |
| 2012/0253852 A1 | 10/2012 | Pourfallah et al. |
| 2012/0262386 A1 | 10/2012 | Kwon et al. |
| 2012/0262472 A1 | 10/2012 | Garr et al. |
| 2012/0271660 A1 | 10/2012 | Harris et al. |
| 2012/0271712 A1 | 10/2012 | Katzin et al. |
| 2012/0278217 A1 | 11/2012 | Sui et al. |
| 2012/0278226 A1 | 11/2012 | Kolo |
| 2012/0278767 A1 | 11/2012 | Stibel et al. |
| 2012/0284280 A1 | 11/2012 | Kumar |
| 2012/0290486 A1 | 11/2012 | Dobrowolski et al. |
| 2012/0290660 A1 | 11/2012 | Rao et al. |
| 2012/0290740 A1 | 11/2012 | Tewari et al. |
| 2012/0296804 A1 | 11/2012 | Stibel et al. |
| 2012/0297484 A1 | 11/2012 | Srivastava |
| 2012/0317013 A1 | 12/2012 | Luk et al. |
| 2012/0317014 A1 | 12/2012 | Cerise et al. |
| 2012/0321202 A1 | 12/2012 | Fertik et al. |
| 2012/0323695 A1 | 12/2012 | Stibel |
| 2012/0324388 A1 | 12/2012 | Rao et al. |
| 2012/0330689 A1 | 12/2012 | McLaughlin et al. |
| 2013/0006843 A1 | 1/2013 | Tralvex |
| 2013/0006844 A1 | 1/2013 | Kremen |
| 2013/0007012 A1 | 1/2013 | Selkowe Fertik et al. |
| 2013/0007014 A1 | 1/2013 | Fertik et al. |
| 2013/0007891 A1 | 1/2013 | Mogaki |
| 2013/0013513 A1 | 1/2013 | Ledbetter et al. |
| 2013/0013553 A1 | 1/2013 | Stibel et al. |
| 2013/0018798 A1 | 1/2013 | Scipioni |
| 2013/0018811 A1 | 1/2013 | Britti et al. |
| 2013/0018838 A1 | 1/2013 | Parnaby et al. |
| 2013/0018877 A1 | 1/2013 | Gabriel et al. |
| 2013/0018892 A1 | 1/2013 | Castellanos et al. |
| 2013/0018957 A1 | 1/2013 | Parnaby et al. |
| 2013/0024367 A1 | 1/2013 | Bellefeuille et al. |
| 2013/0024520 A1 | 1/2013 | Siminoff |
| 2013/0024813 A1 | 1/2013 | Schnorr et al. |
| 2013/0030826 A1 | 1/2013 | Blom |
| 2013/0031105 A1 | 1/2013 | Stibel et al. |

(56) References Cited

U.S. PATENT DOCUMENTS

| | | |
|---|---|---|
| 2013/0031109 A1 | 1/2013 | Roulson et al. |
| 2013/0031624 A1 | 1/2013 | Britti et al. |
| 2013/0036466 A1 | 2/2013 | Penta et al. |
| 2013/0040619 A1 | 2/2013 | Grube et al. |
| 2013/0041798 A1 | 2/2013 | Unger |
| 2013/0041810 A1 | 2/2013 | Murrell et al. |
| 2013/0041949 A1 | 2/2013 | Biesecker et al. |
| 2013/0054357 A1 | 2/2013 | Mager et al. |
| 2013/0061335 A1 | 3/2013 | Schwabe |
| 2013/0066716 A1 | 3/2013 | Chen et al. |
| 2013/0066775 A1 | 3/2013 | Milam |
| 2013/0066884 A1 | 3/2013 | Kast et al. |
| 2013/0066922 A1 | 3/2013 | Jang et al. |
| 2013/0067582 A1 | 3/2013 | Donovan et al. |
| 2013/0073366 A1 | 3/2013 | Heath |
| 2013/0080322 A1 | 3/2013 | Adolphe |
| 2013/0080467 A1 | 3/2013 | Carson et al. |
| 2013/0085804 A1 | 4/2013 | Leff et al. |
| 2013/0085894 A1 | 4/2013 | Chan et al. |
| 2013/0085939 A1 | 4/2013 | Colak et al. |
| 2013/0085953 A1 | 4/2013 | Bhola et al. |
| 2013/0086075 A1 | 4/2013 | Scott et al. |
| 2013/0090982 A1 | 4/2013 | Ross |
| 2013/0103464 A1 | 4/2013 | Kuznetsov |
| 2013/0103571 A1 | 4/2013 | Chung et al. |
| 2013/0104216 A1 | 4/2013 | Dennis et al. |
| 2013/0110557 A1 | 5/2013 | Kasower |
| 2013/0110565 A1 | 5/2013 | Means et al. |
| 2013/0110585 A1 | 5/2013 | Nesbitt et al. |
| 2013/0111436 A1 | 5/2013 | Phan et al. |
| 2013/0117072 A1 | 5/2013 | Nish |
| 2013/0117087 A1 | 5/2013 | Coppinger |
| 2013/0124855 A1 | 5/2013 | Varadarajan et al. |
| 2013/0125010 A1 | 5/2013 | Strandell |
| 2013/0132151 A1 | 5/2013 | Stibel et al. |
| 2013/0159411 A1 | 6/2013 | Bowen |
| 2013/0173447 A1 | 7/2013 | Rothschild |
| 2013/0173449 A1 | 7/2013 | Ng et al. |
| 2013/0173451 A1 | 7/2013 | Kornegay et al. |
| 2013/0179338 A1 | 7/2013 | Evans |
| 2013/0185210 A1 | 7/2013 | Dodson et al. |
| 2013/0185293 A1 | 7/2013 | Boback |
| 2013/0187923 A1 | 7/2013 | Yoshimoto et al. |
| 2013/0204762 A1 | 8/2013 | Harris et al. |
| 2013/0205135 A1 | 8/2013 | Lutz |
| 2013/0211986 A1 | 8/2013 | Debie et al. |
| 2013/0212187 A1 | 8/2013 | Mortazavi et al. |
| 2013/0238387 A1 | 9/2013 | Stibel et al. |
| 2013/0262226 A1 | 10/2013 | LaChapelle et al. |
| 2013/0267171 A1 | 10/2013 | Sarkar et al. |
| 2013/0278515 A1 | 10/2013 | Kikuchi |
| 2013/0279676 A1 | 10/2013 | Baniak et al. |
| 2013/0282819 A1 | 10/2013 | Mehta et al. |
| 2013/0290164 A1 | 10/2013 | Salm |
| 2013/0293363 A1 | 11/2013 | Plymouth |
| 2013/0297499 A1 | 11/2013 | Mukherjee |
| 2013/0298238 A1 | 11/2013 | Shah et al. |
| 2013/0332341 A1 | 12/2013 | Papadimitriou |
| 2013/0332342 A1 | 12/2013 | Kasower |
| 2013/0332352 A1 | 12/2013 | Imrey et al. |
| 2013/0339141 A1 | 12/2013 | Stibel et al. |
| 2013/0339249 A1 | 12/2013 | Weller et al. |
| 2013/0347059 A1 | 12/2013 | Fong et al. |
| 2014/0012733 A1 | 1/2014 | Vidal |
| 2014/0012737 A1 | 1/2014 | Evans |
| 2014/0015860 A1* | 1/2014 | Kim ............... G06F 16/951 345/633 |
| 2014/0019348 A1 | 1/2014 | Daley |
| 2014/0025562 A1 | 1/2014 | Rothrock et al. |
| 2014/0032300 A1 | 1/2014 | Zhang et al. |
| 2014/0032723 A1 | 1/2014 | Nema |
| 2014/0046872 A1 | 2/2014 | Arnott et al. |
| 2014/0052732 A1 | 2/2014 | Softky |
| 2014/0061302 A1 | 3/2014 | Hammad |
| 2014/0074689 A1 | 3/2014 | Lund et al. |
| 2014/0089166 A1 | 3/2014 | Padawer |
| 2014/0089167 A1 | 3/2014 | Kasower |
| 2014/0089191 A1 | 3/2014 | Brown |
| 2014/0095640 A1 | 4/2014 | Stibel et al. |
| 2014/0096249 A1 | 4/2014 | Dupont et al. |
| 2014/0098142 A1 | 4/2014 | Lee et al. |
| 2014/0098229 A1 | 4/2014 | Lu et al. |
| 2014/0110477 A1 | 4/2014 | Hammad |
| 2014/0114735 A1 | 4/2014 | Isaacson et al. |
| 2014/0122354 A1 | 5/2014 | Stibel et al. |
| 2014/0129942 A1 | 5/2014 | Rathod |
| 2014/0156500 A1 | 6/2014 | Lassen et al. |
| 2014/0156501 A1 | 6/2014 | Howe |
| 2014/0156503 A1 | 6/2014 | Lassen et al. |
| 2014/0164112 A1 | 6/2014 | Kala |
| 2014/0164398 A1 | 6/2014 | Smith et al. |
| 2014/0164519 A1 | 6/2014 | Shah |
| 2014/0172681 A1 | 6/2014 | Lamp et al. |
| 2014/0173732 A1 | 6/2014 | Stibel |
| 2014/0180919 A1 | 6/2014 | Brown |
| 2014/0181285 A1 | 6/2014 | Stevens et al. |
| 2014/0237377 A1 | 8/2014 | Meissner |
| 2014/0258083 A1 | 9/2014 | Achanta et al. |
| 2014/0258084 A1 | 9/2014 | Padawer et al. |
| 2014/0279329 A1 | 9/2014 | Dancel |
| 2014/0279382 A1 | 9/2014 | Drakeley et al. |
| 2014/0279391 A1 | 9/2014 | Gallo et al. |
| 2014/0282977 A1 | 9/2014 | Madhu et al. |
| 2014/0298485 A1 | 10/2014 | Gardner |
| 2014/0310151 A1 | 10/2014 | Shishkov et al. |
| 2014/0317023 A1 | 10/2014 | Kim |
| 2014/0372367 A1 | 12/2014 | McLean et al. |
| 2014/0379554 A1 | 12/2014 | Grossman et al. |
| 2015/0026060 A1 | 1/2015 | Krietzman et al. |
| 2015/0127490 A1 | 5/2015 | Puertas |
| 2015/0134506 A1 | 5/2015 | King et al. |
| 2015/0135305 A1 | 5/2015 | Cabrera et al. |
| 2015/0142639 A1 | 5/2015 | Padawer |
| 2015/0161738 A1 | 6/2015 | Stempora |
| 2015/0178829 A1 | 6/2015 | Weiss |
| 2015/0199757 A1 | 7/2015 | Lindholme et al. |
| 2015/0200948 A1 | 7/2015 | Cairns et al. |
| 2015/0262249 A1 | 9/2015 | Wical |
| 2015/0278277 A1 | 10/2015 | Agrawal et al. |
| 2015/0302521 A1 | 10/2015 | Bartmann |
| 2015/0310543 A1 | 10/2015 | DeBie |
| 2015/0324920 A1 | 11/2015 | Wilson et al. |
| 2016/0232546 A1 | 8/2016 | Ranft |
| 2016/0232605 A1 | 8/2016 | Zhang |
| 2017/0131964 A1* | 5/2017 | Baek ............... G06F 3/1423 |
| 2017/0132700 A1 | 5/2017 | Kazerani et al. |
| 2017/0161486 A1 | 6/2017 | Jeon et al. |
| 2017/0200223 A1 | 7/2017 | Kasower |
| 2017/0221121 A1 | 8/2017 | Davis et al. |
| 2017/0262821 A1 | 9/2017 | Imrey et al. |
| 2017/0352014 A1 | 12/2017 | Smith et al. |
| 2017/0352186 A1 | 12/2017 | Dauphiny et al. |
| 2018/0040063 A1 | 2/2018 | Buechler et al. |
| 2018/0082372 A1 | 3/2018 | Diana |
| 2018/0089935 A1* | 3/2018 | Froy, Jr. ............... G07F 17/3267 |
| 2018/0101994 A1* | 4/2018 | Da Veiga ............ G06F 3/04812 |
| 2018/0164075 A1 | 6/2018 | Miller et al. |
| 2018/0176267 A1 | 6/2018 | Malatesha et al. |
| 2018/0204279 A1 | 7/2018 | Painter et al. |
| 2018/0218448 A1 | 8/2018 | Thomas et al. |
| 2018/0343265 A1 | 11/2018 | McMillan et al. |
| 2018/0349992 A1 | 12/2018 | Dean et al. |
| 2019/0019185 A1 | 1/2019 | Chitalia et al. |
| 2019/0034625 A1 | 1/2019 | Ford et al. |
| 2019/0051305 A1 | 2/2019 | Liddell et al. |
| 2019/0066203 A1 | 2/2019 | Smith et al. |
| 2019/0102438 A1 | 4/2019 | Murray et al. |
| 2019/0147366 A1 | 5/2019 | Sankaran et al. |
| 2019/0188717 A1 | 6/2019 | Putnam et al. |
| 2019/0188781 A1 | 6/2019 | O'Brien et al. |
| 2019/0197528 A1 | 6/2019 | Dean et al. |
| 2019/0258818 A1 | 8/2019 | Yu et al. |
| 2019/0295165 A1 | 9/2019 | Kapczynski et al. |
| 2019/0296804 A1 | 9/2019 | Eitan et al. |

(56) References Cited

U.S. PATENT DOCUMENTS

| | | | |
|---|---|---|---|
| 2019/0318122 A1 | 10/2019 | Hockey et al. | |
| 2019/0332400 A1 | 10/2019 | Spoor et al. | |
| 2019/0355362 A1 | 11/2019 | Brown et al. | |
| 2020/0034927 A1 | 1/2020 | Smith et al. | |
| 2020/0051115 A1 | 2/2020 | Lawrence et al. | |
| 2020/0051527 A1* | 2/2020 | Ngo .................... | G06F 3/1423 |
| 2020/0074100 A1 | 3/2020 | Raneri et al. | |
| 2020/0074541 A1 | 3/2020 | Finneran et al. | |
| 2020/0074745 A1 | 3/2020 | Lyren | |
| 2020/0076813 A1 | 3/2020 | Felice-Steele et al. | |
| 2020/0090265 A1 | 3/2020 | Quinn et al. | |
| 2020/0106764 A1 | 4/2020 | Hockey et al. | |
| 2020/0106765 A1 | 4/2020 | Hockey et al. | |
| 2020/0126126 A1 | 4/2020 | Briancon et al. | |
| 2020/0137110 A1 | 4/2020 | Tyler et al. | |
| 2020/0143384 A1 | 5/2020 | Koontz et al. | |
| 2020/0160372 A1 | 5/2020 | Andrick | |
| 2020/0174010 A1 | 6/2020 | Pfeiffer et al. | |
| 2020/0193413 A1 | 6/2020 | Jangama et al. | |
| 2020/0193423 A1 | 6/2020 | Jangama et al. | |
| 2020/0201878 A1 | 6/2020 | Putnam et al. | |
| 2020/0202425 A1 | 6/2020 | Taylor-Shoff et al. | |
| 2020/0211099 A1 | 7/2020 | Smith et al. | |
| 2020/0213206 A1 | 7/2020 | Bracken et al. | |
| 2020/0311168 A1 | 10/2020 | Rokos | |
| 2020/0342039 A1 | 10/2020 | Bakir et al. | |
| 2020/0342527 A1 | 10/2020 | Kasower | |
| 2020/0364785 A1 | 11/2020 | Olson et al. | |
| 2020/0372173 A1 | 11/2020 | Burger et al. | |
| 2020/0380599 A1 | 12/2020 | Wasser et al. | |
| 2020/0389461 A1 | 12/2020 | Felice-Steele et al. | |
| 2020/0402159 A1 | 12/2020 | Arnold et al. | |
| 2021/0004703 A1 | 1/2021 | Zoldi et al. | |
| 2021/0027357 A1 | 1/2021 | Bonfigli et al. | |
| 2021/0152567 A1 | 5/2021 | Huston, III et al. | |
| 2021/0194885 A1 | 6/2021 | Manna | |
| 2021/0234869 A1 | 7/2021 | Bondugula et al. | |
| 2022/0027853 A1 | 1/2022 | McMillan et al. | |
| 2022/0217146 A1 | 7/2022 | Felice-Steele et al. | |
| 2022/0374744 A1 | 11/2022 | Zoldi et al. | |
| 2023/0007007 A1 | 1/2023 | Manna | |

FOREIGN PATENT DOCUMENTS

| | | |
|---|---|---|
| EP | 1 239 378 | 9/2002 |
| EP | 1 301 887 | 4/2003 |
| EP | 1 591 931 | 11/2005 |
| EP | 1 850 278 | 10/2007 |
| EP | 2 088 743 | 8/2009 |
| EP | 2 151 793 | 2/2010 |
| EP | 2 472 423 | 7/2012 |
| GB | 2 102 606 | 2/1983 |
| JP | 2005-208945 | 8/2005 |
| KR | 10-2000-0063313 | 11/2000 |
| KR | 10-2002-0039203 | 5/2002 |
| KR | 10-2007-0081504 | 8/2007 |
| TW | I256569 | 6/2006 |
| WO | WO 91/16691 | 10/1991 |
| WO | WO 00/051052 | 8/2000 |
| WO | WO 00/055778 | 9/2000 |
| WO | WO 01/009752 | 2/2001 |
| WO | WO 01/009792 | 2/2001 |
| WO | WO 01/046889 | 6/2001 |
| WO | WO 01/084281 | 11/2001 |
| WO | WO 02/029636 | 4/2002 |
| WO | WO 2004/031986 | 4/2004 |
| WO | WO 2005/010683 | 2/2005 |
| WO | WO 2005/033979 | 4/2005 |
| WO | WO 2005/098630 | 10/2005 |
| WO | WO 2006/050278 | 5/2006 |
| WO | WO 2006/069199 | 6/2006 |
| WO | WO 2007/084555 | 7/2007 |
| WO | WO 2007/103203 | 9/2007 |
| WO | WO 2008/021104 | 2/2008 |
| WO | WO 2008/042614 | 4/2008 |
| WO | WO 2009/064694 | 5/2009 |
| WO | WO 2009/064840 | 5/2009 |
| WO | WO 2009/102391 | 8/2009 |
| WO | WO 2010/001406 | 1/2010 |
| WO | WO 2010/062537 | 6/2010 |
| WO | WO 2010/077989 | 7/2010 |
| WO | WO 2010/150251 | 12/2010 |
| WO | WO 2011/005876 | 1/2011 |
| WO | WO 2011/109576 | 9/2011 |
| WO | WO 2012/097171 | 7/2012 |
| WO | WO 2013/015746 | 1/2013 |
| WO | WO 2019/089439 | 5/2019 |
| WO | WO 2020/051154 | 3/2020 |
| WO | WO 2020/072239 | 4/2020 |

OTHER PUBLICATIONS

U.S. Appl. No. 12/705,489, filed Feb. 12, 2010, Bargoli et al.
U.S. Appl. No. 12/705,511, filed Feb. 12, 2010, Bargoli et al.
Actuate, "Delivering Enterprise Information for Corporate Portals", White Paper, 2004, pp. 1-7.
"Aggregate and Analyze Social Media Content: Gain Faster and Broader Insight to Market Sentiment," SAP Partner, Mantis Technology Group, Apr. 2011, pp. 4.
Aktas et al., "Personalizing PageRank Based on Domain Profiles", WEBKDD workshop: Webmining and Web Usage Analysis, Aug. 22, 2004, pp. 83-90.
Aktas et al., "Using Hyperlink Features to Personalize Web Search", WEBKDD workshop: Webmining and Web Usage Analysis, Aug. 2004.
"Arizona Company Has Found Key in Stopping ID Theft," PR Newswire, New York, Aug. 10, 2005 http://proquest.umi.com/pqdweb?did=880104711&sid=1&Fmt=3&clientId=19649&RQT=309&Vname=PQD.
ABC News Now:Money Matters, as broadcasted Nov. 15, 2005 with guest Todd Davis (CEO of Lifelock), pp. 6.
Anonymous, "Credit-Report Disputes Await Electronic Resolution," Credit Card News, Chicago, Jan. 15, 1993, vol. 5, No. 19, p. 5.
Anonymous, "MBNA Offers Resolution of Credit Card Disputes," Hempstead, Feb. 2002, vol. 68, No. 2, p. 47.
Anonymous, "Feedback", Credit Management, ABI/INFORM Global, Sep. 2006, pp. 6.
Awoonor-Williams, Princess Josephine, Ph.D. "Gender and Credit: An Analysis of Women's Experience in the Credit Market", ProQuest Dissertations and Theses, May 2004, pp. 148.
"Beware of 'Who Viewed My Profile' Apps on Facebook" Tech for Luddites, Mar. 15, 2010 printed Sep. 27, 2013 http://www.techforluddites.com/2010/03/beware-of-who-viewed-my-profile-apps-on-facebook.html.
Bielski, Lauren, "Will you Spend to Thwart ID Theft?" ABA Banking Journal, Apr. 2005, pp. 54, 56-57, 60.
BlueCava, "What We Do", http://www.bluecava.com/what-we-do/, printed Nov. 5, 2012 in 3 pages.
Buxfer, http://www.buxfer.com/ printed Feb. 5, 2014 in 1 page.
Check, http://check.me/ printed Feb. 5, 2014 in 3 pages.
Chores & Allowances, "Do Kids Have Credit Reports?" Oct. 15, 2007, http://choresandallowances.blogspot.com/2007/10/do-kids-have-credit-reports.html, pp. 5.
Comlounge.net, "plonesocial.auth.rpx" http://web.archive.org/web/20101026041841/http://comlounge.net/rpx as captured Oct. 26, 2010 in 9 pages.
CreditKarma, http://www.creditkarma.com printed Feb. 8, 2013 in 2 pages.
CreditSesame, http://www.creditsesame.com/how-it-works/our-technology/ printed Feb. 5, 2013 in 2 pages.
Collins, Michael J., "Exploring the Design of Financial Counseling for Mortgage Borrowers in Default," Journal of Family and Economic Issues, Springer Science+Business Media, Mar. 13, 2007, pp. 207-226.
Consumer Financial Protection Bureau (CFPB): Analysis of Difference between Consumer- and Creditor-Purchased Credit Scores, Sep. 2012, pp. 1-42.

(56) References Cited

OTHER PUBLICATIONS

"Consumers Gain Immediate and Full Access to Credit Score Used by Majority of U.S. Lenders", PR Newswire, ProQuest Copy, Mar. 19, 2001, p. 1.
"CreditCheck Monitoring Services," Dec. 11, 2000, pp. 1, lines 21-23.
"Credit Improvement", CreditRepair.com, Mar. 10, 2010, http://web.archive.org/web/20100310134914/http://www.creditrepair.com/credit/, as archived Mar. 10, 2010 in 2 pages.
Credit Plus, Inc., "Score Wizard", http://web.archive.org/web/20030806080310/www.creditplus.com/scorewizard.asp, as archived Aug. 6, 2003 in 1 page.
Cullen, Terri; "The Wall Street Journal Complete Identity Theft Guidebook:How to Protect Yourself from the Most Pervasive Crime in America"; Chapter 3, pp. 59-79; Jul. 10, 2007.
"D&B Corporate Family Linkage", D&B Internet Access for U.S. Contract Customers, https://www.dnb.com/ecomp/help/linkage.htm as printed Dec. 17, 2009, pp. 1.
"Data Loss Prevention (DLP) Software", http://www.symantec.com/data-loss-prevention/ printed Apr. 8, 2013 in 8 pages.
"Data Protection", http://compliantprocessing.com/data-protection/ printed Apr. 8, 2013 in 4 pages.
Day, Jo and Kevin; "ID-ology: A Planner's Guide to Identity Theft"; Journal of Financial Planning:Tech Talk; pp. 36-38; Sep. 2004.
"Debt Settlement: Watch Video on how to Pay Your Debt Faster", http://www.debtconsolidationcare.com/debt-settlement.html printed Jan. 9, 2013 in 6 pages.
Demby, Elayne, "Special Report: Letting Consumers Know the Score—and More", Collections and Credit Risk, New York, Feb. 2003, vol. 8, Issue 2, p. 53, pp. 3.
"Disputes in Cyberspace 2001: Update of online dispute resolution for consumers in cross-border disputes", Consumers International, Nov. 2001, pp. 45, http://web.archive.org/web/20160414183303/http://www.consumersinternational.org/media/304196/disputes%20in%20cyberspace%202001.%20update%20of%20online%20dispute%20resolution%20for%20consumers%20in%20cross-border%20disputes..pdf.
Elangovan, A.R., "Managerial Third-Party Dispute Intervention: A Prescriptive Model of Strategy Selection", Academy of Management, Oct. 1, 1995, vol. 20, No. 4, pp. 800-830.
Elliehausen et al., The Impact of Credit Counseling on Subsequent Borrower Behavior, The Journal of Consumer Affairs, Summer 2007, vol. 41, No. 1, pp. 1-28.
Equifax, "Business Status Alerts: User Guide", Jul. 2009, pp. 1-21.
Equifax Consumer Credit Report http://www.equifax.com/home/, as retrieved on Sep. 17, 2008.
Equifax; "Equifax Credit Watch"; https://www.econsumer.equifax.co.uk/consumer/uk/sitepage.ehtml, dated Jun. 27, 2007 on www.archive.org.
"Equifax: Debt Wise™ Credit Monitoring Service," Product Review, http://www.mdmproofing.com/iym/reviews/equifax/debt-wise/, Jan. 2010, pp. 11.
Equifax; "Places", http://web.archive.org/web/20111111113930/http://www.equifax.com/places as archived Nov. 11, 2011 in 1 page.
Equifax; "Places", http://www.equifax.com/places/ as printed Nov. 16, 2015 in 1 page.
Equifax; "Welcome to Equifax Mobile", http://www.equifax.com/mobile/ as printed Mar. 18, 2011 in 2 pages.
Ettorre, "Paul Kahn on Exceptional Marketing," Management Review, vol. 83, No. 11, Nov. 1994, pp. 48-51.
Experian Consumer Credit Report http://www.experian.com/, as retrieved on Sep. 17, 2008.
Facebook, "Facebook helps you connect and share with the people in your life," www.facebook.com printed Nov. 16, 2010 in 1 page.
FamilySecure.com, "Frequently Asked Questions", http://www.familysecure.com/FAQ.aspx as archived Jul. 15, 2007 in 3 pages.
FamilySecure.com; "Identity Theft Protection for the Whole Family | FamilySecure.com" http://www.familysecure.com/, as retrieved on Nov. 5, 2009.
Fenner, Peter, "Mobile Address Management and Billing for Personal Communications", 1st International Conference on Universal Personal Communications, 1992, ICUPC '92 Proceedings, pp. 253-257.
"Fictitious Business Name Records", Westlaw Database Directory, http://directory.westlaw.com/scope/default.asp?db=FBN-ALL&RS-W...&VR=2.0 as printed Dec. 17, 2009, pp. 5.
Fisher, Greg, "Credit Score Distribution and Practical Range Statistics", Feb. 23, 2010, The Credit Scoring Site, pp. 2.
Fitzpatrick, Alex, "Facebook Monitors Your Chats for Criminal Activity [Report]," Mashable, Jul. 12, 2012 printed Sep. 27, 2013 http://mashable.com/2012/07/12/facebook-scanning-chats/.
"Fraud Alert | Learn How". Fight Identity Theft. http://www.fightidentitytheft.com/flag.html, accessed on Nov. 5, 2009.
"Fund Manager," Portfolio Management Software website, indexed into Google on Jan. 7, 2005, Retrieved Oct. 24, 2014 http://www.fundmanagersoftware.com/, http://www.fundmanagersoftware.com/help/gph_tp_pieasset.html, http://www.fundmanagersoftware.com/demo2.html.
Gibbs, Adrienne; "Protecting Your Children from Identity Theft," Nov. 25, 2008, http://www.creditcards.com/credit-card-news/identity-ID-theft-and-kids-children-1282.php, pp. 4.
"GLBA Compliance and FFIEC Compliance" http://www.trustwave.com/financial-services.php printed Apr. 8, 2013 in 1 page.
Gordon et al., "Identity Fraud: A Critical National and Global Threat," LexisNexis, Oct. 28, 2003, pp. 1-48.
"Guide to Benefits, MasterCard® Cardholder Smart Shopper Benefits", May 2005, pp. 10.
Herzberg, Amir, "Payments and Banking with Mobile Personal Devices," Communications of the ACM, May 2003, vol. 46, No. 5, pp. 53-58.
Hoofnagle, Chris Jay, "Identity Theft: Making the Known Unknowns Known," Harvard Journal of Law & Technology, Fall 2007, vol. 21, No. 1, pp. 98-122.
Hunt, Robert M.; Whither Consumer Credit Counseling? Business Review, Dec. 31, 2005, pp. 9-20.
ID Analytics, "ID Analytics® Consumer Notification Service" printed Apr. 16, 2013 in 2 pages.
ID Theft Assist, "Do You Know Where Your Child's Credit Is?", Nov. 26, 2007, http://www.idtheftassist.com/pages/story14, pp. 3.
"ID Thieves These Days Want Your Number, Not Your Name", The Columbus Dispatch, Columbus, Ohio, http://www.dispatch.com/content/stories/business/2014/08/03/id-thieves-these-days-want-your-number-not-your-name.html, Aug. 3, 2014 in 2 pages.
Identity Theft Resource Center; Fact Sheet 120 A—To Order a Credit Report for a Child; Fact Sheets, Victim Resources; Apr. 30, 2007.
"Identity Thieves Beware: Lifelock Introduces Nation's First Guaranteed Proactive Solution to Identity Theft Protection," PR Newswire, New York, Jun. 13, 2005 http://proquest.umi.com/pqdweb?did=852869731&sid=1&Fmt=3&clientId=19649&RQT=309&Vname=PQD.
Ideon, Credit-Card Registry that Bellyflopped this Year, Is Drawing some Bottom-Fishers, The Wall Street Journal, Aug. 21, 1995, pp. C2.
Information Brokers of America, "Information Brokers of America Child Identity Theft Protection" http://web.archive.org/web/20080706135451/http://iboainfo.com/child-order.html as archived Jul. 6, 2008 in 1 page.
Information Brokers of America, "Safeguard Your Child's Credit", http://web.archive.org/web/20071215210406/http://www.iboainfo.com/child-id-protect.html as archived Dec. 15, 2007 in 1 page.
Intelius, "People Search—Updated Daily, Accurate and Fast!" http://www.intelius.com/people-search.html ?=&gclid=CJqZIZP7paUCFYK5KgodbCUJJQ printed Nov. 16, 2010 in 1 page.
Iovation, Device Identification & Device Fingerprinting, http://www.iovation.com/risk-management/device-identification printed Nov. 5, 2012 in 6 pages.
Irby, LaToya, "How Will a Late Payment Hurt My Credit Score?" http://web.archive.org/web/20101024113603/http://credit.about.com/od/creditscorefaq/f/how-late-payment-affects-credit-score.htm, Oct. 24, 2010, pp. 1.

(56) References Cited

OTHER PUBLICATIONS

"Judging Credit: Consumers Need Better Finance Tools", News Journal, Daytona Beach, FL, Dec. 28, 2002.
Kaushik, Nishant, "The Epic Hacking of Mat Honan and Our Identity Challenge," Aug. 7, 2012, http://blog.talkingidentity.com/2012/08/the-epic-hacking-of-mat-honan-and-our-identity-challenge.html.
Khan, Mickey Alam, "Equifax Recognizes Changing Customer Behavior with Four-Pronged Mobile Strategy", Mobile Marketer, http://web.archive.org/web/20151117005818/http://www.mobilemarketer.com/cms/news/strategy/9733.html, Apr. 19, 2011 in 10 pages.
Lan, Joe, "The Top Portfolio Management Software," http://www.aaii.com/computerizedinvesting/article/the-top-portfolio-management-software, Includes Discussion thread, Fourth Quarter 2011, pp. 17.
Lang et al., "A Collaborative Web-Based Help-System", Proceedings of the 2nd international conference on web intelligence, mining and semantics, Jun. 13-15, 2012, pp. 5.
Lang et al., "An Avatar-Based Help System for Web-Portals", International Conference on Human-Computer Interaction, Springer, Berlin, Heidelberg, 2011, pp. 10.
Lanubile, et al., "Evaluating Empirical Models for the Detection of High-Risk Components: Some Lessons Learned", 20th Annual Software Engineering Workshop, Nov. 29-30, 1995, Greenbelt, Maryland, pp. 1-6.
Lauwers et al., "Five Hundred Years of Bookkeeping: A Portrait of Luca Pacioli", Tijdschrift voor Economie en Management, 1994, vol. 39. No. 3, pp. 289-304.
Lee, W.A.; "Experian, on Deal Hunt, Nets Identity Theft Insurer", American Banker: The Financial Services Daily, Jun. 4, 2003, New York, NY, 1 page.
Leskovec, Jure, "Social Media Analytics: Tracking, Modeling and Predicting the Flow of Information through Networks", WWW 2011-Tutorial, Mar. 28-Apr. 1, 2011, Hyderabad, India, pp. 277-278.
Letter to Donald A. Robert from Carolyn B. Maloney, dated Oct. 31, 2007, pp. 2.
Letter to Donald A. Robert from Senator Charles E. Schumer, dated Oct. 11, 2007, pp. 2.
Letter to Harry C. Gambill from Carolyn B. Maloney, dated Oct. 31, 2007, pp. 2.
Letter to Harry C. Gambill from Senator Charles E. Schumer, dated Oct. 11, 2007, pp. 2.
Letter to Richard F. Smith from Carolyn B. Maloney, dated Oct. 31, 2007, pp. 2.
Letter to Richard F. Smith from Senator Charles E. Schumer, dated Oct. 11, 2007, pp. 2.
Li et al., "Automatic Verbal Information Verification for User Authentication", IEEE Transactions on Speech and Audio Processing, vol. 8, No. 5, Sep. 2000, pp. 585-596.
LifeLock, http://web.archive.org/web/20110724011010/http://www.lifelock.com/? as archived Jul. 24, 2011 in 1 page.
LifeLock, "How LifeLock Works," http://www.lifelock.com/lifelock-for-people printed Mar. 14, 2008 in 1 page.
LifeLock, "LifeLock Launches First ID Theft Prevention Program for the Protection of Children," Press Release, Oct. 14, 2005, http://www.lifelock.com/about-us/press-room/2005-press-releases/lifelock-protection-for-children.
LifeLock; "How Can LifeLock Protect My Kids and Family?" http://www.lifelock.com/lifelock-for-people/how-we-do-it/how-can-lifelock-protect-my-kids-and-family printed Mar. 14, 2008 in 1 page.
LifeLock, "Personal Identity Theft Protection & Identity Theft Products," http://www.lifelock.com/lifelock-for-people, accessed Nov. 5, 2007.
LifeLock, Various Pages, www.lifelock.com/, Jan. 9, 2007, pp. 49.
Littwin, Angela, "Beyond Usury: A Study of Credit-Card Use and Preference Among Low-Income Consumers", Texas Law Review, vol. 86, No. 3, pp. 451-506; Feb. 2008.
Lobo, Jude, "MySAP.com Enterprise Portal Cookbook," SAP Technical Delivery, Feb. 2002, vol. 1, pp. 1-13.
Lund, Graham, "Credit Bureau Data: Maximizing the Benefits," Credit Management, May 2004, ProQuest Central, pp. 44-45.
Magid, Lawrence, J., Business Tools: When Selecting an ASP Ensure Data Mobility, Los Angeles Times, Los Angeles, CA, Feb. 26, 2001, vol. C, Issue 4, pp. 3.
"Managing Debt?" Federal Trade Commission: Consumer Information, http://www.consumer.ftc.gov/articles/0158-managing-debt, printed Mar. 22, 2013 in 4 pages.
Manilla, http://www.manilla.com/how-it-works/ printed Feb. 5, 2014 in 1 page.
Mannan et al., "Mercury: Recovering Forgotten Passwords Using Personal Devices*", Dec. 17, 2011, Pre-Proceedings of Financial Cryptography and Data Security 2011, pp. 1-16.
Meyers et al., "Using Your Social Networking Accounts To Log Into NPR.org," NPR.org, Jun. 24, 2010, http://web.archive.org/web/20100627034054/http://www.npr.org/blogs/inside/2010/06/24/128079309/using-your-social-networking-accounts-to-log-into-npr-org in 3 pages.
Micarelli et al., "Personalized Search on the World Wide Web," The Adaptive Web, LNCS 4321, 2007, pp. 195-230.
Microsoft, "Expand the Reach of Your Business," Microsoft Business Solutions, 2004, in 16 pages.
Mint.com, http://www.mint.com/ printed Sep. 18, 2008 in 2 pages.
Mint.com, http://www.mint.com/how-it-works/ printed Feb. 5, 2013 in 2 pages.
MS Money Software by Microsoft http://www.microsoft.com/Money/default.mspx as retrieved on Sep. 17, 2008.
Mvelopes, http://www.mvelopes.com/ printed Feb. 5, 2014 in 2 pages.
My Call Credit http://www.mycallcredit.com/products.asp?product=ALR dated Dec. 10, 2005 on www.archive.org.
My Call Credit http://www.mycallcredit.com/rewrite.asp?display=faq dated Dec. 10, 2005 on www.archive.org.
My ID Alerts, "Why ID Alerts" http://www.myidalerts.com/why-id-alerts.jsps printed Apr. 3, 2012 in 2 pages.
My ID Alerts, "How it Works" http://www.myidalerts.com/how-it-works.jsps printed Apr. 3, 2012 in 3 pages.
MyRatePlan.com, "Cell Phone Buying Guide", http://web.archive.org/web/20061116103256/http://myrateplan.com/cell_phone_buying_guide/family_plans/ , as archived Nov. 16, 2006 in 2 pages.
MyReceipts, http://www.myreceipts.com/, printed Oct. 16, 2012 in 1 page.
MyReceipts—How it Works, http://www.myreceipts.com/howItWorks.do, printed Oct. 16, 2012 in 1 page.
"Name Availability Records", Westlaw Database Directory, http://directory.westlaw.com/scope/default.asp?db=NA-ALL&RS=W...&VR=2.0 as printed Dec. 17, 2009, pp. 5.
National Alert Registry Launches RegisteredOffendersList.org to Provide Information on Registered Sex Offenders, May 16, 2005, pp. 2, http://www.prweb.com/printer/240437.htm accessed on Oct. 18, 2011.
National Alert Registry Offers Free Child Safety "Safe From Harm" DVD and Child Identification Kit, Oct. 24, 2006. pp. 2, http://www.prleap.com/pr/53170 accessed on Oct. 18, 2011.
National Alert Registry website titled, "Does a sexual offender live in your neighborhood", Oct. 22, 2006, pp. 2, http://web.archive.org/wb/20061022204835/http://www.nationallertregistry.com/ accessed on Oct. 13, 2011.
"New for Investors: Asset Allocation, Seasoned Returns and More," Prosper, http://blog.prosper.com/2011/10/27/new-for-investors-asset-allocation-seasoned-returns-and-more/, Oct. 27, 2011, pp. 4.
Next Card: About US, http://web.cba.neu.edu/~awatson/NextCardCase/NextCardAboutUs.htm printed Oct. 23, 2009 in 10 pages.
Ogg, Erica, "Apple Cracks Down on UDID Use", http://gigaom.com/apple/apple-cracks-down-on-udid-use/ printed Nov. 5, 2012 in 5 Pages.
Oracle: Recommendations for Leveraging the Critical Patch Update and Maintaining a Proper Security Posture, Nov. 2010, An Oracle White Paper, pp. 1-30.
Organizing Maniac's Blog—Online Receipts Provided by MyQuickReceipts.com, http://organizingmaniacs.wordpress.com/

(56) References Cited

OTHER PUBLICATIONS

2011/01/12/online-receipts-provided-by-myquickreceipts.com/ dated Jan. 12, 2011 printed Oct. 16, 2012 in 3 pages.
Paustian, Chuck, "Every Cardholder a King Customers get the Full Treatment at Issuers' Web Sites," Card Marketing, New York, Mar. 2001, vol. 5, No. 3, pp. 4.
Peltier, Jon, "Conditional Formatting of Excel Charts", Peltier Tech Blog, as posted Feb. 13, 2012, http://peltiertech.com/conditional-formatting-of-excel-charts/, pp. 1-5.
People Finders, http://www.peoplefinders.com/?CMP=Google&utm_source=google&utm_medium=cpc printed Nov. 16, 2010 in 1 page.
People Lookup, "Your Source for Locating Anyone!" www.peoplelookup.com/people-search.html printed Nov. 16, 2010 in 1 page.
People Search, "The Leading Premium People Search Site on the Web," http://www.peoplesearch.com printed Nov. 16, 2010 in 2 pages.
PersonalCapital.com, http://www.personalcapital.com/how-it-works printed Feb. 5, 2014 in 5 pages.
Phinisee, Tamarind, "Banks, FTC Step Up Efforts to Address Identity Theft", San Antonio Business Journal; San Antonio, Jul. 5, 2002, vol. 16, No. 24, pp. 5.
Pinola, Melanie, "How Can I Protect Against Social Engineering Hacks?" Aug. 9, 2012, http://lifehacker.com/5933296/how-can-i-protect-against-hackers-who-use-sneaky-social-engineering-techniques-to-get-into-my-accounts.
Planet Receipt—Home, http://www.planetreceipt.com/home printed Oct. 16, 2012 in 1 page.
Planet Receipt—Solutions & Features, http://www.planetreceipt.com/solutions-features printed Oct. 16, 2012 in 2 pages.
Planwise, http://planwise.com printed Feb. 8, 2013 in 5 pages.
Press Release—"Helping Families Protect Against Identity Theft—Experian Announces FamilySecure.com; Parents and guardians are alerted for signs of potential identity theft for them and their children; product features an industry-leading $2 million guarantee"; PR Newswire; Irvine, CA; Oct. 1, 2007.
PrivacyGuard, http://web.archive.org/web/20110728114049/http://www.privacyguard.com/ as archived Jul. 28, 2011 in 1 page.
Privacy Rights Clearinghouse, "Identity Theft: What to do if it Happens to You," http://web.archive.org/web/19990218180542/http://privacyrights.org/fs/fs17a.htm printed Feb. 18, 1999.
"Qualifying For Debt Settlement", http://www.certifieddebt.com/debt/settlement-qualifications.shtml printed Jan. 9, 2013 in 2 pages.
Quantix Software, "Investment Account Manager," available at https://www.youtube.com/watch?v=1UwNTEER1Kk, as published Mar. 21, 2012.
Quicken Online by Intuit http://www.quicken.intuit.com/, as retrieved on Sep. 17, 2008.
"Quicken Support", http://web.archive.org/web/20071231040130/http://web.intuit.com/support/quicken/docs/d_qif.html as archived Dec. 31, 2007 in 6 pages.
Ramaswamy, Vinita M., Identity-Theft Toolkit, The CPA Journal, Oct. 1, 2006, vol. 76, Issue 10, pp. 66-70.
Rawe, Julie; "Identity Thieves", Time Bonus Section, Inside Business, Feb. 2002, pp. 2.
Repici et al., "The Comma Separated Value (CSV) File Format", http://creativyst.com/Doc/Articles/CSV/CSV01.htm, Creativyst, Inc., 2002, pp. 10.
Reppler.com, "Learn More: Basic Information about how TrustedID Reppler Works For You," www.reppler.com/learn/ printed Oct. 24, 2012 in 2 pages.
"Resolve Debt for Less: With Help from Freedom Financial" http://www.debtsettlementusa.com/ printed Jan. 9, 2013 in 6 pages.
Romig, Shane, "The Truth About Credit Repair", Credit.com, May 5, 2010, http://web.archive.org/web/20100505055526/http://www.credit.com/credit_information/credit_help/The-Truth-About-Credit-Repair.jsp printed Mar. 22, 2013 in 4 pages.
Roth, Andrew, "CheckFree to Introduce E-Mail Billing Serving," American Banker, New York, Mar. 13, 2001, vol. 166, No. 49, pp. 3.
SAS, "SAS® Information Delivery Portal", Fact Sheet, 2008, in 4 pages.
Schmidt et al., "A Set of Multi-Touch Graph Interaction Techniques", ITS '10, Nov. 7-10, 2010, Saarbrucken, Germany, pp. 1-4.
Scholastic Inc.:Parent's Request for Information http://web.archive.org/web/20070210091055/http://www.scholastic.com/inforequest/index.htm as archived Feb. 10, 2007 in 1 page.
Scholastic Inc.:Privacy Policy http://web.archive.org/web/20070127214753/http://www.scholastic.com/privacy.htm as archived Jan. 27, 2007 in 3 pages.
Screenshot for Investment Account Manager v.2.8.3, published at http://www.aaii.com/objects/get/1642.gif by at least Aug. 30, 2011 in 1 page.
Sealey, Geraldine, "Child ID Theft Can Go Unnoticed for Years", http://abcnews.go.com/US/story?id=90257, Sep. 12, 2003 in 9 pages.
"Settling Your Debts—Part 1 in Our Debt Settlement Series", http://www.creditinfocenter.com/debt/settle_debts.shtml printed Jan. 9, 2013 in 6 pages.
Shin, Laura, "See An Error On Your Credit Report? Credit Karma Now Makes It Easy To Dispute", Nov. 12, 2015, http://www.forbes.com/sites/laurashin/2015/11/12/see-an-error-on-your-credit-report-credit-karma-now-makes-it-easy-to-dispute/, pp. 4.
ShoeBoxed, https://www.shoeboxed.com/sbx-home/ printed Oct. 16, 2012 in 4 pages.
Simpson, Glyn, "Microsoft (MS) Money MSMoney FAQ, Help and Information Pages", pp. 2, Copyright © Glyn Simpson 1998-2007, http://web.archive.org/web/20071018075531/http://money.mvps.org/faq/article/196.aspx.
Singletary, Michelle, "The Littlest Victims of ID Theft", The Washington Post, The Color Of Money, Oct. 4, 2007.
Solapurkar, Prajakta, "Building Secure Healthcare Services Using OAuth 2.0 and JSON Web Token in IOT Cloud Scenario", IEEE, 2nd International Conference on Contemporary Computing and Informatics (ic3i), 2016, pp. 99-104.
Srinivasa et al., "Augmented Reality Adaptive Web Content", 2016 13th IEEE Annual w Consumer Communications & Networking Conference (CCNC), pp. 4.
Stauffer et al., "Using HTML 3.2," Second Edition, 1996, Que Publishing, pp. 192-193.
Tajik, S., "Conditional Plotting, Changing Color of Line Based on Value", MathWorks®, MATLAB Answers™, Question Posted Feb. 10, 2011 to https://www.mathworks.com/matlabcentral/answers/1156-conditional-plotting-changing-color-of-line-based-on-value?requestedDomain=www.mathworks.com, pp. 8.
TheMorningCall.Com, "Cheap Ways to Foil Identity Theft," www.mcall.com/business/columnists/all-karp.5920748jul01,0 . . . , published Jul. 1, 2007.
Thompson, Herbert H., "How I Stole Someone's Identity", https://www.scientificamerican.com/article/anatomy-of-a-social-hack/#, Aug. 18, 2008, pp. 5.
Todorova, Aleksandra, "Protecting Your Child's Identity", Smart Money, Published Aug. 2, 2007, pp. 1-5.
"TransUnion—Child Identity Theft Inquiry", TransUnion, http://www.transunion.com/corporate/personal/fraudIdentityTheft/fraudPrevention/childIDInquiry.page as printed Nov. 5, 2009 in 4 pages.
TransUnion Consumer Credit Report http://www.transunion.com/, as retrieved on Sep. 17, 2008.
Truston, "Checking if your Child is an ID Theft Victim can be Stressful," as posted by Michelle Pastor on Jan. 22, 2007 at http://www.mytruston.com/blog/credit/checking_if_your_child_is_an_id_theft_vi.html.
US Legal, Description, http://www.uslegalforms.com/US/US-00708-LTR.htm printed Sep. 4, 2007 in 2 pages.
"Use of Alternative Data to Enhance Credit Reporting to Enable Access to Digital Financial Services by Individuals and SMEs Operating in the Informal Economy", Guidance Note, International Committee on Credit Reporting (ICCR), Jun. 28, 2018, pp. 35.
Vamosi, Robert, "How to Handle ID Fraud's Youngest Victims," Nov. 21, 2008, http://news.cnet.com/8301-10789_3-10105303-57.html.
Waggoner, Darren J., "Having a Global Identity Crisis," Collections & Credit Risk, Aug. 2001, vol. vol. 6, No. 8, pp. 6.

(56) References Cited

OTHER PUBLICATIONS

Wesabe.com http://www.wesabe.com/, as retrieved on Sep. 17, 2008.
Yahoo! Search, "People Search," http://people.yahoo/com printed Nov. 16, 2010 in 1 page.
YODLEE | Money Center, https://yodleemoneycenter.com/ printed Feb. 5, 2014 in 2 pages.
You Need A Budget, http://www.youneedabudget.com/features printed Feb. 5, 2014 in 3 pages.
"12 Mag: How Debt Settlement is Helpful in Improving the Credit Score", Weblog post. Newstex Trade & Industry Blogs, Newstex, Oct. 8, 2017, pp. 2.
Caldeiira et al., "Characterizing and Preventing Chargebacks in Next Generation Web Payments Services", 2012 Fourth International Conference on Computational Aspects of Social Networks (CASON), 2012 IEEE, pp. 333-338.
Gramazio, Connor C., "Colorgorical: Creating Discriminable and Preferable Color Palettes for Information Visualization", IEEE Transactions on Visualization and Computer Graphics, Jan. 2017, vol. 23, No. 1, pp. 521-530.
Koka et al., "Online Review Analysis by Visual Feature Selection", 2017 IEEE 15th Intl Conf on Dependable, Autonomic and Secure Computing, 15th Intl Conf on Pervasive Intelligence and Computing, 3rd Intl Conf on Big Data Intelligence and Computing and Cyber Science and Technology Congress (DASC/PiCom/DataCom/CyberSciTech), 2017, pp. 1084-1091.
Peng et al., "Factors Affecting Online Purchase Behavior: Implications to Improve the Existing Credit Rating System", 2009 International Conference on Management and Service Science, 2009 IEEE, pp. 1-4.
Shibata et al., "3D Retrieval System Based on Cognitive Level—Human Interface for 3D Building Database", Proceedings of the 2004 International Conference on Cyberworlds (CW'04), 2004, pp. 6.

* cited by examiner

SYSTEM AND METHOD FOR AN AUGMENTED REALITY EXPERIENCE VIA AN ARTIFICIAL INTELLIGENCE BOT

CROSS-REFERENCE TO RELATED APPLICATIONS

This application is a continuation and claims priority from U.S. application Ser. No. 16/797,697 filed on Feb. 21, 2020 which claims priority from provisional App. No. 62/809,469, filed on Feb. 22, 2019 and provisional U.S. Pat. App. No. 62/832,159, filed on Apr. 10, 2019, which are hereby incorporated by reference in their entirety.

SUMMARY

In traditional customer servicing environments, users are wary of being served by bots because they often feel a dehumanizing experience. Also in modern times, users are also more concerned with their information privacy than ever; they want to restrict the access of Personally Identifiable Information ("PII") to third parties. However, through the use of augmented reality and artificial intelligence bots that handle fulfillment, embodiments of an augmented reality user service experience system of the present disclosure can deliver both a rich customer experience that can also preserve user privacy.

The current limitation of bots is that they can only fulfill a pre-programed set of actions. Furthermore, those bots inform the user what to do based entirely on rules-based logic. Through the application of Artificial intelligence ("AI"), embodiments of the augmented reality ("AR") user service experience system of the present disclosure can expand a bot's set of actions. The artificial intelligence within the bot can enable the bot to learn and eventually adapt to different circumstances in order to better serve the user. At the same time, by moving to a paradigm where the bot is deployed in augmented reality, the bots of the augmented reality user service experience system can display visual indicators to a user to show the user specific steps on how to fulfill their request, which can result in a better digital replication of a more human experience.

In some embodiments, the augmented reality user service experience system can connect to a mobile phone via a mobile application. The camera of the mobile phone can take a picture of a screen of a second device, such as a laptop or tablet, which is hosting a webpage or an application. The augmented reality user service experience system can deploy an avatar on the mobile phone that hosts the AI bot, and/or the augmented reality user service experience system can deploy the AI bot in the background of the camera. The augmented reality user service experience system can deploy the bot without a visual representation on screen. The camera (or other sensor) can detect some information on the screen it is viewing, such as an anchor, a visual fingerprint, a moving image such as a video or animated file, and/or the like, which is sent to the hosted AI bot. The AI bot can make certain decisions based on the captured image, audio, video, or sensor data, and react accordingly to deliver an immersive experience for the user.

For example, if the length of a webpage exceeds the viewable area of the screen based on the resolution, the user may be looking for a particular control and/or function on another portion of the page that is different from that which is currently being displayed, and thus may not be able to find it. The bot may identify the item the user is looking for based on assessment of the user intent and direct the user where to find the item he or she is looking for. If the control and/or function is off the screen (or on another page of the website), the bot may display or provide an indication to move to another page or portion of the current page, such as, for example, a visual indicator to the user to scroll up or down, and/or a visual indicator of the bot pointing above or below the screen. After the control and/or function of interest appears on the screen, the representation of the bot can overlay onto the control and/or function to show the user where exactly on the screen the item he or she is looking for is located.

In some embodiments, if there is no bot overlay, the camera or sensor could either overlay directly with a marker that highlights the item, or the augmented reality user service experience system could control the scrolling of the other session to display that item on the website itself. Advantageously, embodiments of the augmented reality user service experience system can improve on the technical problem of having limited display real estate, such as, for example, not having enough space (such as a small screen of a mobile device) to cover a large display area (such as a long webpage). The augmented reality user service experience system can direct the user to a portion of the screen that is not currently being shown based on an assessment of the intent of the user. The user may be a user of a system or device and may include consumers or customers.

Additionally in other embodiments, the bot can communicate with the screen session's website and reload the page entirely. This embodiment can occur in solutions where the bot experience does not control the complete session, but would need to assume control in order to deliver an enhanced user experience to the consumer. In order to assume control, the screen experience can include a browser plugin, be within a mobile app (where the browser is an overlay within the app), or within an iframe of a browser where the iframe can communicate with the bot.

Traditional customer self-service systems do not combine augmented reality functionality with artificial intelligence applications. In some embodiments, the augmented reality user service experience system merges artificial intelligence and augmented reality to show users how to perform certain actions (for example, scrolling, click locations for the "buy" button), instead of simply being told what to do (for example, click on the "buy" button).

Currently there are no self-service methods where users are shown what actions to take. Even if another third party agent is involved, there is technical risk. Since showing another third party agent personal identifiable information introduces sensitive information to a third party, the showing of sensitive information is subject to data security issues. If via transfer of the data to the third party agent and/or at the third party agent servers, the data including sensitive information can be intercepted or hacked. Advantageously, embodiments of the augmented reality user service experience system improve the technical issue of data security by not having to subject the sensitive issues to a third party agent. The augmented reality user service experience system can process the data internally on the two devices, such as the mobile phone, a laptop, an AR/VR device, a tablet and/or the like. For the purposes of this disclosure, a mobile phone and a laptop will be described, but it is understood that other devices alone or in combination can be used. In some embodiments, the data transfer can be limited to transfer between the two devices to limit external third party data transfer. In other embodiments, no data may be transferred between the two devices other than the mobile device capturing (such as via a camera) visual data displayed by the other device, such that the mobile device may suggest to a user information for the user to manually enter via the other device (e.g., via a laptop displaying a website or other user interface).

Features are described for embodiments of an augmented reality user service experience system that uses artificial intelligence and/or a bot. In some embodiments, the augmented reality user service experience system provides a two-dimensional (2D) presentation layer that can enable electronic connection to or communications with a bot that can correspond with a webpage, an application (such as a mobile application), a mobile device, and/or the like.

Embodiments of the augmented reality user service experience system can enable a bot to identify a web page and/or web application on one device (such as a laptop) from data (such as an image) captured by a second device (such as a mobile phone). By doing so, the augmented reality user service experience system can deliver a new user experience wherein users can be shown particular steps to perform through an augmented reality display. Advantageously, the augmented reality user service experience system can guide the user to perform certain steps on the first device through the display on the second device, such as a series of clicks on the website to fix things, rather than simply being told what to look for. Embodiments of the augmented reality user service experience system can deliver a new paradigm of customer service where users can be provided highly relevant and specific information useful for the user's purpose. Moreover, the augmented reality user service experience system can provide service to the users while preserving their personally identifiable information ("PII").

In some embodiments, the augmented reality user service experience system can include and/or embed anchors within the website or application. In some embodiments, the augmented reality user service experience system can read anchors embedded within a website or application. In some embodiments, a sensor (such as a camera) on a second device can capture an image of the anchors on a website, and the second device can process the image to determine where certain items on the webpage or application are located.

In some embodiments, a smart phone running a mobile application can launch an AR bot. The user can send a request to the phone to find a particular setting or option for a webpage, such as a selectable button to apply for a loan. The bot can cause the mobile phone to display visual indicators that indicate points on the screen (or in the direction off screen to help navigation) where the setting or option is located. The visual indicators can include three dimensional renderings, such as an avatar that points in a certain direction. If the setting or controllable option is on a different screen, the visual indicators can indicate the page and/or indicate locations of navigation controls that can send the user to the correct page.

In some embodiments, a user can be browsing through a webpage, but may be having trouble figuring out how to lock his or her credit file, or revoke permission to share data with a third party. The user can ask the augmented reality user service experience system "Where is the setting or option to lock my credit?" The bot of the augmented reality user service experience system can indicate to the user to launch a particular mobile application on the user's phone and point the camera toward the user's laptop screen. After the mobile application is launched, the session on the mobile application can synchronize with the screen session on the user's laptop screen. The bot can identify that the data captured by the mobile phone camera and the website screen are synced as both are active at the same time. The bot can launch active content on a user interface of the phone and/or can scan the screen to determine how to process the request. The bot can cause display on the mobile device visual indicators that can show the user where the setting or option for the credit lock/unlock is located.

Advantageously, in some embodiments, the augmented reality user service experience system can deliver a "Showing" experience to the user, displaying visual indicators on the mobile device that show the user how to perform certain functions on another device. Embodiments of the augmented reality user service experience system improve the technical problem of graphical user interfaces with limited user interface real estate. Moreover, the augmented reality user service experience system uses a specific and useful way to convey information through a computer interface.

Some embodiments include a method comprising: capturing, by a camera of a mobile phone, an image of a display screen of a computer, wherein the display screen displays a user interface presented by the computer, wherein the computer is a different device than the mobile phone and is physically separate from the mobile phone; identifying, by the mobile phone based on image analysis of the image captured by the mobile phone, an anchor within the user interface as depicted in the image of the display screen; determining one or more content items displayed within the user interface based at least in part on the anchor; identifying an intent of a user based on the determined one or more content items, wherein the intent relates to interaction by the user with the user interface presented by the computer; determining supplemental content associated with the intent, wherein the supplemental content comprises instructions or a recommendation regarding one or more of (a) interacting with the user interface via the computer or (b) information for the user to provide to the user interface via the computer; generating a three-dimensional rendering associated with the supplemental content; orienting the three-dimensional rendering relative to the anchor; and displaying, on the mobile phone, a modified image that places the oriented three-dimensional rendering in coordinates of the image that are determined based at least in part on a position of the anchor within the image.

In some embodiments, the three-dimensional rendering includes an avatar.

In some embodiments, the intent corresponds to a portion of a website that is not currently displayed on the screen of the computer, and wherein the avatar provides information directing the user to the portion of the website not currently displayed.

In some embodiments, the avatar provides information by pointing in a direction for the user to scroll on the website.

In some embodiments, the intent corresponds to a portion of a website that is currently displayed on the screen of the computer, and wherein the avatar points to the portion of the website that corresponds to the display.

Some embodiments include a system comprising: memory; and one or more processors configured by specific executable instructions to: initiate capture, by a camera of a mobile phone, an image of a user interface displayed on a computer, wherein the computer is a different device than the mobile phone and is physically separate from the mobile phone; identify, based on image analysis of the image captured by the mobile phone, an anchor within the user interface as depicted in the image of the user interface displayed on the computer; determine one or more content items displayed within the user interface based at least in part on the anchor; identify an intent of a user based on the determined one or more content items; determine supplemental content associated with the intent; generate a three-dimensional rendering associated with the supplemental content; orient the three-dimensional rendering relative to the anchor; and display, on the mobile phone, a modified image that places the oriented three-dimensional rendering in coordinates of the image that are determined relative to the anchor.

In some embodiments, the executable instructions are implemented by a processing agent that is configured to perform processes across a plurality of devices, including the second device.

In some embodiments, to identify the intent of the user is further based on an audio snippet played from the computer and received by a microphone on the mobile device.

In some embodiments, the one or more processors are further configured to match the audio snippet with a pre-stored audio fingerprint, wherein the audio snippet comprises at least one of: a chime, audio played in the background, or audio of a certain frequency beyond the human range of hearing.

In some embodiments, the one or more processors are further configured determine a distance between the mobile phone and the computer based on a time stamp for the mobile phone receiving the audio anchor.

In some embodiments, the one or more processors are further configured to determine a distance between the computer and the mobile phone based on a size of at least a portion of the image captured by the mobile phone.

In some embodiments, the one or more processors are further configured to determine size of the three-dimensional rendering based on a size of at least a portion of the image captured by the mobile phone.

In some embodiments, the three-dimensional rendering includes an avatar.

In some embodiments, the intent corresponds to a portion of a website that is not currently displayed on the computer, and wherein the avatar provides information directing the user to the portion of the website not currently displayed.

In some embodiments, the intent corresponds to a portion of a website that is currently displayed on the computer, and wherein the avatar points to the portion of the website that corresponds to the display.

Some embodiments include a non-transitory computer storage medium storing computer-executable instructions that, when executed by a processor, cause the processor to perform operations comprising: initiating capture, by a camera of a mobile computing device, an image of a user interface displayed on a computer, wherein the computer is a different device than the mobile computing device and is physically separate from the mobile computing device; identifying, based on image analysis of the image captured by the mobile computing device, an anchor within the user interface as depicted in the image of the user interface displayed on the computer; determining one or more content items displayed within the user interface based at least in part on the anchor; identifying an intent of a user based on the determined one or more content items; determining supplemental content associated with the intent; generating a three-dimensional rendering associated with the supplemental content; orienting the three-dimensional rendering relative to the anchor; and displaying, on the mobile computing device, a modified image that places the oriented three-dimensional rendering in coordinates of the image that are determined based at least in part on a position of the anchor.

In some embodiments, the operations further comprise receiving a user selection of an option corresponding to the three-dimensional rendering, wherein in response to the user selection, the computer changes the display to correspond to the user selection.

In some embodiments, the computer adjusts the size of the first anchor based on the size of a display for the mobile device.

In some embodiments, the supplemental content is specific to a particular website presented within the user interface, wherein the particular website is determined based at least in part on one or more of: the anchor or the one or more content items.

In some embodiments, the three-dimensional rendering includes an avatar, wherein the intent corresponds to a portion of a website that is not currently displayed on the computer, and wherein the avatar provides information directing the user to the portion of the website not currently displayed.

DETAILED DESCRIPTION

Computing Device

Figure 1A:
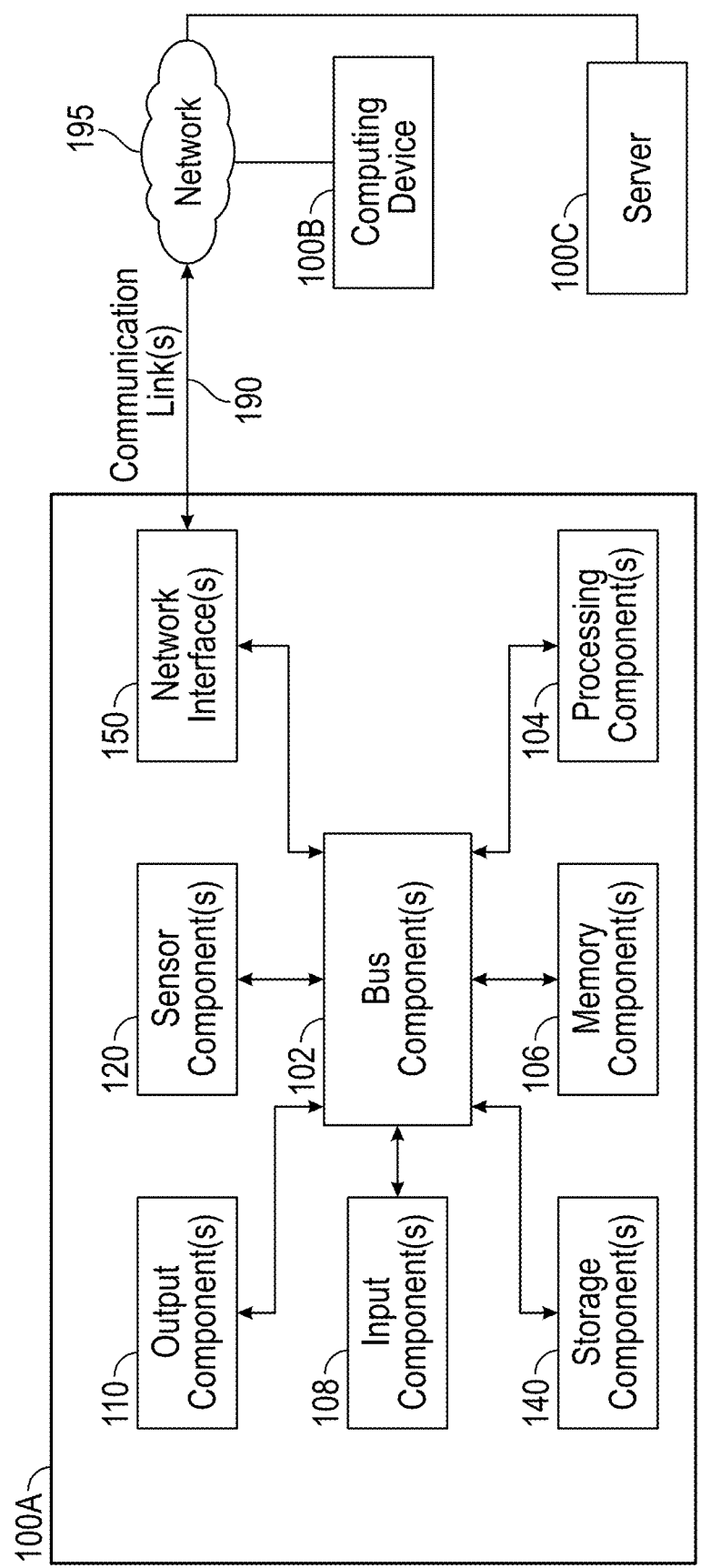
FIG. 1A is a depiction of a computing device according to some embodiments.

FIG. 1A is a depiction of a computing device 100*a* according to some embodiments. The device can include one or more processing components 104 and/or one or more memory components 106 that can be connected by one or more bus or communication components 102.

In some embodiments, these computing devices can include one or more storage components 140, one or more input components 108, one or more output components 110, one or more sensor components 120, and/or one or more network interfaces 150.

In some embodiments, the network interfaces can be connected via one or more electronic communication links 190 to a network 195. The computing device 100*a* can connect to other computing devices or servers 100*b*, 100*c*. In some embodiments, the network can include the Internet, and/or other system where devices are served by servers that include communication information. The electronic communication links 190 can be from a single device to another device.

In some embodiments, the components in the device 100*a* can include logical entities, and/or in a physical representation, they may be stored or housed on the same physical chip in any combination. Such physical configurations can include "System-on-Chip" or SoC.

In some embodiments, a device 100*a* need not be an independent device. In the concept of shared resources, one or more logical devices may operate and share resources within a single physical device. One example of this is the concept of virtual devices.

Two Computing Devices

Figure 1B:
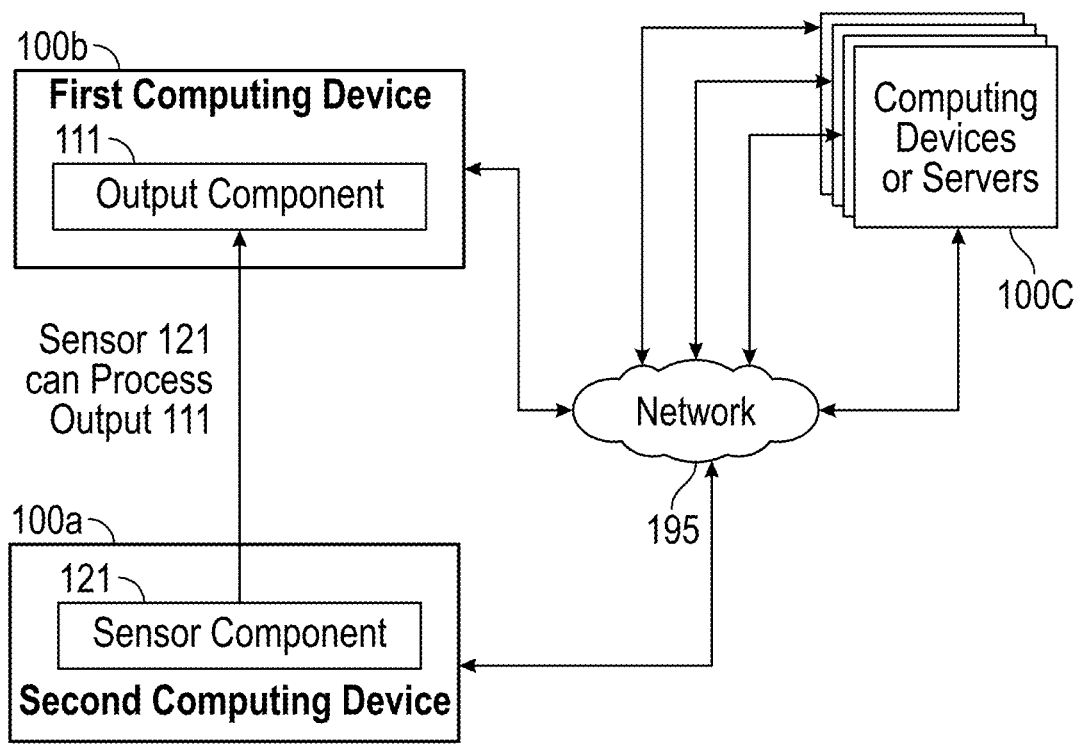
FIG. 1B depicts two computing devices where one device captures data from another device, according to some embodiments.

FIG. 1B depicts two computing devices 100*a* and 100*b* working together, according to some embodiments. These devices can communicate through a network 195, or in other embodiments may not communicate with each other aside from a visual and/or audio capture of the first computing device's output via the sensor component 121 of the second computing device. Device 100*b* can include one or more output components 111 that can be interpreted by the sensor component 121. One such example of this configuration can be a display as the output component 111 with a camera as the sensor component 121. Another such example can be a speaker as the output component 111 with a microphone as the sensor component 121. The examples of output components 111 and sensor components 121 need not be mutually exclusive; that is a sensor 121 could detect many such output components 111 and/or a single output component 111 could service many different 121 sensors.

FIG. 1B depicts two computing devices where one device captures data from another device, according to some embodiments. FIG. 1B depicts a system wherein many other devices and/or servers 100*c* can be connected to the network. These devices need not be present.

In some embodiments, a sensor component 121, such as a camera, of a first computing device 100*a* can detect a particular output, such as a user interface or audio, from an output component 111 of a second computing device 100*b*. The first computing device 100*a* can identify a location of a user interface and/or an intent of a user based on the detected output. For example, the first computing device 100*a* can match the location of a website displayed on the second computing device 100*a* by matching user interface data captured by a camera. The first computing device 100*a* can identify an intent of the user by determining that the user is viewing a particular offer, such as a credit card, on a website.

In some embodiments, the first computing device 100*a* and/or the second computing device 100*b* communicates the retrieved data from the sensor and/or derived data, such as a location on a website or intent of the user, to another computing device 100*c* via a network 195. The other computing device 100*c* can include a computing device corresponding to a marketing company, a bank, or other third party that uses the data to provide targeted marketing to the computing device 100*a*.

Hardware and Software Components in Computing Devices

Figure 1C:
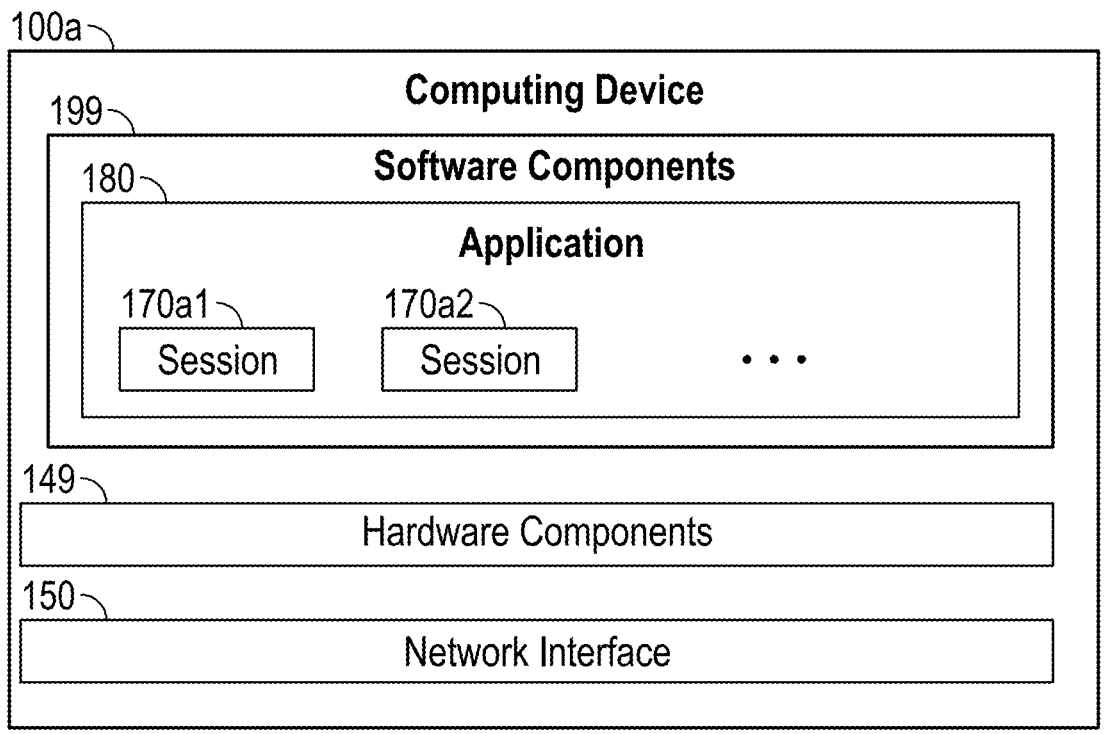
FIG. 1C is a depiction of software and hardware components of a computing device, according to some embodiments.

FIG. 1C is a depiction of software and hardware components of a computing device 100*a*, according to some embodiments. In some embodiments, FIG. 1C demonstrates another logical view of device 100*a* from FIG. 1A, according to some embodiments. In this view, a device 100*a* can include hardware components 149 and/or software components 199. In particular, the devices 100*a* can include at least one network interface 150. Within the software components 199, and one or more applications 180, which can include one or more sessions 170*a*1, 170*a*2, such as instances of run-time execution of software modules.

In some embodiments, the computing device 100*a* includes, for example, a personal computer that is IBM, Macintosh, or Linux/Unix compatible or a server or workstation. In one embodiment, the computing device 100*a* comprises a server, a laptop computer, a smart phone, a personal digital assistant, a kiosk, or an media player, for example. In one embodiment, the exemplary computing device 100*a* includes one or more central processing unit ("CPU"), which may each include a conventional or proprietary microprocessor. The computing device 100*a* further includes one or more memory, such as random access memory ("RAM") for temporary storage of information, one or more read only memory ("ROM") for permanent storage of information, and one or more mass storage device, such as a hard drive, diskette, solid state drive, or optical media storage device. Typically, the modules of the computing device 100*a* are connected to the computer using a standard based bus system. In different embodiments, the standard based bus system could be implemented in Peripheral Component Interconnect ("PCI"), Microchannel, Small Computer System Interface ("SCSI"), Industrial Standard Architecture ("ISA") and Extended ISA ("EISA") architectures, for example. In addition, the functionality provided for in the components and modules of computing device 100*a* may be combined into fewer components and modules or further separated into additional components and modules.

In some embodiments, the computing device 100*a* is generally controlled and coordinated by operating system software, such as Windows XP, Windows Vista, Windows 7, Windows 8, Windows Server, Unix, Linux, SunOS, Solaris, iOS, Blackberry OS, or other compatible operating systems. In Macintosh systems, the operating system may be any available operating system, such as MAC OS X. In other embodiments, the computing device 100*a* may be controlled by a proprietary operating system. Conventional operating systems control and schedule computer processes for execution, perform memory management, provide file system, networking, I/O services, and provide a user interface, such as a graphical user interface ("GUI"), among other things.

In some embodiments, the exemplary computing device 100*a* may include one or more commonly available input/output (I/O) devices and interfaces, such as a keyboard, mouse, touchpad, and printer. In one embodiment, the I/O devices and interfaces include one or more display devices, such as a monitor, that allows the visual presentation of data to a user. More particularly, a display device provides for the presentation of GUIs, application software data, and multimedia presentations, for example. The computing device 100a may also include one or more multimedia devices, such as speakers, video cards, graphics accelerators, and microphones, for example.

In the embodiment of FIG. 1C, the I/O devices and interfaces provide a communication interface to various external devices. In the embodiment of FIG. 1C, the computing device 100a is electronically coupled to a network, which comprises one or more of a LAN, WAN, and/or the Internet, for example, via a wired, wireless, or combination of wired and wireless, communication link. The network communicates with various computing devices and/or other electronic devices via wired or wireless communication links.

According to FIG. 1C, in some embodiments information may be provided to the computing device 100a over the network from one or more business location data sources which may include one or more internal and/or external data sources. In some embodiments, one or more of the databases or data sources may be implemented using a relational database, such as Sybase, Oracle, CodeBase and Microsoft® SQL Server as well as other types of databases such as, for example, a flat file database, an entity-relationship database, and object-oriented database, and/or a record-based database.

In the embodiment of FIG. 1C, the computing device 100a includes one or more applications 180, or modules. These and other modules in the computing device 100a may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. In the embodiment shown in FIG. 1C, the computing device 100a is configured to perform the various methods and/or processes for the system as described herein (such as the processes described with respect to FIGS. 2A, 6, and others herein).

Figure 1D:
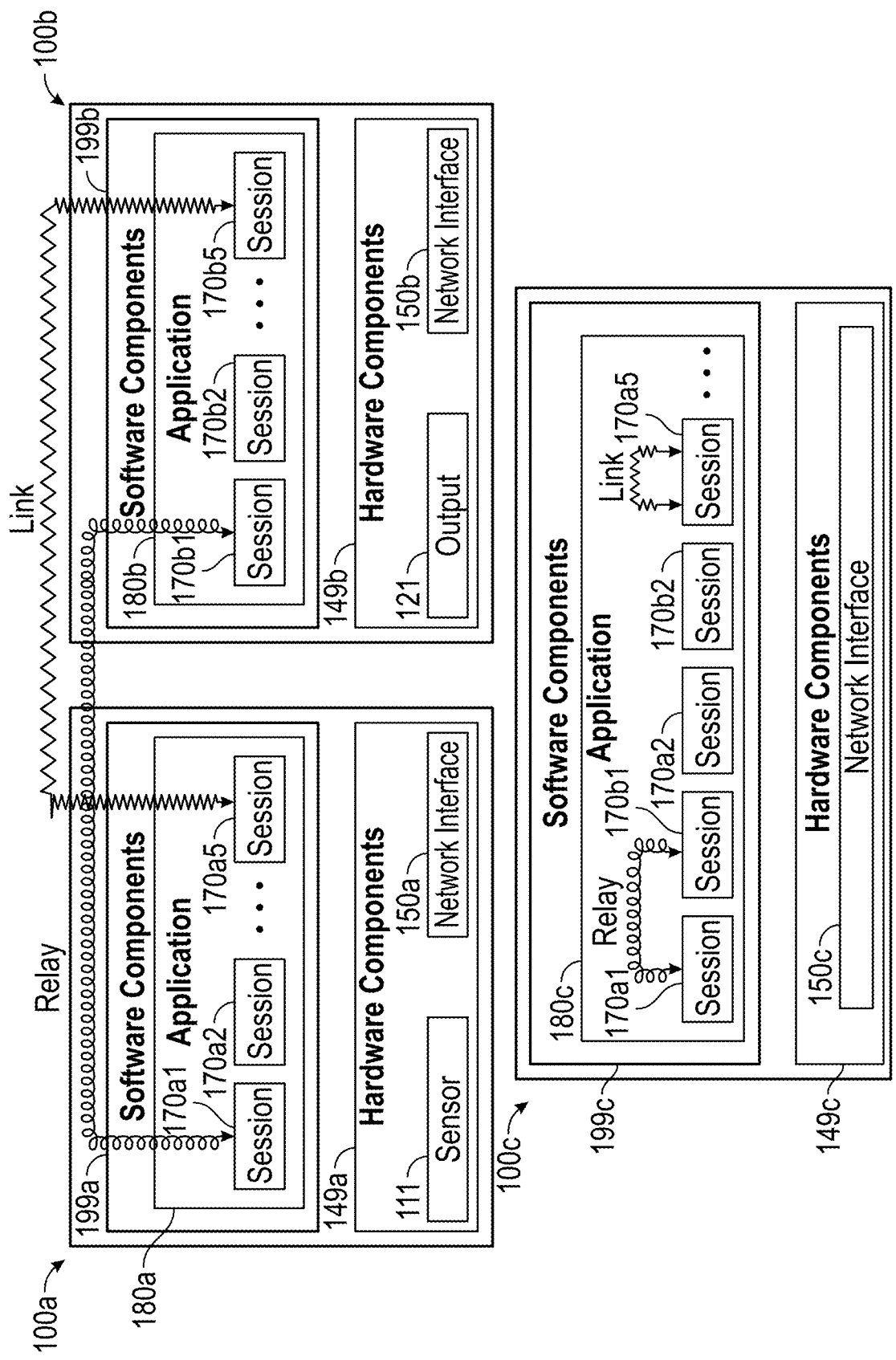
FIG. 1D is a depiction of software and hardware components of multiple computing devices, according to some embodiments.

FIG. 1D is a depiction of software and hardware components of multiple computing devices, according to some embodiments. FIG. 1D illustrates an embodiment of 1C that can correspond with FIG. 1B, according to some embodiments. In this scenario, the device 100a can include the sensor component 111 that is detecting the output component 121 from device 100b.

In particular to FIG. 1D, devices 100a and 100b can communicate through their network interfaces 150a and 150b respectively with a third device (such as, for example a server or a webserver) 100c. This device 100c can include corresponding sessions to both devices 100a and 100b. In response to device 100a sensing the output from 121 of device 100b via the sensor 111, the device 100a and/or the device 100b can communicate this information to an external device 100c via the network interfaces 150a, 150b, 150c.

In order for these sessions to work together, the webserver can choose one of several approaches. The webserver can keep the corresponding sessions 170a1 and 170b1 separate while acting as a relay to both, and/or it can sync the sessions as depicted by devices 100a and 100b both having the same session 170a5 running.

Processing Agent Across Computing Devices

Figure 1E:
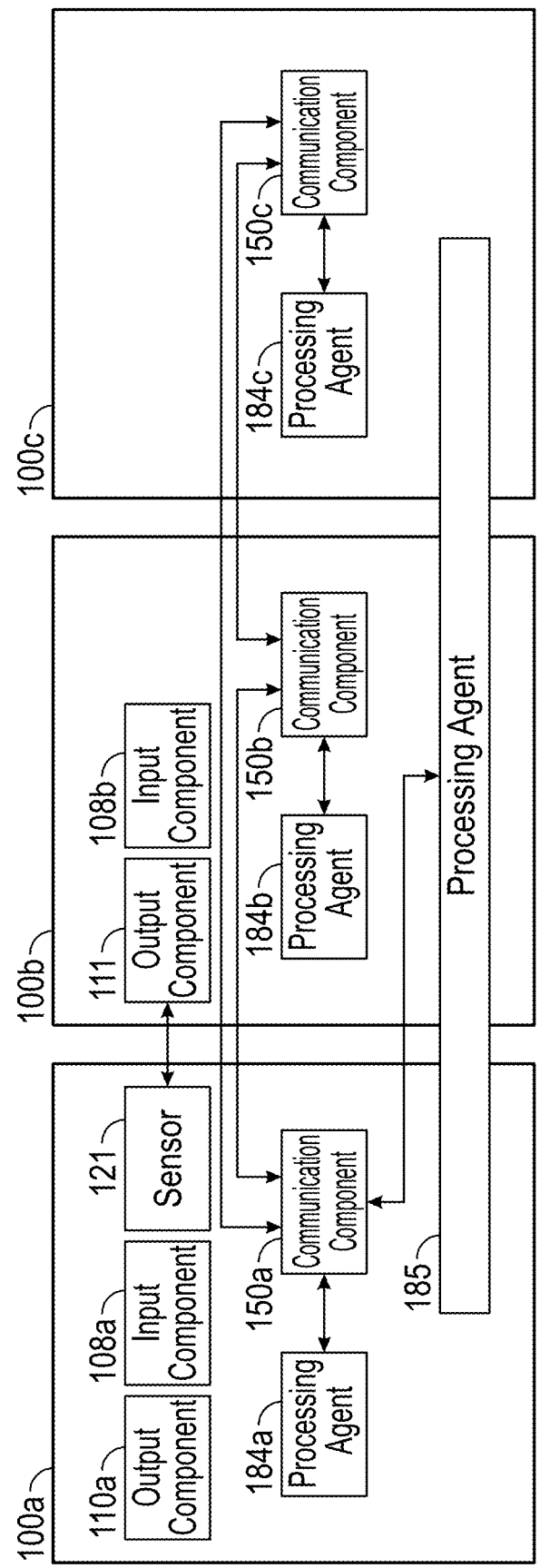
FIG. 1E is a depiction of a processing agent 185 across multiple computing devices 100a, 100b, 100c, according to some embodiments.

FIG. 1E is a depiction of a processing agent 185 across multiple computing devices 100a, 100b, 100c, according to some embodiments. FIG. 1E depicts a more abstracted view of FIG. 1D according to some embodiments. In particular, the system can combine the software and hardware layers together into a system component level. In some embodiments, the computing devices 100a, 100b, 100c each have their own processing agents 184a, 184b, 184c (collectively referred to herein as processing agents 184) and/or a collective processing agent 185 across each computing device 100a, 100b, 100c. Although the present disclosure explains embodiments using the processing agent 184, it is understood that the processing agent 185 can be applied, where applicable, and vice versa.

In some embodiments, the processing agent 184 includes an agent that functions on each corresponding device, such as, processing agent 184a to device 100a, processing agent 184b to device 100b, and so forth. In one embodiment, processing agent 184 could be the central processing unit of the device. In some embodiments, the processing agent 184 can include or interface with a mobile application and may also be a webpage.

In another embodiment, this configuration could represent that the processing of the request occurs off the device and merely is an agent that dispatches that processing to some other location before receiving the result. For example, a game can be hosted on another service and the processing occurs on the other service. On the device, an agent may merely dispatch the user's commands to this other service.

In some embodiments, the processing agent 185 can represent a particular scenario where processing occurs on one or more device with some combination of dispatching commands to other systems and also processing commands on its own processing unit. Note that processing agent 185 need not be on all devices as depicted. It can be any combination of two or more devices in 100a, 100b, and 100c or one or more devices. An embodiment of 185 can be a bot that operates via automated machine learning algorithms. When the user interacts with the bot, some processing can occur on the originating device 100a, which is then sent to be processed on the server 100c. In response to the server 100c finishing processing, it can send a response to the bot, which may then execute more processing before outputting to the user via output component 110a.

In some embodiments, in the embodiment of processing agent 185 being an artificial intelligence bot, the bot may not a true artificial intelligence. The bot may be a combination of rules based logic for outcomes, which are handled by machine learning processing of the input. In this particular embodiment, the processing agent 185 AI bot differs from other implementations in part because it has the ability to control the output of other devices.

In some embodiments, the processing agent 185 can be designed and/or trained as a single neural network but perform operations across multiple computing devices 100a, 100b, 100c.

In some embodiments, the processing agent 185 can serve all three devices 100a, 100b, and 100c. In some embodiments, after the server processes the input from device 100a, it can instead send its response to devices 100b, and 100b one or more of which may process the output to display to the user.

In some embodiments, while an example embodiment has been discussed with two devices with one server, there is no limitation to the number of devices or the number of servers in the system.

In some embodiments, with respect to augmented reality, there may not be a need to revisit the concept of the session 170. In a session, the client device 100a can have a session 170a1 that corresponds to a session 170a1 on a server 100c, and the session is tied to that user. When that same user creates a second session using 100b, a new session 170b1 can be created. With respect to processing agent 185, these sessions may be independent, so they may not be able to communicate. Thus, these sessions may need to be linked for processing agent 185 to function across all devices. In some embodiments, these sessions may be able to communicate and/or may already be linked.

In some embodiments, the server 100c can act as a trusted intermediary to communicate between both devices 100a and 100b. Alternatively, a new session 170a5 could be created on all devices that handles the linked session.

Key States for Multiple Device Interactive Experience

Figure 2A:
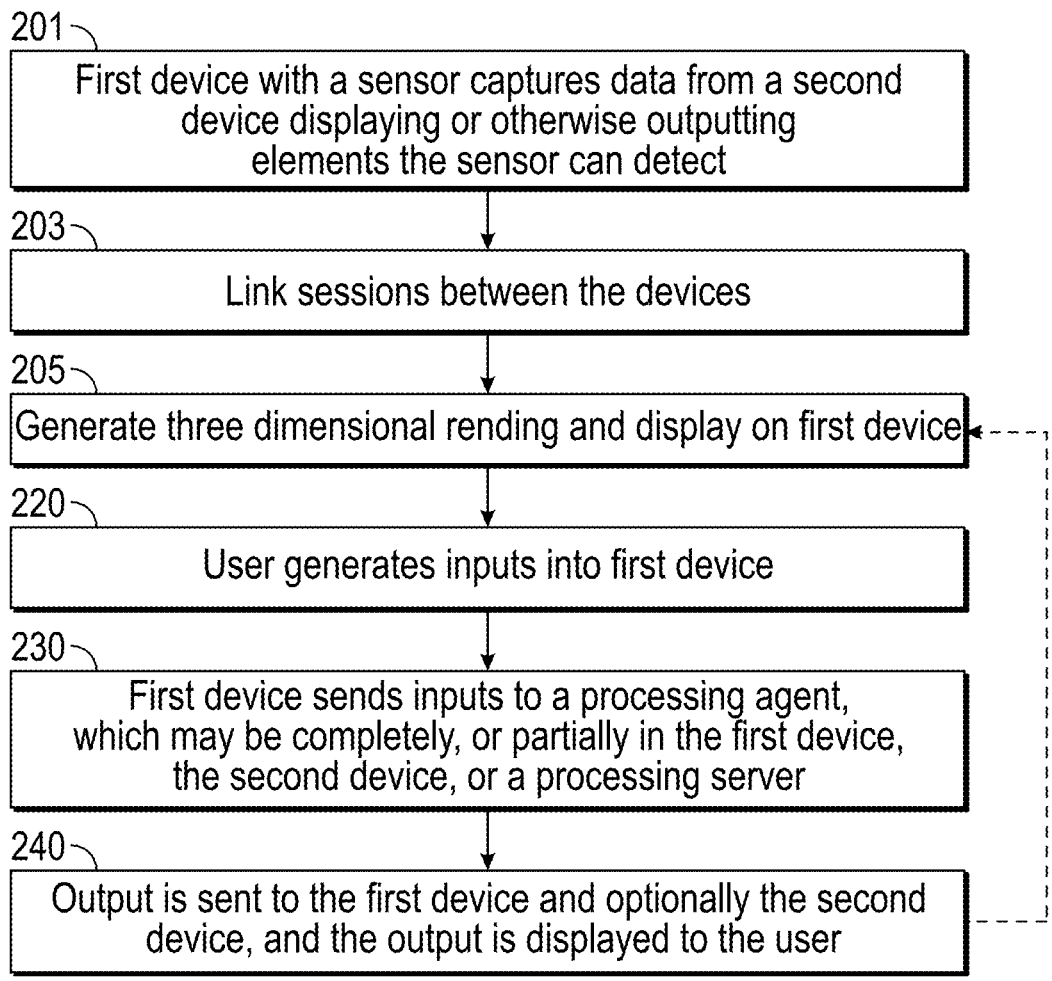
FIG. 2A is a flow diagram of the key states for a multiple device interactive experience according to some embodiments.

FIG. 2A is a flow diagram of the states for a multiple device interactive experience according to some embodiments. Starting in 201, a first device with a sensor captures data from a second device displaying or otherwise outputting elements that the sensor can detect. The sensing device, such as the sensor 121 on the computing device 100a, detects an output of the output device, such as the output component 111 of computing device 100b. For example, the experience containing elements can include an audio snippet or a visual anchor displayed on the user device.

In some embodiments, after the first device sensing the elements on the second device is completed, at block 203, the sessions between the first and second device can be linked. For example, the first device can identify that the second device is displaying a certain portion of a webpage based on a captured image of the user display of the second device (e.g., laptop) by the first device (e.g., mobile phone).

In some embodiments, the first device can display a three dimensional rendering of information at block 205. The first device can determine an intent of the user based on what is being displayed on the second device. The first device can identify what is being displayed on the second device via the sensor on the first device. The three dimensional rendering of information can correspond to the user's intent. For example, the user's intent may be determined to be to interact with a certain user interface element, and the information may be an instruction or a recommendation regarding how to interact with the given user interface element.

In some embodiments, the first device can receive input from the user 220. The user can select an option that was displayed on the first device. For example, the website can include an offer for a credit card and an option to find ways to improve a user's credit score. The portion of the website displayed on the second device can only be showing the offer for a credit card. The first device can display a three dimensional rendering of a selectable option to go to the portion of the website that is not currently being displayed, the portion of the website that displays ways to improve the credit score. The input can be a selection on the first device to improve the credit score.

At block 230, after this input is processed at the first device, the input can be sent to the processing agent 230. For example, information indicating that the user wants to improve his or her credit score can be sent to the processing agent 230.

At block 240, after the processing agent 240 receives the input at the first device, it can transmit the output to another device, such as the second device or an external server. Then, the second device that was displaying the website can perform further actions, such as providing a shortcut to move to the corresponding website. The website can automatically scroll to the portion of interest.

In some embodiments, the input is identified by the first device interacting with one or more experience containing elements by the sensor. For example, the first device can detect a different visual anchor that is placed on the different portion of the webpage, and the first device, upon identifying the anchor, can identify that the user has moved the webpage to the different portion.

Parallel Processing and Linking of Computing Devices

Figure 2B:
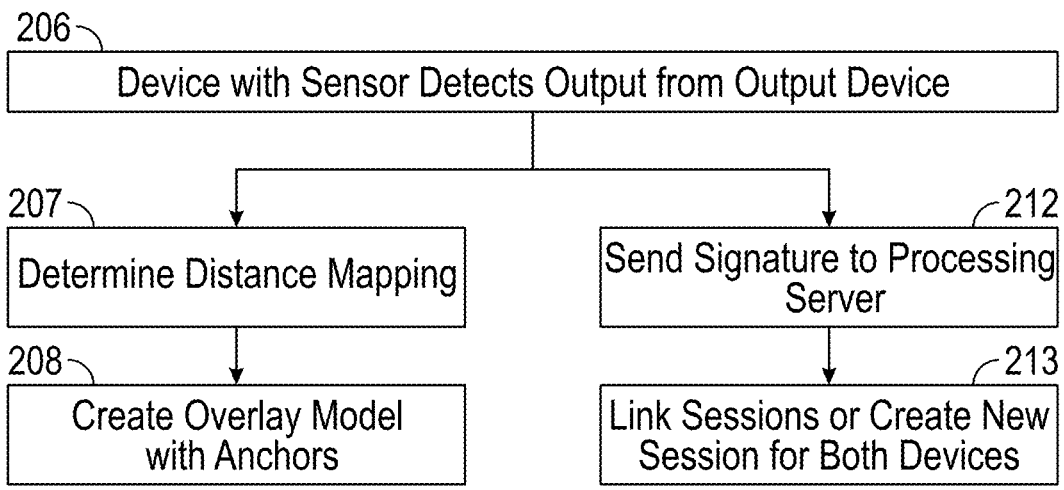
FIG. 2B illustrates parallel processing and linking of computing devices, according to some embodiments.

FIG. 2B illustrates parallel processing and linking of computing devices, according to some embodiments. FIG. 2B illustrates a process that can run or execute in parallel to the events in FIG. 2A, according to some embodiments. At least a portion of the events can be processed in parallel including from state 206 to states 208 or 213. The events in FIG. 2B can be processed prior to, in conjunction with, or after any of the processes in FIG. 2A (such as prior to state 240), and/or vice versa.

In state 206, a device, such as the first device 100a, can detect a signature (such as an anchor) with a sensor from an output device, such as device 100b. The sensor can be a camera capturing an image of an output, such as a signature, from a display from the output device.

In some embodiments, the device 100a can create a virtual representation of the experience of session, such as, for example, session 170b1. In state 207, the first device 100a can determine a distance mapping from the second device 100b. The first device 100a can determine a distance from the first device 100a to the second device 100b. In some embodiments, the first device 100a can determine a certain distance to the second device 100b based on an assessment of an image captured by the first device 100a. For example, the first device 100a can assess a size on a portion of the user interface of the second device 100b that the image captured. The size determined by the first device 100a can be the size of a visual anchor displayed on the user interface, the size of text or font, and/or an image or video. This mapping can be created using information obtained from the output of output component 111.

In some embodiments, distance between the devices can be determined based on pixels on the first device 100a. The first device 100a can identify the area of the entire screen (or at least a portion thereof) that is rendered on the second device 100b. The image of the screen on the first device 100a can include a pixel length and/or a pixel width that can be used to calculate a ratio or relation to the actual screen area on the second device 100b.

In some embodiments, the audio snippet can be used to determine a distance. For example, the second device can play an audio snippet. The first device can determine when the first device received the audio snippet and determine a distance to the second device, based on the rate of sound travel through air.

In state 208, the first device 100a can generate an overlay model with anchors. The first device 100a can display a live feed from the camera with a three dimensional (3D) rendering of information. For example, the second device 100b can determine that the intent of the user is to sign up for a credit card. However, the website displayed on the first device 100a is displaying something else. Another portion of the website that is not being displayed has the credit card information. The second device 100b may determine that the currently displayed portion of the website is not displaying the credit card information based on a previously stored association of anchors for the particular website with corresponding user interface elements that appear near the anchors on the website (e.g., the anchors may have been placed on the page by a developer or author of the page who desired that the page be usable with visual augmentation features described herein). The second device 100b can generate three dimensional rendering that is overlaid over the current display on the first device 100*a*, where the three dimensional rendering can redirect the user to the credit card information (such as by pointing in a scroll direction or textually describing how to access the information). After the augmented mapping of the session is created, anchor points can be added to the model in order to represent the potential areas of interest within the model 208.

In some embodiments, the overlay model can include the anchors to be displayed on the first device 100*a*. The anchors can include visual anchors, such as one or more combination of pixels to be displayed on the first device 100*a* for the second device 100*b* to process and identify. The anchors can include audio anchors, such as a background sound to be played on the website. In some embodiments, the audio anchors can be played in the background of other audio already being played on the website, such as audio from a video stream.

In some embodiments, the size of the overlay model to be displayed on the first device 100*a* can be based on the image of the screen for the second device 100*b* captured by the first device 100*a* in relation to the actual screen size of the second device 100*b*. For example, a certain portion of a website displayed on the second device 100*b* can be 100×100 pixels, but the first device 100*a* captures a 10×10 pixel image of the portion. Then, there is a ratio of 1-to-10.

In some embodiments, the size of the overlay model does not change once it is loaded (unless there's an explicit refresh). In other embodiments, the size of the overlay model continuously changes with the ratio continuously being recalculated, such as based on a continuous stream of images or video stream.

In some embodiments, anchors can be used by the first device 100*a* to determine the resolution of the second device 100*b* and/or the aspect ratio of the screen of the second device 100*b*. One or more of a first type of anchor can be used to determine resolution, such as different audio frequencies or different visual anchors or patterns. One or more of a second type of anchor can be used to determine an aspect ratio based on the relation between pixels.

In some embodiments, anchors can be used to determine an angle that the first device 100*a* is viewing the second device 100*b*. For example, if pixel 1 is displayed directly above pixel 2 on the second device 100*b*, but if on the first device 100*a* pixel 1 is displayed one pixel above and one pixel to the right, the first device 100*a* can determine that the first device 100*a* is viewing the user interface of the second device 100*b* at an angle.

In some embodiments, the size and/or orientation of the overlay model can be based on one or more factors, such as the resolution, the aspect ratio, and/or the viewing angle. In state 212, the signature captured by the second device 100*b* can be sent to an external system, such as a processing server 100*c*. In state 213, the processing server can link the sessions or create new sessions, such as linking between the first and second device. Accordingly, the processing server can link the processing agents across the first and second device to work together. Advantageously, an action performed by the user on one of the devices can take effect on what is being displayed on the other device. For example, the user can select an option displayed by the three dimensional rendering on the second device, where the second device is displaying the three dimensional rendering that is overlaid on top of the user display for the first device. When the user selects the option, the selection can be sent from the processing server of the second device to the first device and/or a processing server that can cause the first device to change the display of the website. For example, the three dimensional rendering on the second device can provide an option to navigate to a portion of the website that is not currently being displayed. Upon selection, the first device can automatically move the display of the website to the portion that is not currently being displayed.

In some embodiments, a user can use a user device 100*a* to control 100*b*, for example, if they own or have access to or control over both devices. In these embodiments, the process of linking the sessions can be done utilizing the same signature information determined in step 206. After the sessions are linked 213, then the processing agent 185 can act upon the sessions.

Mobile Phone Camera and Laptop Display

Figure 3A:
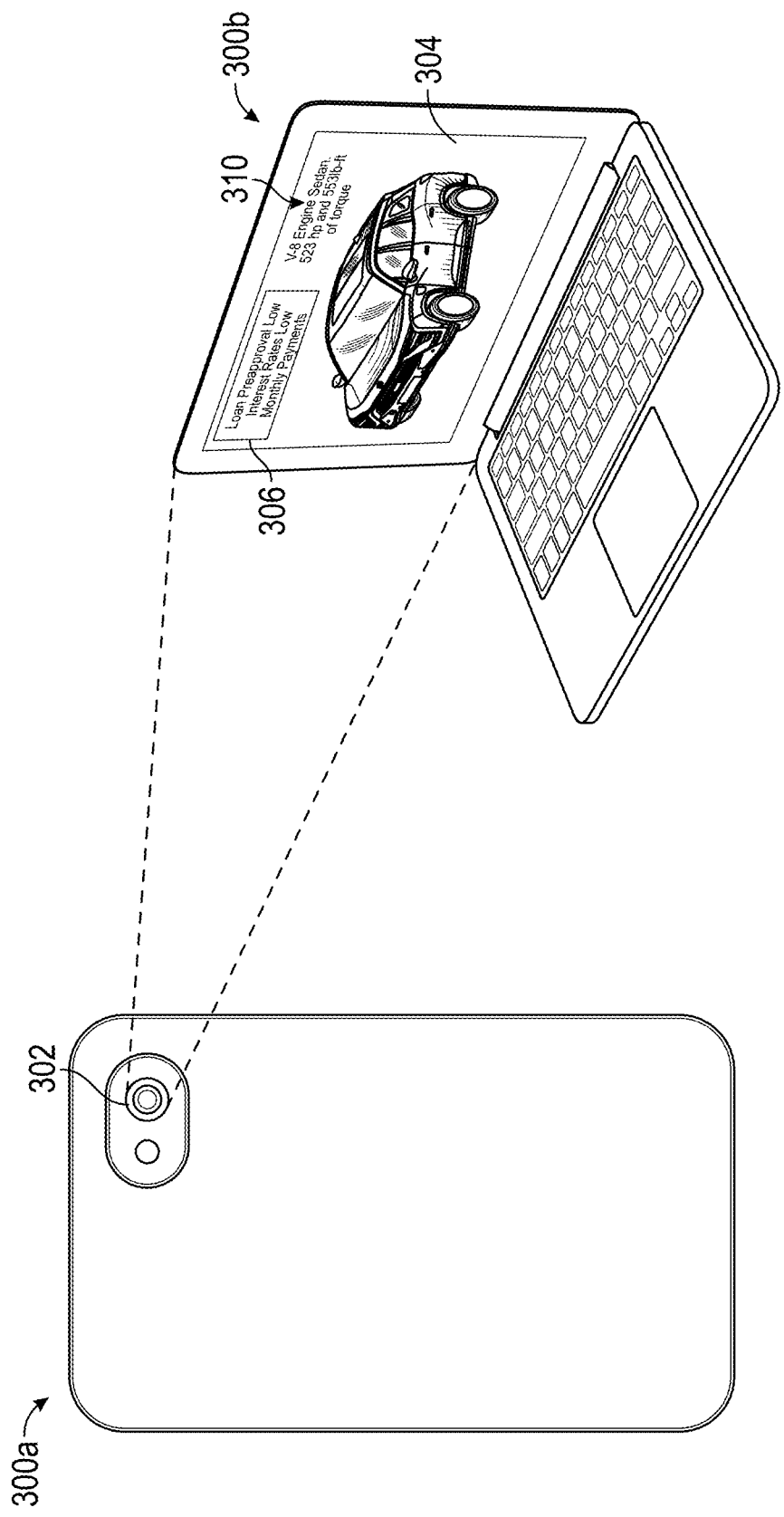
FIG. 3A illustrates a mobile phone camera taking a picture of a user interface displayed on a laptop, according to some embodiments.

FIG. 3A illustrates a mobile phone camera taking a picture of a user interface displayed on a laptop, according to some embodiments. In some embodiments, FIG. 3A depicts a phone 300*a* (e.g., of a second computing device 100*a*) that is linking sessions with a computer 300*b* (e.g., of a first computing device 100*b*) that displays content from the processing server, according to some embodiments. The phone 300*a* can take a picture (or continuous video) of a user interface 304 currently being displayed on the laptop 300*b* via a camera 302, and the phone 300*a* can identify what is being displayed on the laptop 300*b*.

In some embodiments, the phone 300*a* can identify an intent of the user based on an assessment of the image or video captured by the camera. For example, the user interface 304 can be displaying a loan offer 306, a car 308, and text. The phone 300*a* (and or an external server that the phone sends the image to) can process the image to identify the loan offer 306, the car 308, and/or the text. The processing can include a mapping to known websites, such as a pixel by pixel (or combination of pixel) comparison or through an artificial intelligence model, to determine whether the website matches a known website in a database. In some embodiments, the image can be processed through an artificial intelligence model trained to determine objects in images. In some embodiments, the text can be assessed to determine an intent. The text can be describing features of the car. In this example, the intent can be identified as the user desiring to purchase a car and qualify for an automobile loan.

The phone 300*a* can generate and display a three dimensional rendering of additional (or supplemental) information overlaid over the user interface. Upon a user selection of an option displayed on the phone 300*a*, the laptop can change what is being displayed. The phone 300*a* can send a signal back to the laptop, e.g., via WiFi, bluetooth, or other network communication to change the display. In some embodiments, upon a selection of an option, the phone 300*a* can display an updated 3D rendering of information that instructs the user how to get to a certain feature, such as scrolling down the screen of a webpage.

Figure 3B:
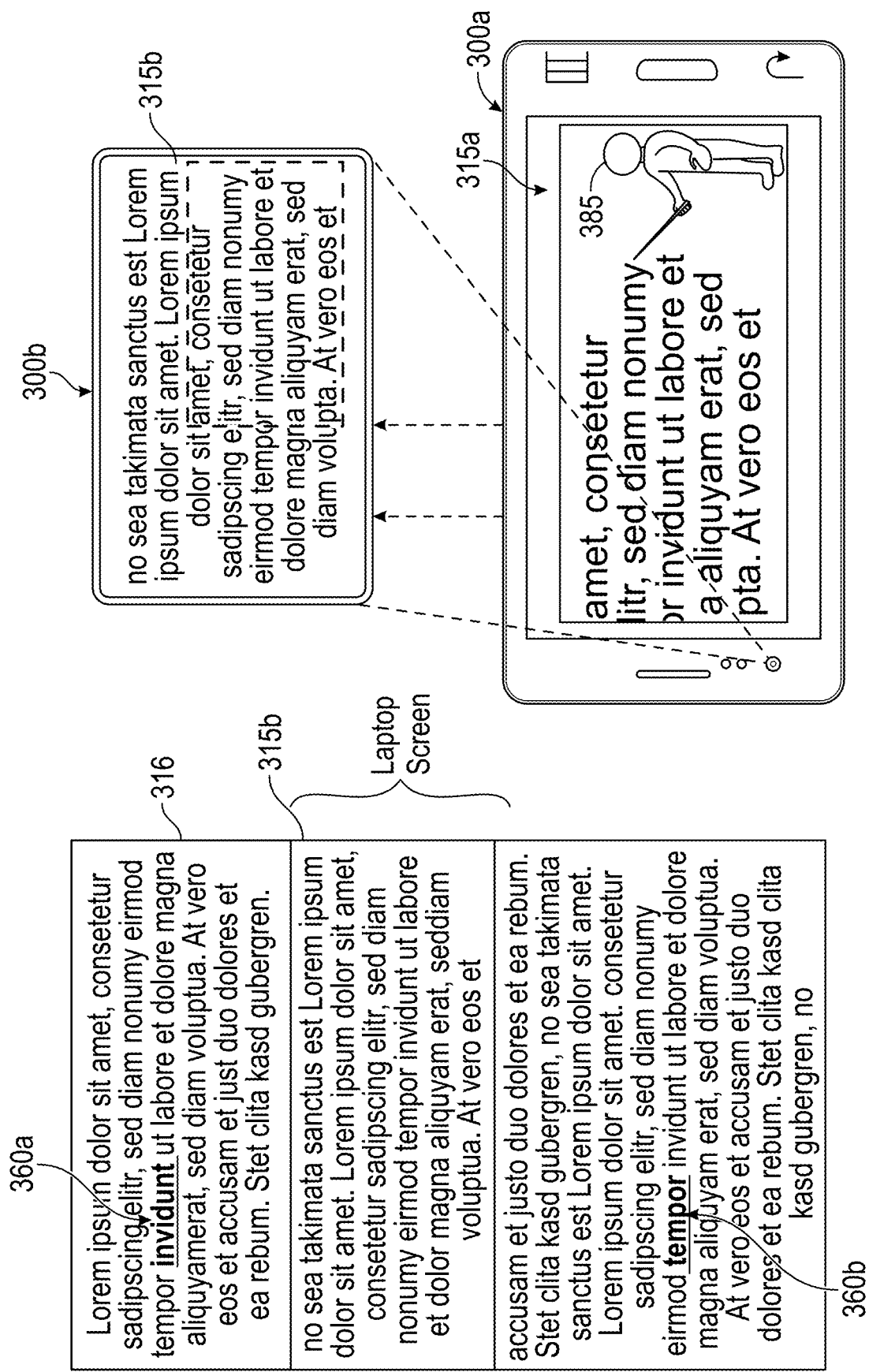
FIG. 3B depicts the scenario where a mobile phone is using a sensor device (for example, a camera) and whose view is displayed on the screen of the mobile phone, according to some embodiments.

FIG. 3B depicts the scenario where a mobile phone is using a sensor device (for example, a camera) and whose view is displayed on the screen of the mobile phone, according to some embodiments. Additionally a processing agent bot 185 in the form of an augmented reality character can be displayed on the screen 385 of the mobile phone 315*a*. Device 300*b* can be a laptop with display 315*b*.

In some embodiments, section 316 can display the entire viewable area of the content that was created from the processing server 100*c* with the view currently centered at the box 315*b* (which corresponds to the laptop). In some embodiments, Section 316 is displayed on the mobile phone and/or the laptop for ease of navigation throughout the webpage.

In some embodiments, the laptop can display anchors, such as anchors 360a and 360b, which can represent anchors in the context of the site. These anchors 360a and 360b can represent the anchor points that can correspond to the outcomes of the states in processing agent 185. By mapping these possibilities to the anchor points, the processing agent 385 can initiate display of a three dimensional rendering that helps the user to solve their problem within the experience.

Figure 3C:
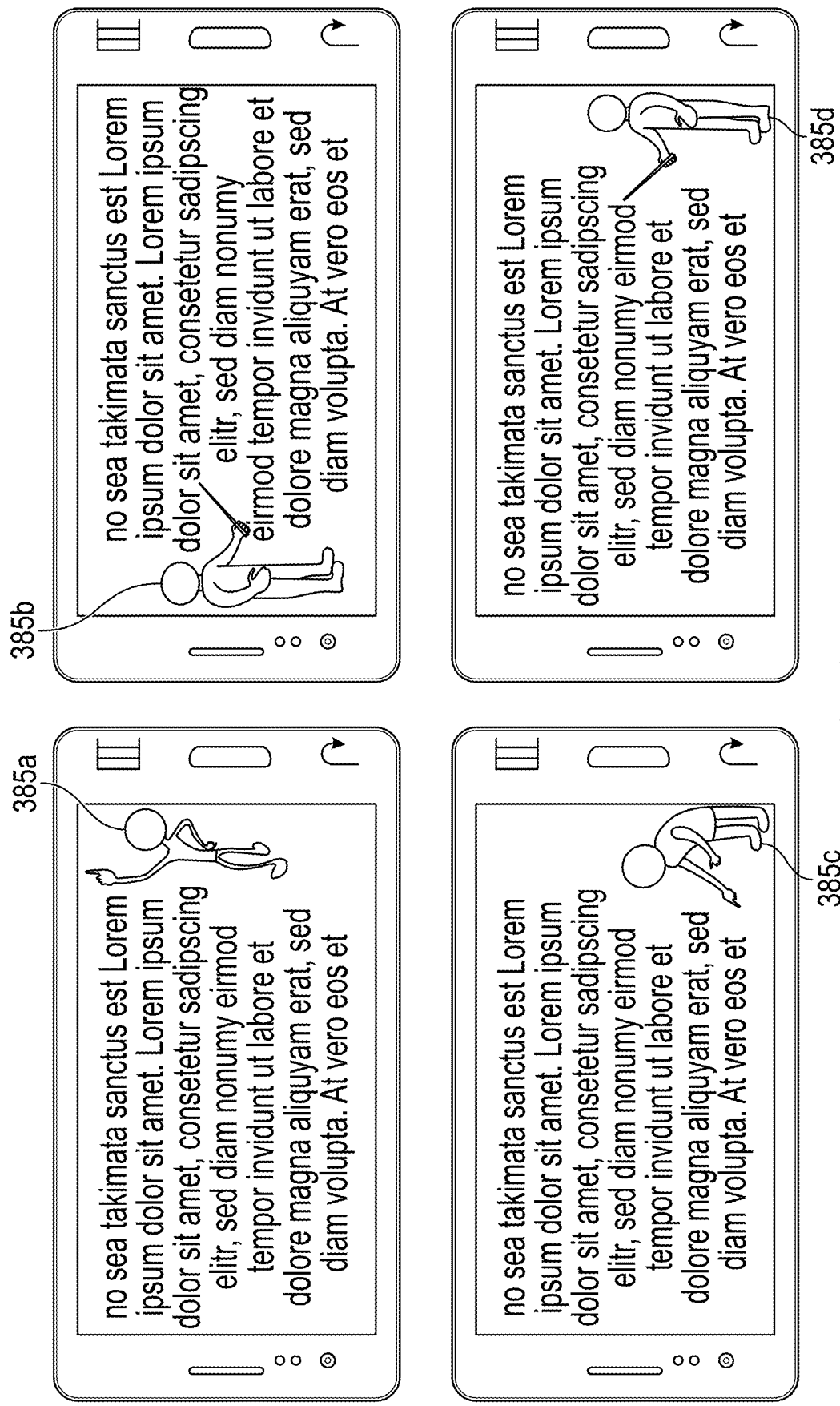
FIG. 3C depicts examples of the three dimensional representation of the bot interacting with the user, according to some embodiments.

FIG. 3C depicts examples of the three dimensional representation of the bot 385 interacting with the user, according to some embodiments. The bot 385a, 385b, 385c, 385d (collectively referred to herein as bot 385) can direct the user to another portion of the webpage. For example, the bot 385a can indicate that what they are looking for corresponding to 360a is in a portion of the website that is above what is currently being displayed. The bot 385a can point upward indicating that the user should scroll up.

In some embodiments, the bot 385c depiction can correspond to anchor 360b, which was below the content currently being displayed. If the mobile phone determines that the intent is for the content corresponding to anchor 360b, the bot 385c can direct the user to scroll down the webpage. A depiction of bot 385b illustrates the bot inviting the user to move his or her mouse or click the anchor on the screen. In one embodiment, the bot does not move position, but in another embodiment, the bot could move to show exactly where the anchor is.

Visual Reference Anchors

Figure 3D:
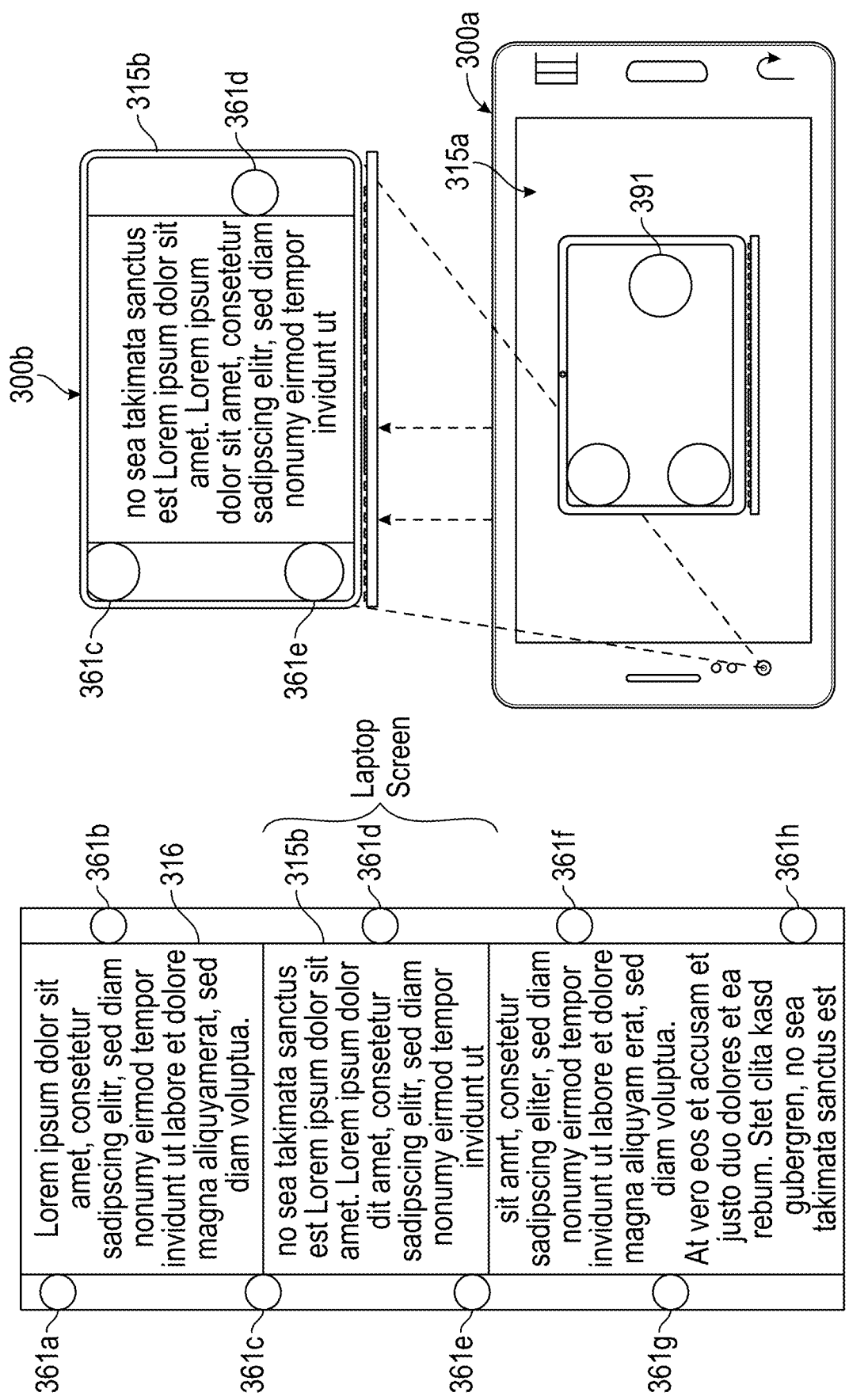
FIG. 3D depicts visual reference anchors displayed on the user interface of a computing device for another computing device to identify, according to some embodiments.

FIG. 3D depicts visual reference anchors displayed on the user interface of a computing device for another computing device to identify, according to some embodiments. In some embodiments, FIG. 3D depicts an embodiment where the reference anchors 361a, 361b, 361c, 361d, 361e, 361f, 361g and 361h are unique beacons or visual combination of pixels embedded with the experience 316, according to some embodiments. The number of reference anchors 361 can vary, such as from a to g in FIG. 3D. In some embodiments, the anchors can be different from each other. For example, anchor 361a can be smaller or different shape than anchor 361b. In some embodiments, at least a subset of anchors can be placed along an axis, such as a horizontal, vertical, or diagonal axis.

In some embodiments, the first computing device 300b can be displaying only a portion of the text. As shown in FIG. 3D, the first computing device 300b can display the text portion 315b and reference anchors 361c, 361d, 361e. The second computing device 300a identify the reference anchors 361c, 361d, 361e being displayed by the first computing device 300b, and determine that the first computing device 300b is on a certain portion of the website, and/or that the text 315b is being displayed.

In some embodiments, the number, size, and/or type of anchors can vary depending on the size of the screen 316. For example, for a smaller screen, smaller visual anchors can be used, or a smaller collection of anchors can be used than for a larger screen. Advantageously, the system can vary the application of anchors to adjust for limited user interface real estate. This is a technical improvement on user interface technology as user interface sizes are becoming smaller.

In one embodiment, these beacons or anchors can be visual graphics embedded within the user interface or page displayed on a screen. Due to some properties of these graphics, the sensor can be able to determine the relative positions of things or objects and infer where the anchor points can be in the scene, and/or determine what user was involved in the session. For example, an anchor can be placed near or around an image or text, such that the computing system with the sensor can correspond the anchor to the image or text. Such location information can be used to identify an intent of a user, such as if the user is viewing a credit card offer for an extended period of time, highlighted certain text, or clicked certain options.

An anchor may be a particular icon, graphic, shape/color combination, pattern, and/or other visual content that may be included within the page at a particular position to enable a device viewing the page to determine a relative location within the page that is currently being displayed on screen, such as by the particular anchor's appearance being globally unique to that anchor position. Another embodiment of an anchor 361 can be a QR code or other two-dimensional graphical code or barcode. In the case of the QR code, only a single anchor 361 may be required per session, but others could be used.

Alternatively, if the sensor includes a microphone and the output includes a speaker, then these reference anchors can include one or more sounds, such as sound clips or audio corresponding to certain frequencies. The frequency can be something beyond the human range of hearing such that the experience was hidden from the user. The frequency can be designated to a certain function or portion of the webpage. For example, an audio clip with a frequency of 30 hertz may correspond to a first advertisement, whereas a frequency of 35 hertz may correspond to a second advertisement.

In some embodiments including three-dimension ("3d") experiences, an option on how to control the experience can be via the three dimensional rendering of the bot 385. The user input can directly control the display that displays the bot 385 on a first computing device via inputs to a second computing device. In this scenario, the sessions 170 of the first and second computing device can be linked by the external server.

Virtual Mapping Between Two Computing Devices

Figure 3E:
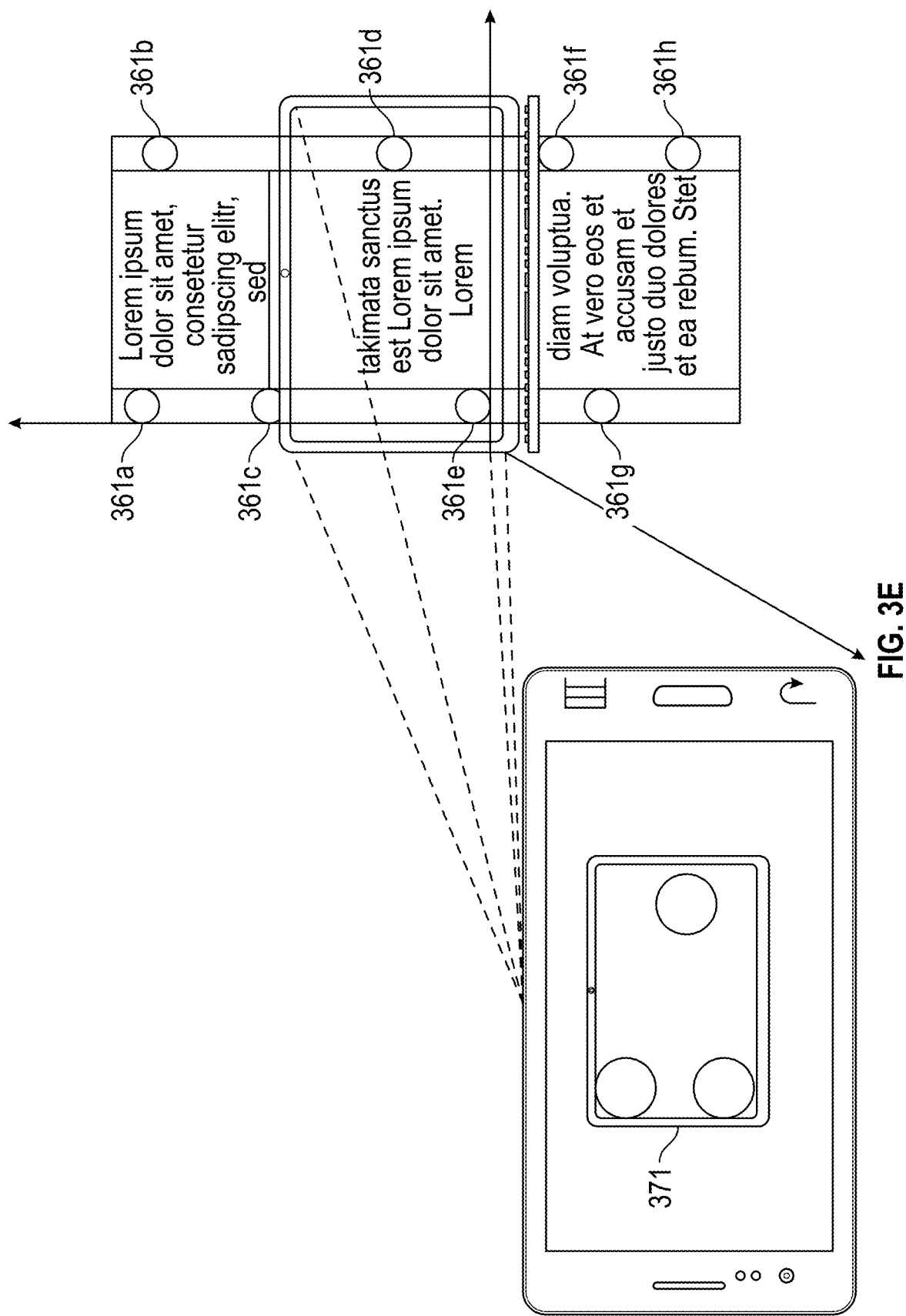
FIG. 3E depicts virtual mapping between two computing devices, according to some embodiments.

FIG. 3E depicts virtual mapping between two computing devices, according to some embodiments. In some embodiments, FIG. 3E depicts a virtual mapping of the scenario from FIG. 3D according to some embodiments. In this embodiment, the position of the reference anchors can be used to create a 3d xyz axis. As discussed herein, the distance between the devices can be determined based on resolution and/or aspect ratios. The mobile device can then calculate a mapping on how many pixels that are displayed on the user device for at least a portion of the laptop screen to a number of pixels actually displayed on the laptop screen for the same portion of the website. For example, if the anchor is 40 pixels on the laptop and the phone sees 10 pixels of the anchor, then the mapping is 4:1. The distance can be determined based on this mapping.

In some embodiments, a mapping can be determined based on pixel distance between anchors. For example, pixels A and B are 500 pixels apart on the laptop and the mobile phone determines that the text of interest is in between pixels A and B (at the 250 pixel mark). The image that the mobile phone captures can identify a distance of 100 pixels between pixels A and B. Then, the mobile phone can generate a three dimensional representation (e.g., an avatar) that points to the 50 pixel mark between A and B on the mobile phone screen.

In some embodiments, when this mapping is created, then it can still be possible to deploy an actual depiction of a bot 385 in the model to interact even without the anchors. As an alternative, in some embodiments, an interpolation among the reference points may be used to calculate where the anchors should be, and the bot 385 may be directed to those points.

Computing Device Communicating with Servers

Figure 4A:
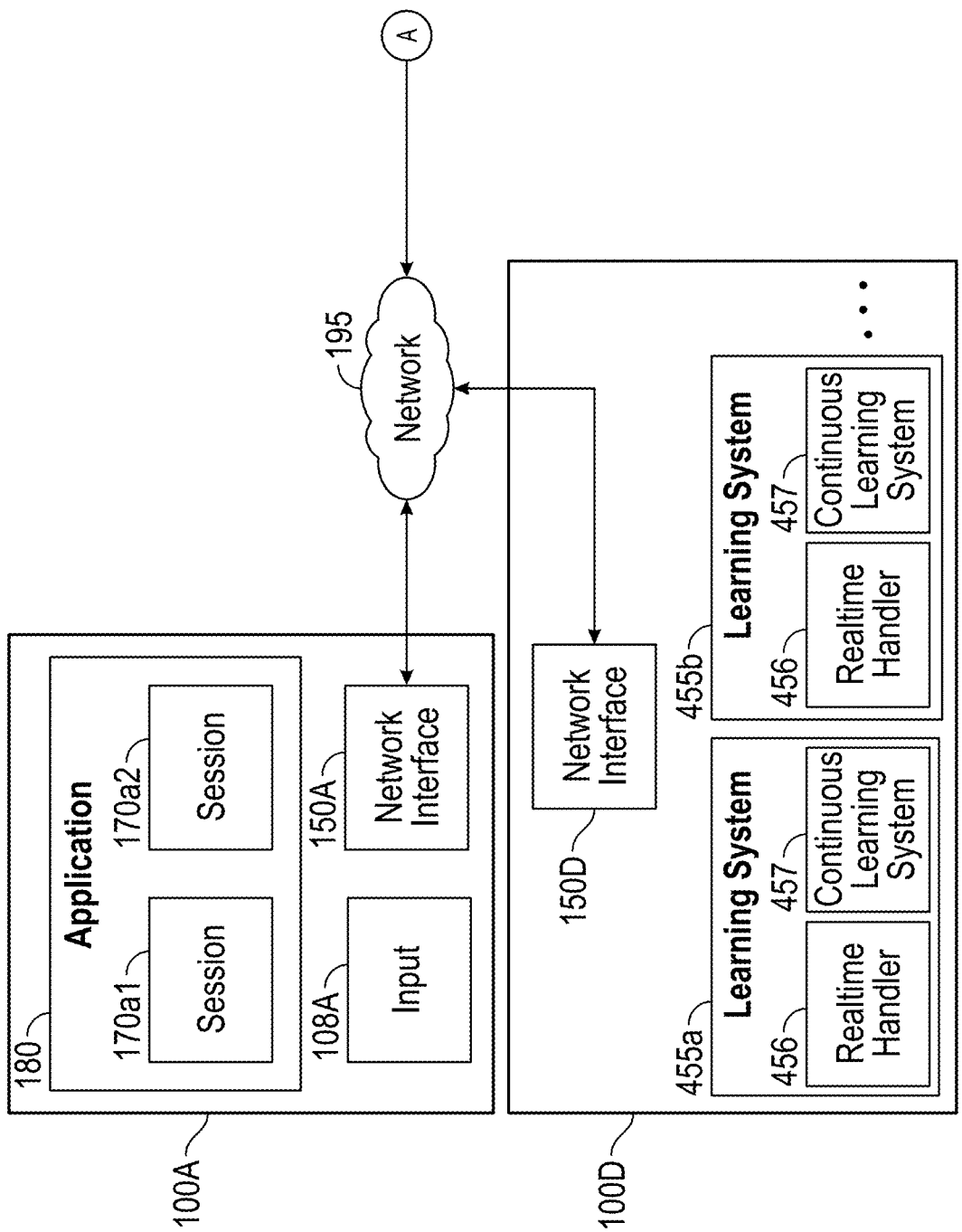
FIGS. 4A and 4B depict a diagram of a computing device interacting with servers, according to some embodiments.
Figure 4B:
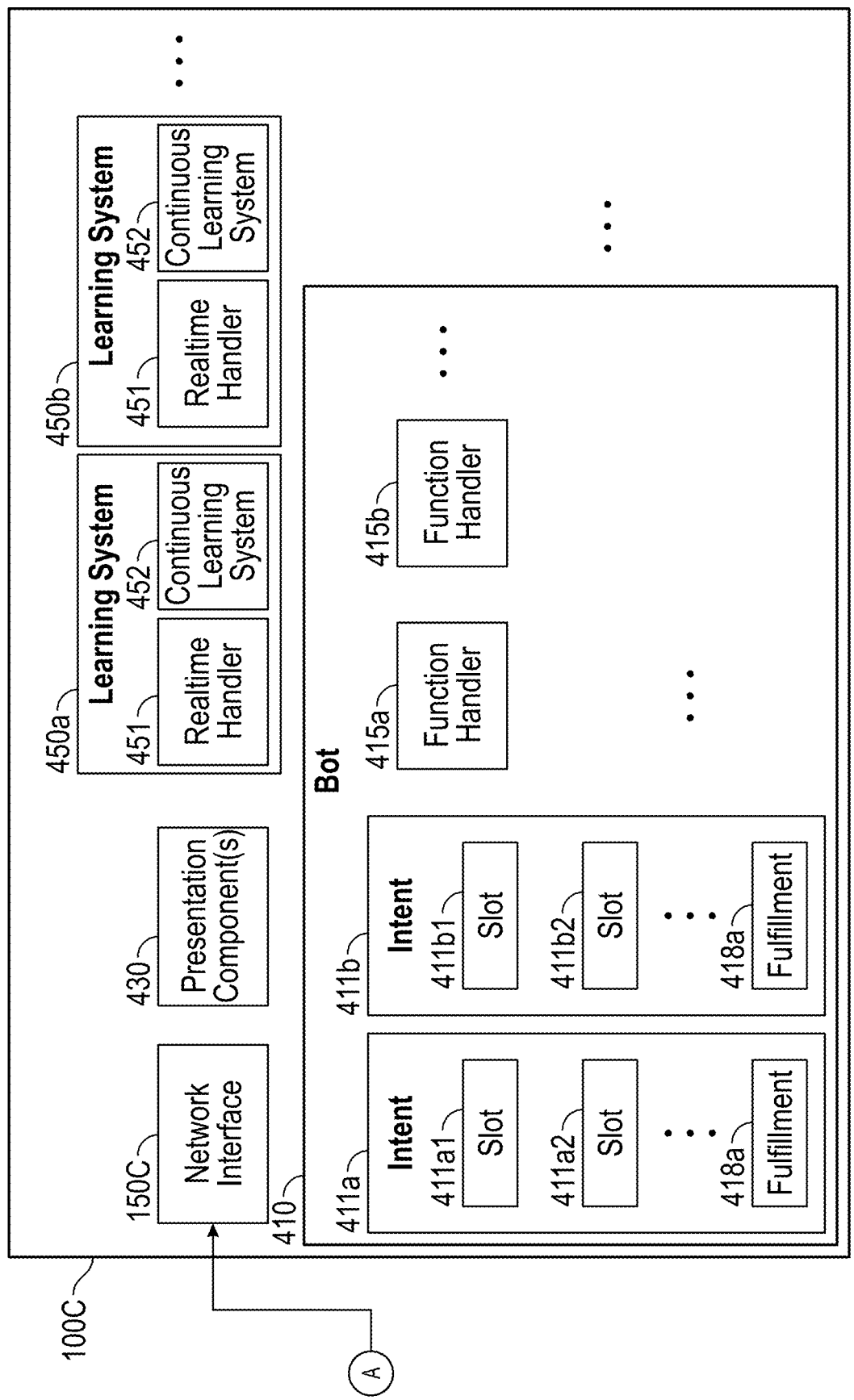

FIGS. 4A and 4B depict a diagram of a computing device interacting with servers, according to some embodiments. In some embodiments, FIGS. 4A and 4B depict a diagram of a device 100*a* interacting with a server 100*c*, which further offloads processing to another server 100*d*, according to some embodiments. Such offloading can be initiated by the processing agents 185.

In some embodiments, within 100*c*, the 185 processing agent can include a combination of rules-based logic with machine learning algorithms, or artificial intelligence models. The bot 410 can be comprised of one or more rules called Intents 411*a*, 411*b*, and those intents may include one or more slots 411*a*1, 411*a*2, 411*b*1, 411*b*2. Each intent may also include a fulfillment function 418*a*, 418*b* that handles the final output after the slots are satisfied or when a determined condition is met.

Additionally, in some embodiments, the bot 410 can include one or more function handlers 415*a*, 415*b*, and so forth. In some embodiments, the handler 415*a* need not correlate to intent 411*a*, the handler 415 may handle one or more intents 411, and/or multiple handlers 415 may be used to service a single intent 411.

In some embodiments, the handlers 415 can comprise at least a part of the intent 411*a*, the slots 411*a*1, and/or the fulfillment 418*a*. A single handler could be used for all of these, or there could be a separate handler for each.

In some embodiments, the software within the handlers 415 are executed that can initiate connecting to or performing steps in a learning system 450. An instance of 100*c* may include or be in electronic communication with a system that includes one or more learning systems 450*a*, 450*b*, and so forth. In some embodiments, the mapping of 450*a* need not have any relation to either the function handler 415*a* or the intent 411*a*. A single learning system 450 could handle one or more function handlers 415, or multiple learning systems 450 may be used to handle a single function handler 415.

In some embodiments, a learning system 450 may include one or more real time handlers for in-session data 451 as well as a continuous learning system 452, sometimes referred to as or including a model.

In some embodiments, a single 110C may include one or more bots 410.

In some embodiments, a function handler 415 may call a remote learning system 455 stored in a cloud server 100*d*. These remote learning systems 455 can have the same or similar characteristics as the learning system 450, and/or may be called to handle a certain use case. For example, the remote learning system 455 may be a voice-to-text processing framework while the learning system 450 that includes the session-specific knowledge for how to handle the input after it has been changed, converted, or translated to text. A single function handler 415 can instantiate any combination of requests to local learning systems 450 or remote learning systems 455 in order to satisfy the request.

Artificial Intelligence Bot Functions

Figure 4C:
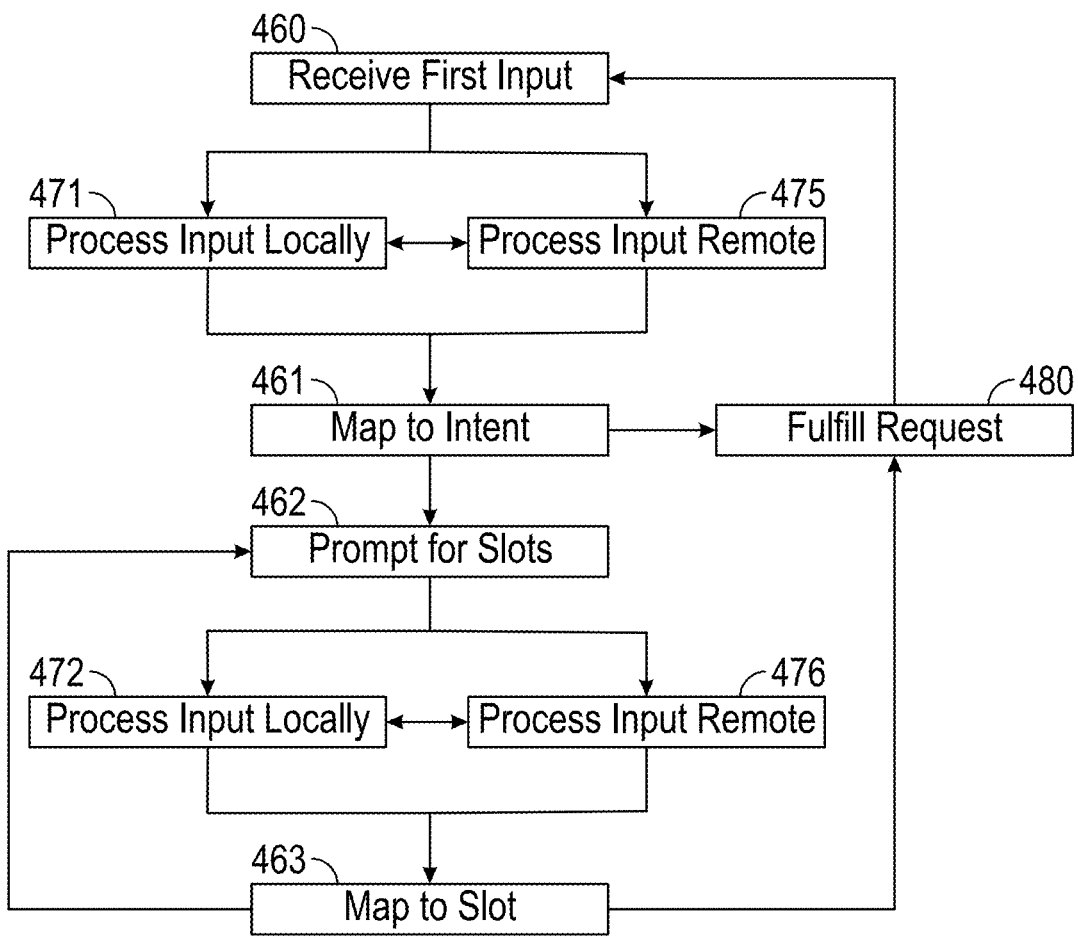
FIG. 4C depicts the flow of artificial intelligence bot functions, according to some embodiments.

FIG. 4C depicts the flow of artificial intelligence bot functions, according to some embodiments. After receiving a first input 460, the artificial intelligence bot can process the input locally 471 or remotely 475. The artificial intelligence bot can process the input through processes stored internal to the device and/or through layers of a neural network. The artificial intelligence bot can send the input to an external device or server for the external device or server to process the input data. The input can be an initial input or an intermediary input received by the bot. The artificial intelligence bot can receive the first input 460. In some embodiments, local processing can include the processing that occurs within the server 100*c*. It may or may not involve either a function handler 415 or a learning system 450.

In some embodiments, the artificial intelligence bot can map the input to an intent of the user at 461. The artificial intelligence bot can map the input with the intent of the user based on an assessment of the input. The input can include an image taken by the second computing device of a user interface of the first device. The image can be assessed to identify objects, text, video, pictures, and/or anchors that can provide contextual information that is being displayed on the website. The contextual information can provide information related to the user's intent. For example, if the user interface is displaying text related to a car purchase, a video and image of a car, and an anchor corresponding to a loan application, the artificial intelligence bot can determine that the intent is that the user is looking to purchase a car.

In some embodiments, the input can include an audio anchor played by the second computing device and captured by the first computing device. The artificial intelligence bot can match the audio snippet to audio stored in a database that corresponds to particular interests and intents of the user.

If the input satisfies the slots of the intent or when a determined condition is met, then the bot can fulfill the request 480. The artificial intelligence bot can be programmed and/or trained to automatically perform a certain action in response to a determination of a certain intent and/or determine intent that meets a certain threshold. For example, if the artificial intelligence bot determines that the user is looking for a credit card related to travel awards and/or that the user is 90% likely looking for a credit card related to travel awards based on contextual information identified in the user interface of the first device, the second device can send a command to the first device to display a different part of a website or a different website with credit card offers related to travel awards.

If the slots are not fulfilled, then the artificial intelligence bot may prompt for or request further inputs 462 from the user. The further inputs can be processed, for example, in some combination of local 472 and remote 476 processing.

After the processing completes, then a mapping to the slot can occur at 463. If there are more slots to resolve, then the process can repeat from 462 to 463 until all slots are satisfied or when a determined condition is met. When all slots are satisfied or the determined condition is met, the bot can fulfill the request 480. If the artificial intelligence bot cannot determine an intent of the user, the artificial intelligence bot can display a three dimensional rendering on the second device requesting for more information, such as selecting from a list of options (e.g., credit cards, loans, car purchases). The artificial intelligence bot can receive a selection of one or more of the options and determine an intent. If the user selects car and loan, the artificial intelligence bot can determine that the user is looking for an automobile loan for a purchase of a car.

For fulfillment 480, the fulfillment handler 418 can be utilized, which could handle the fulfillment in any combination of local or remote fulfillment. After the fulfillment is completed, the state can revert to 460 to await another first input.

Note that a single bot 410 can handle many concurrent instances of the process depicted in FIG. 4C. These instances can map to a session such as 170*a*1 on the device 100*a*.

For these sessions to be served in such a manner, some presentation components 430 may be utilized. For example, if a represented figure of a bot 385 were created, there would be some configuration within the presentation components 430.

In FIG. 4C, the devices 100c and 100d can be different in that the devices 100a and 100c may be within a "controlled experience" in the sense that there is some authentication used to protect those transactions. For example, the 100d server can authenticate with device 100c (but not device 100a). As another example, the device 100e can interact with device 100c and is not authenticated.

Computing System Embodiments

Figure 5:
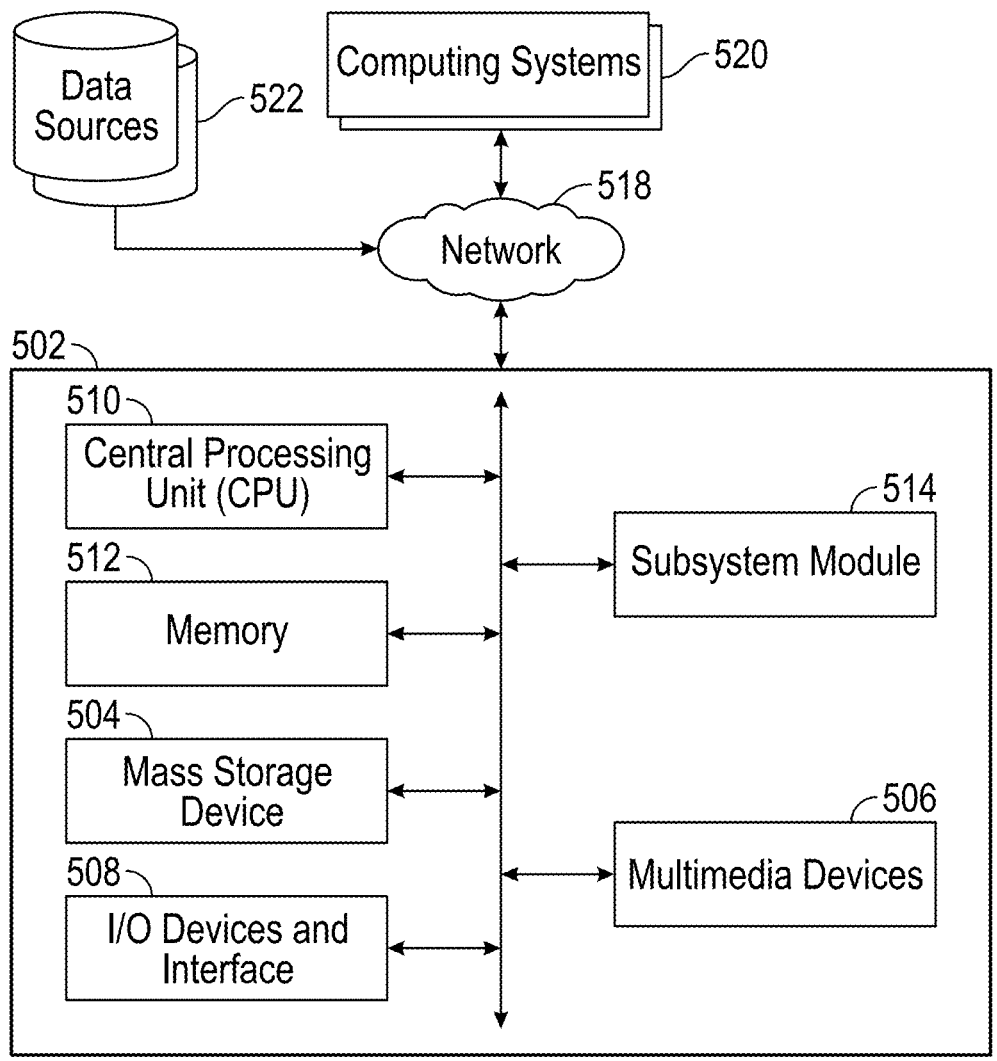
FIG. 5 illustrates one embodiment of a block diagram showing one embodiment of a computing system in communication with a network and various systems that may be used as one or more devices.

FIG. 5 illustrates one embodiment of a block diagram showing one embodiment of a computing system in communication with a network and various systems that may be used as one or more devices. In some embodiments, any of the devices systems, servers, or components referenced herein may take the form of a computing system as shown in FIG. 5, which illustrates a block diagram of one embodiment of a type of computing system 502. The exemplary computing system 502 includes a central processing unit ("CPU") 510, which may include one or more conventional microprocessors that comprise hardware circuitry configured to read computer-executable instructions and to cause portions of the hardware circuitry to perform operations specifically defined by the circuitry. The computing system 502 may also include a memory 512, such as random access memory ("RAM") for temporary storage of information and read only memory ("ROM") for permanent storage of information, which may store some or all of the computer-executable instructions prior to being communicated to the processor for execution. The computing system may also include one or more mass storage devices 504, such as a hard drive, diskette, CD-ROM drive, a DVD-ROM drive, or optical media storage device, that may store the computer-executable instructions for relatively long periods, including, for example, when the computer system is turned off. Typically, the modules of the computing system are connected using a standard based bus system. In different embodiments, the standard based bus system could be Peripheral Component Interconnect ("PCI"), Microchannel, Small Computer System Interface ("SCSI"), Industrial Standard Architecture ("ISA") and Extended ISA ("EISA") architectures, for example. In addition, the functionality provided for in the components and modules of computing system may be combined into fewer components and modules or further separated into additional components and modules. The illustrated structure of the computing system 502 may also be used to implement other computing components and systems described in the disclosure. It is recognized that the components discussed herein may be implemented as different types of components. For example, a server may be implemented as a module executing on a computing device, a mainframe may be implemented on a non-mainframe server, a server or other computing device may be implemented using two or more computing devices, and/or various components could be implemented using a single computing device.

Also, it is recognized that a variety of embodiments may be used and that some of the blocks in FIG. 5 may be combined, separated into sub-blocks, and rearranged to run in a different order and/or in parallel.

In one embodiment, the computing system 502 is a server, a workstation, a mainframe, a minicomputer. In other embodiments, the system may be a personal computer that is IBM, Macintosh, or Linux/Unix compatible, a laptop computer, a tablet, a handheld device, a mobile phone, a smart phone, a smart watch, a personal digital assistant, a car system, a tablet or other user device. Servers may include a variety of servers such as database servers (for example, Oracle, DB2, Informix, Microsoft SQL Server, MySQL, or Ingres), application servers, data loader servers, or web servers. In addition, the servers may run a variety of software for data visualization, distributed file systems, distributed processing, web portals, enterprise workflow, form management, and so forth.

The computing system 502 may be generally controlled and coordinated by operating system software, such as Windows 95, Windows 98, Windows NT, Windows 2000, Windows XP, Windows Vista, Windows 7, Windows 8, Windows 10, Unix, Linux, SunOS, Solaris, Maemo, MeeGo, BlackBerry Tablet OS, Android, webOS, Sugar, Symbian OS, MAC OS X, or iOS or other operating systems. In other embodiments, the computing system 502 may be controlled by a proprietary operating system. Conventional operating systems control and schedule computer processes for execution, perform memory management, provide file system, networking, I/O services, and provide a user interface, such as a graphical user interface ("GUI"), among other things.

The exemplary computing system 502 includes one or more commonly available input/output ("I/O") devices and interfaces 508, such as a keyboard, mouse, touchpad, speaker, microphone, or printer. In one embodiment, the I/O devices and interfaces 508 include one or more display device, such as a touchscreen, display or monitor, which allows the visual presentation of data to a user. More particularly, a display device provides for the presentation of GUIs, application software data, and multimedia presentations, for example. The central processing unit 510 may be in communication with a display device that is configured to perform some of the functions defined by the computer-executable instructions. For example, some of the computer-executable instructions may define the operation of displaying to a display device, an image that is like one of the screen shots included in this application. The computing system may also include one or more multimedia devices 506, such as speakers, video cards, graphics accelerators, and microphones, for example. A skilled artisan would appreciate that, in light of this disclosure, a system, including all hardware components, such as the central processing unit 510, display device, memory 512, and mass storage device 504 that are necessary to perform the operations illustrated in this application, is within the scope of the disclosure.

In the embodiment of FIG. 5, the I/O devices and interfaces provide a communication interface to various external devices and systems. The computing system may be electronically coupled to a network 518, which comprises one or more of a LAN, WAN, the Internet, or cloud computing networks, for example, via a wired, wireless, or combination of wired and wireless, communication links. The network 518 communicates with various systems or other systems 520 via wired or wireless communication links, as well as various data sources 522.

Information may be provided to the computing system 502 over the network from one or more data sources. The network may communicate with other data sources or other computing devices such as a third party survey provider system or database, for example. The data sources may include one or more internal or external data sources. In some embodiments, one or more of the databases or data sources may be implemented using a relational database, such as Sybase, Oracle, CodeBase and Microsoft® SQL Server as well as other types of databases such as, for example, a flat file database, an entity-relationship database, a no-SQL database, object-oriented database, or a record-based database.

In the embodiment of FIG. 5, the computing system 502 also includes a subsystem module 514, which may be executed by the CPU 510, to run one or more of the processes discussed herein. This system may include, by way of example, components, such as software components, object-oriented software components, class components, task components, processes, functions, attributes, procedures, subroutines, segments of program code, drivers, firmware, microcode, circuitry, data, databases, data structures, tables, arrays, or variables. In one embodiment, the subsystem module 514 may include one or more of the modules shown in the other figures.

Embodiments can be implemented such that all functions illustrated herein are performed on a single device, while other embodiments can be implemented in a distributed environment in which the functions are collectively performed on two or more devices that are in communication with each other. Moreover, while the computing system has been used to describe one embodiment of a subsystem module 514, it is recognized that the user or customer systems may be implemented as computing systems as well.

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, or may be invoked in response to detected events or interrupts. Software instructions may be embedded in firmware, such as an EPROM. It will be further appreciated that hardware modules may be comprised of connected logic units, such as gates and flip-flops, or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

It is recognized that the term "remote" may include systems, data, objects, devices, components, or modules not stored locally, that are not accessible via the local bus. Thus, remote data may include a system that is physically stored in the same room and connected to the computing system via a network. In other situations, a remote device may also be located in a separate geographic area, such as, for example, in a different location, country, and so forth.

Visual Indicators Via Website or Browser Plug-in

In some embodiments, a processing agent of a second device (such as a mobile phone with integrated camera) may identify content items on a webpage displayed by a first device based on visual indicators appearing on the webpage and captured by a camera of the second device that captures an image or video of the display screen of the first device. The first device may include a software module, such as a webpage plug-in. The website server can add the webpage plug-in to enable the site to include visual indicators for the processing agent.

In some embodiments, the software module can include a browser plug-in or script that adds visual indicators to the webpage. The browser plug-in, such as a web browser extension, may be installed by a user of the browser and can collect information on a website, such as HTML code, and determine content items of the webpage. The extension can scan the webpage data to determine relevant data and enhance the webpage by adding visual indicators. For example, the plug-in can analyze the HTML code of the webpage to identify types of content items in the webpage, such as images, price information, interactive user interface controls, text, and/or the like. The plug-in can add visual indicators on the webpage to be displayed on the first device for purposes of enabling an augmented reality view of the webpage by the second device.

In some embodiments, the software module can include both a website plug-in and a browser plug-in. The website plug-in can add the visual indicators directly into the HTML code of the website. The browser plug-in can assess the HTML code and add additional indicators into the website. For example, the website plug-in may add indicators regardless of the browser type. However, the browser plug-in can adapt or add additional indicators based on the browser type or display type, such as a browser for a mobile phone or a laptop, browsers from different companies, different resolutions on the user interface, and/or the like.

Method of a Processing Agent

Figure 6:
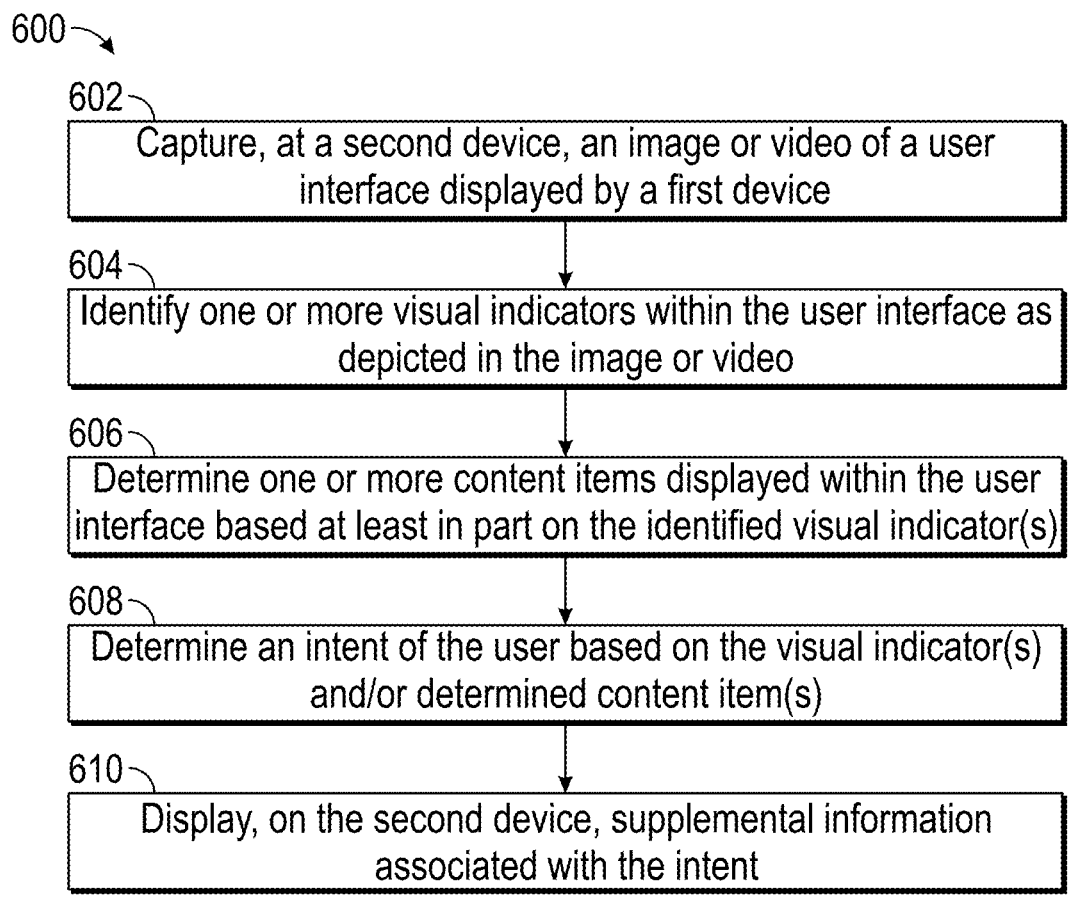
FIG. 6 illustrates an example method implemented by a processing agent of a second device according to some embodiments.

FIG. 6 illustrates an example method implemented by a processing agent of a second device according to some embodiments. Some embodiments are described as using indicators, but it is understood that the embodiments can apply to anchors, and/or vice versa, where applicable.

In some embodiments, the visual indicators or graphical indicators added within a webpage on a first device to be recognized by a processing agent or bot operating on a different device (e.g., a device that analyzes an image of the webpage as displayed by the first device) may be similar in some respects to the anchors discussed above. However, in some embodiments, such visual indicators or graphical indicators added within the displayed first page on the device that displays the first page may indicate more information to the processing agent than which portion of a page is currently displayed or where to spatially present augmented reality content by a second device. For example, the graphical indicators added to the page display by a plug-in or other code executed by the browser may each be associated with mapping information or association information that associates each of a number of unique graphical symbols, images or grouping of pixels with different content types, types or information, or other data or metadata regarding a nearby piece of content appearing on the page. For example, a green triangle may mean a product name appears nearby on the page, a red circle inside an orange square may mean a product's UPC code is nearby, a pink rectangle may mean a flight number is nearby, etc.

In some embodiments, a user can open the webpage on the first device, such as a desktop computer or a laptop computer. As an example, the webpage may that present a product, such as a television, for sale by an operator of the webpage. The plug-in can add visual indicators near certain identified information on the webpage, such as one visual indicator near a name of the television and a second visual indicator near the price of the television as displayed by a browser on the first device. The user can take a picture or video from a second device, such as a mobile phone, of the user interface of the first device showing the television and the price.

In some embodiments, the processing agent on the second device can analyze the image or video to identify the visual indicators for the television and the price being displayed on the user interface of the first device. At block 602, the processing agent can capture an image or video of a user interface displayed by a first device. For example, the processing agent can be installed on a mobile device, and the camera of the mobile device captures an image of a user interface displayed on a user's laptop screen. At block 604, the processing agent can identify one or more visual indicators within image or video of the user interface captured at block 602.

At block 606, the processing agent can determine or identify one or more of the content items displayed within the user interface displaying the webpage based at least in part on the identified visual indicator(s). In some embodiments, the visual indicator itself may be uniquely associated with the product or item, while in other embodiment the visual indicator may signify to the processing agent that a product identifier or name appears next to or near the visual indicator on the webpage (such that the processing agent may extract the product name or identifier from the image data captured by the camera in proximity of the visual indicator). The processing agent can display additional offers, help tips, discount coupons, and/or the like on the second device near the relevant content item, such as an overlay that appears to be part of the actual scene captured by the camera (e.g., using augmented reality techniques to apply realistic perspective in 3D virtual space). For example, the processing agent can display an offer for credit that would provide larger discounts if used for the purchase of the television.

In some embodiments, the plug-in can determine the locations of the content items on the webpage. The plug-in can determine that an image is placed on the top right corner of the webpage, and the price is located underneath the image based on an analysis of the HTML code. The plug-in can identify the order in which certain content items are displayed, such as the image first, and then text indicating a price. The plug-in can analyze the code to identify particular locations on the page, such as a style attribute in the HTML code that center aligns a JPEG on the screen.

In some embodiments, based on locations of certain content items on a webpage, the plug-in can add anchors or visual indicators that can be used by the processing agent to identify the content items. For example, the plug-in can identify that the top of the page includes a picture of a house and a price underneath the picture, and at the bottom of the page includes a mortgage loan offer, based on an analysis of the underlying HTML code and/or other page content. The plug-in can overlay a first visual indicator near the picture of a house, a second visual indicator near the price, and a third visual indicator near the mortgage loan offer at the bottom of the page. A user can be viewing the top of the page on a desktop computer, and not displaying the bottom of the page. A user can, with the user's mobile phone, take a picture or a video stream of the top of the page displayed on the desktop computer. A processing agent on a user's mobile phone can identify the locations of the house picture and the price based on the identification of the first and second visual indicators in the image or video. In some embodiments, the first and/or second visual indicators can also indicate that a mortgage loan application is at the bottom of the page, as discussed further herein.

In some embodiments, a visual indicator can be overlaid on top of the webpage on a first device by the plug-in installed on the first device. The processing agent on a second device can identify the visual indicator based on an image capturing the webpage displayed on the first device. The visual indicator can include a pixel and/or a group of pixels that can be mapped to characteristics of content items. For example, a particular group of pixels can be mapped to a price, a price range, a car, an application, an offer, and/or the like. A group of pixels can be mapped to a type of content item, such as a house and/or a mortgage loan. A group of pixels can indicate one or more characteristics of the content items. For example, a group of pixels can indicate a single characteristic, such as a price range. A group of pixels can also indicate a group of characteristics, such as a price range for a house and a mortgage loan. The visual indicator can include an icon, such as a group of pixels creating a dollar sign in a certain shape, color or configuration.

In some embodiments, the visual indicators can be placed near or in a certain proximity or relation to the associated content item by the plug-in. The visual indicators can be placed closer to the content item of interest than other content items. The visual indicator can indicate a type of content item. For example, a first visual indicator can indicate an image and a second visual indicator can indicate a price. Then, the processing agent can correlate the nearest image with the first visual indicator and the nearest price with the second visual indicator.

In some embodiments, the visual indicator can be on the left, right, top, and/or bottom of the content item according to a predefined rule or template known by both the plug-in and an associated processing agent on a second device (e.g., the user's mobile phone). In some embodiments, the visual indicator can be embedded in a style of the content item. For example, if the content item is part of a list (such as a bullet point list), the visual indicator can be placed on top of or in place of the bullet point. In some embodiments, the visual indicator can be overlaid on the content item, and/or overlaid on the frame of an image.

In some embodiments, visual indicators can be placed with certain constraints of the webpage. For example, the plug-in can place only a single visual indicator on each Y-axis. As such, the processing agent can look for visual indicators on the Y-axis (such as on the far left of the display screen).

In some embodiments, the visual indicators can be integrated into the webpage that may not be readily apparent to the consumer viewing the user interface. For example, the visual indicators can be of different shades of colors. A bullet point may be a black circle, and the visual indicators can include different shades of black and grey. In other embodiments, the visual indicators may be apparent to the user as a design feature to encourage the user to capture an image of the page with a camera (e.g., the user may know from the appearance of the visual indicators that the page enables an augmented reality experience via inclusion of the graphical indicators).

In some embodiments, the plug-in and/or the processing agent can perform analysis on the content items on a page. For example, the plug-in can identify an image on a webpage. The plug-in can perform image recognition to determine an indication of a likely object in an image, such as a car or a house. The plug-in can perform optical character recognition (OCR) or transcribe audio to text to identify content items. For example, an image can include text that the plug-in can analyze for text. The plug-in can transcribe audio of a video stream to categorize the content item, such as a video explaining how to shop for mortgage loans.

In some embodiments, the visual indicator can be an entire background or framing of a webpage or other interface displayed on the user display. For example, a background image of a webpage that exceeds the viewable area of the screen can include a diagonal line from the top left to the bottom right of the webpage. Relative placement of the diagonal line to the content items can be used for placement of other visual indicators. The position of the diagonal line on the screen can indicate the position of the entire webpage currently being displayed. For example, if the processing agent identifies that the top of the current view of the webpage includes the diagonal background line starting with a top horizontal position in the middle of the display area, that may indicate that the top of the currently displayed portion of the webpage is the midpoint of the page as a whole (such as because half of the page has already been scrolled through).

Advantageously, the plug-in and/or the processing agent can identify content items and determine an intent of the user. At block 608, the processing agent can determine an intent of the user based on the visual indicator(s) and/or the determined content item(s). For example, the plug-in can identify that the page includes an image of a house, a price for the house, and a mortgage loan application, and determine that the user is shopping for the house and may need a mortgage loan.

In some embodiments, the processing agent can identify the content items based on a visual indicator created by the plug-in, and can identify the intent of the user. The processing agent can determine that the user is looking for a mortgage loan, assess a user's credit history, and display offers for credit on the user's second device.

At block 610, the processing agent can display, on the second device, supplemental information associated with the intent of the user. The processing agent can overlay offers, such as credit offers, over the second device's display of the camera's capture of the website displayed on the first device. In some embodiments, the visual indicator can indicate an intent of a consumer, such as a red circle indicating that the consumer is looking to purchase a car. The object of the intent (such as the specific car to be purchased) may be determined from a graphical indicator and/or associated content of the page near a graphical indicator (such as a graphical indicator that signifies to the processing agent that a make and model of a car is indicated next to the graphical indicator on the page, such that the processing agent extracts the nearby image data of the captured page, applies OCR, and extracts the make/model of the car using predefined rules that indicate typical text formatting of car make information).

In some embodiments, the HTML code of the website can be programmed to work with the plug-in. For example, the website HTML code can include plug-in references for the plug-in to recognize when placing visual indicators. For example, a developer of the page may include HTML tags or other code within the page at points where particular visual indicators should be added dynamically at the time of displaying the page by the browser or an associated browser plug-in.

In some embodiments, the plug-in can be an extension for a web browser. The plug-in can access HTML code of website loading on the web browser. The plug-in can analyze the HTML or other code or markup language to dynamically and automatically place the visual indicators within or on top of the webpage displayed via the web browser. Advantageously, the plug-in and/or the processing agent may not have any prior knowledge of the webpage, but can dynamically add visual indicators on top of the webpage for the processing agent to display help service to a consumer, offers, and/or the like on a second device.

In some embodiments, the plug-in can modify the HTML code. For example, the plug-in can add the visual indicators directly into the website's HTML code and/or on top of the displayed webpage dynamically at the time of display. The web browser can load the website's HTML code with the HTML code for the visual indicator on the first device.

In some embodiments, dynamic and automatic placement of visual indicators on websites provide the technical advantage of not having to share control or the modify webpage code. For example, an airline website may not want to program plug-in references into the website's HTML for the plug-in to add visual indicators, or to add additional software modules that specifically communicate with the plug-in. The plug-in itself (or the processing agent, or a combination thereof) can identify the content items on the webpage based on an analysis of the page, and automatically place visual indicators onto the displayed page.

In some embodiments, dynamic and automatic placement of visual indicators on websites provide the technical advantage of not having to share additional information between the servers of the webpage and the plug-in and/or processing agent system. For example, the plug-in on the client side can analyze the HTML code of an airline's website without having to share additional information with the airline website's server. The visual indicators can be placed on top of the airline website via the web browser. Advantageously, when the processing agent determining and displays offers on the second device's user interface that is not originally on the webpage, the processing agent may be identifying characteristics of the consumer, such as accessing a consumer profile on a database that the airline website server does not have access to. The consumer profile that the processing agent has access to can include sensitive information, such as an address, credit information, social security information, transaction data, and/or the like. Thus, the dynamic and automatic placement of the visual indicators improves data security and identity theft by performing the analysis all within the plug-in and/or the processing agent system, and displaying the advertisements or offers on top of the airline's website on the second device, without having to share the sensitive consumer data with the airline website server (or otherwise sending any sensitive or personal information to or from the first client device that displays the webpage).

Certain offers may be preferable for a consumer with a certain credit score range. Thus, sharing even the offer to the airline web server may be reverse engineered to determine a consumer's credit score range. Advantageously, displaying the offers only on the second device further ensures data security and privacy. The processing agent and/or the plug-in can request authentication of the consumer, such as based on a consumer's input of authentication data, in order to protect sensitive information of the user. In some embodiments, the processing agent can provide more customized offers to an authenticated consumer, whereas general offers are displayed to a user who has not been authenticated.

Moreover, the airline website does not have to share its own consumer data with the plug-in and/or the processing agent system. The airline website may have its own database of information on the consumer. The plug-in and/or the processing agent system can rely on its own internal information database (or information accessible via a secure connection to a related server or network-accessible data source) to make its determinations on offers to display.

In some embodiments, the extension can communicate with the processing agent. The processing agent can indicate to the plug-in that the processing agent has identified a particular visual indicator. The plug-in can send contextual information on the content item associated with the visual indicator, information on the webpage, user behavior, and/or the like. For example, the plug-in can send page history, view timeline, click stream, and/or the like. The plug-in can send data on content items that may not be displayed on the second device, but that the plug-in knows is on the webpage (such as a content item at the bottom of the webpage). This communication may be via a server that is in communication with both the first and second device over a network, such as the Internet, in some embodiments.

In some embodiments, the browser plug-in may not communicate information to and/or from the processing agent. The processing agent can map characteristics of the content item based on the visual indicator. For example, a group of pixels received by the processing agent on the second device can map the group of pixels to a scenario where the consumer is looking to purchase a house and may be in need of a mortgage loan. The processing agent can access credit information on the consumer and display an offer for a mortgage loan next to an image of the house on the second device. The processing agent can identify optimal financial services and/or products, discount codes, helpful tips, and/or the like for the user's intent. For example, the processing agent can identify a credit card that would provide additional bonuses for the purchase, such as a merchant specific bonus or a bonus for the purchase of the content item type. Advantageously, the processing agent may have additional data on the consumer that is accessible to the processing agent but not to the website's server, and thus, the processing agent may be able to provide more targeted or customized offers to the user based on the accessible data. Thus, the consumer is not limited to the website server's offers.

In some embodiments, the processing agent can display offers on the second device, overlaid on top of the screen of the first device captured by the camera on the second device. The user can select an offer, such as an offer to apply for a loan. The user can be routed to an offer for a loan on the second device. In some embodiments, the processing agent can communicate with the plug-in and/or the website browser to launch a loan application webpage on the first device, such as on a new tab of the website browser.

In some embodiments, the plug-in can gather information from multiple webpages loaded on the webpage browser. The plug-in can analyze HTML code and/or communicate with a software module on one or more of the webpages to identify content items and/or determine consumer intent. For example, the consumer can be viewing a television on a first webpage, a television wall mount on a second webpage, and a universal remote on a third webpage. The plug-in can aggregate the data regarding the content items, and identify an optimal financial service and/or product for the combined purchase, such as an optimal credit card to use across the three products. An optimal financial product and/or service can be determined based on a total value. For example, the total value can include a price, a shipping cost, a shipping time, consumer data protection, privacy, rewards, best credit to use, warranty coverage for the product, warranty coverage based on a credit card, a combination thereof, and/or the like. The plug-in can generate visual indicators for each of the web pages. A visual indicator on the first webpage can be processed by the processing agent to identify the three products. In some embodiments, the visual indicator for the first product can initiate the processing agent to communicate with the plug-in to receive information related to the other two products.

ADDITIONAL EMBODIMENTS

Each of the processes, methods, and algorithms described in the preceding sections may be embodied in, and fully or partially automated by, code modules executed by one or more computer systems or computer processors comprising computer hardware. The code modules may be stored on any type of non-transitory computer-readable medium or computer storage device, such as hard drives, solid state memory, optical disc, and/or the like. The systems and modules may also be transmitted as generated data signals (for example, as part of a carrier wave or other analog or digital propagated signal) on a variety of computer-readable transmission mediums, including wireless-based and wired/cable-based mediums, and may take a variety of forms (for example, as part of a single or multiplexed analog signal, or as multiple discrete digital packets or frames). The processes and algorithms may be implemented partially or wholly in application-specific circuitry. The results of the disclosed processes and process steps may be stored, persistently or otherwise, in any type of non-transitory computer storage such as, for example, volatile or non-volatile storage.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

As used herein, the terms "determine" or "determining" encompass a wide variety of actions. For example, "determining" may include calculating, computing, processing, deriving, generating, obtaining, looking up (for example, looking up in a table, a database or another data structure), ascertaining and the like via a hardware element without user intervention. Also, "determining" may include receiving (for example, receiving information), accessing (for example, accessing data in a memory) and the like via a hardware element without user intervention. Also, "determining" may include resolving, selecting, choosing, establishing, and the like via a hardware element without user intervention.

As used herein, the terms "provide" or "providing" encompass a wide variety of actions. For example, "providing" may include storing a value in a location of a storage device for subsequent retrieval, transmitting a value directly to the recipient via at least one wired or wireless communication medium, transmitting or storing a reference to a value, and the like. "Providing" may also include encoding, decoding, encrypting, decrypting, validating, verifying, and the like via a hardware element.

As used herein, the term "message" encompasses a wide variety of formats for communicating (for example, transmitting or receiving) information. A message may include a machine readable aggregation of information such as an XML document, fixed field message, comma separated message, or the like. A message may, in some implementations, include a signal utilized to transmit one or more representations of the information. While recited in the singular, it will be understood that a message may be composed, transmitted, stored, received, and so forth, in multiple parts.

As used herein "receive" or "receiving" may include specific algorithms for obtaining information. For example, receiving may include transmitting a request message for the information. The request message may be transmitted via a network as described above. The request message may be transmitted according to one or more well-defined, machine readable standards which are known in the art. The request message may be stateful in which case the requesting device and the device to which the request was transmitted maintain a state between requests. The request message may be a stateless request in which case the state information for the request is included within the messages exchanged between the requesting device and the device serving the request. One example of such state information includes a unique token that can be generated by either the requesting or serving device and included in messages exchanged. For example, the response message may include the state information to indicate what request message caused the serving device to transmit the response message.

As used herein "generate" or "generating" may include specific algorithms for creating information based on or using other input information. Generating may include retrieving the input information such as from memory or as provided input parameters to the hardware performing the generating. After obtained, the generating may include combining the input information. The combination may be performed through specific circuitry configured to provide an output indicating the result of the generating. The combination may be dynamically performed such as through dynamic selection of execution paths based on, for example, the input information, device operational characteristics (for example, hardware resources available, power level, power source, memory levels, network connectivity, bandwidth, and the like). Generating may also include storing the generated information in a memory location. The memory location may be identified as part of the request message that initiates the generating. In some implementations, the generating may return location information identifying where the generated information can be accessed. The location information may include a memory location, network locate, file system location, or the like.

As used herein, "activate" or "activating" may refer to causing or triggering a mechanical, electronic, or electromechanical state change to a device. Activation of a device may cause the device, or a feature associated therewith, to change from a first state to a second state. In some implementations, activation may include changing a characteristic from a first state to a second state such as, for example, changing the viewing state of a lens of stereoscopic viewing glasses. Activating may include generating a control message indicating the desired state change and providing the control message to the device to cause the device to change state.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

All of the methods and processes described above may be embodied in, and partially or fully automated via, software code modules executed by one or more general purpose computers. For example, the methods described herein may be performed by the computing system and/or any other suitable computing device. The methods may be executed on the computing devices in response to execution of software instructions or other executable code read from a tangible computer readable medium. A tangible computer readable medium is a data storage device that can store data that is readable by a computer system. Examples of computer readable mediums include read-only memory, random-access memory, other volatile or non-volatile memory devices, CD-ROMs, magnetic tape, flash drives, and optical data storage devices.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

What is claimed is:

1. A computer-implemented method comprising:
   capturing, by a camera of a first computing device, an image of a display screen of a second computing device, wherein the display screen displays a user interface presented by the second computing device, wherein the second computing device is a different device than the first computing device and is physically separate from the first computing device;
   identifying an anchor within the user interface as depicted in the image of the display screen;
   determining one or more content items expected to be present within the user interface based at least in part on the anchor, wherein the one or more content items are determined regardless of whether the one or more content items are visible in the image;

identifying an intent of the user based at least in part on the determined one or more content items;

determining supplemental content based at least in part on the intent of the user, wherein the supplemental content comprises a recommendation regarding (a) interacting with the user interface via the second computing device and (b) information for a user to provide to the user interface via the second computing device; and causing display on the first computing device of the supplemental content as an overlay on top of a visual representation of a current user interface of the second computing device captured in real-time by the first computing device.

2. The computer-implemented method of claim 1, wherein the first computing device comprises a mobile phone.

3. The computer-implemented method of claim 1, wherein the supplemental content includes a three-dimensional rendering that provides the recommendation to the user.

4. The computer-implemented method of claim 3, wherein the three-dimensional rendering includes an animated avatar.

5. The computer-implemented method of claim 1, wherein the intent corresponds to a portion of a website that is not currently displayed on the display screen of the second computing device, and wherein the supplemental content provides information directing the user to the portion of the website not currently displayed.

6. The computer-implemented method of claim 5, wherein the supplemental content provides information by pointing in a direction for the user to scroll on the website.

7. The computer-implemented method of claim 1, wherein the intent corresponds to a portion of a website that is currently displayed on the display screen of the second computing device, and wherein the supplemental content points to the portion of the website that corresponds to the display screen.

8. The computer-implemented method of claim 1, wherein the intent of the user is identified further based on audio played by the second computing device and received by a microphone of the first computing device.

9. A first computing device comprising:
a memory;
a camera configured to capture an image of a display screen of a second computing device, wherein the display screen displays a user interface presented by the second computing device, wherein the second computing device is a different device than the first computing device and is physically separate from the first computing device; and
one or more processors configured by specific executable instructions to:
identify an anchor within the user interface as depicted in the image of the display screen;
determine one or more content items expected to be present within the user interface based at least in part on the anchor, wherein the one or more content items are determined regardless of whether the one or more content items are visible in the image;
identify an intent of the user based at least in part on the determined one or more content items;
determine supplemental content based at least in part on the intent of the user, wherein the supplemental content comprises a recommendation regarding (a) interacting with the user interface via the second computing device or (b) information for a user to provide to the user interface via the second computing device; and
cause display on the first computing device of the supplemental content as an overlay on top of a visual representation of a current user interface of the second computing device captured in real-time by the first computing device.

10. The first computing device of claim 9, wherein a processing agent causes performance of processes across a plurality of devices including implementation of the executable instructions by the one or more processors of the first computing device.

11. The first computing device of claim 9, wherein the one or more processors are further configured to match an audio snippet emitted by the second computing device with a pre-stored audio fingerprint, wherein the audio snippet comprises at least one of: a chime or audio of a certain frequency beyond the human range of hearing.

12. The first computing device of claim 9, wherein the one or more processors are further configured to determine a distance between the first computing device and the second computing device based on a time stamp for the first computing device receiving an audio anchor emitted by the second computing device.

13. The first computing device of claim 9, wherein the one or more processors are further configured to determine a distance between the first computing device and the second computing device based on a size of at least a portion of the image captured by the first computing device.

14. The first computing device of claim 9, wherein the one or more processors are further configured to determine a size of the supplemental content to be displayed based on a size of at least a portion of the image captured by the first computing device.

15. A non-transitory computer storage medium storing computer-executable instructions that, when executed by a processor, cause the processor to perform operations comprising:
identifying an anchor within a user interface as depicted in an image of a display screen of a second computing device, wherein the image is captured by a camera of a first computing device, wherein the second computing device is a different device than the first computing device and is physically separate from the first computing device;
determining one or more content items expected to be present within the user interface based at least in part on the anchor, wherein the one or more content items are determined regardless of whether the one or more content items are visible in the image;
determining supplemental content based on the determined one or more content items, wherein the supplemental content comprises a recommendation regarding interacting with the user interface via the second computing device, wherein the supplemental content provides information directing the user to a portion of a website not currently displayed by the second computing device; and
transmitting the supplemental content to be displayed on the first computing device as an overlay on top of a visual representation of a current user interface of the second computing device captured in real-time by the first computing device.

16. The non-transitory computer storage medium of claim 15, wherein the operations further comprise receiving a user selection of an option corresponding to the supplemental content, wherein in response to the user selection, the second computing device changes a display for the first computing device to correspond to the user selection.

17. The non-transitory computer storage medium of claim 15, wherein the second computing device adjusts a size of the anchor based on a size of a display for the first computing device.

18. The non-transitory computer storage medium of claim 15, wherein the supplemental content is specific to a particular website presented within a user interface of the second computing device, wherein the particular website is determined based at least in part on one or more of: the anchor or the one or more content items.

* * * * *